United States Patent
Park et al.

(10) Patent No.: US 12,317,178 B2
(45) Date of Patent: May 27, 2025

(54) CELL SELECTION FOR WIRELESS COMMUNICATIONS

(71) Applicant: Comcast Cable Communications, LLC, Philadelphia, PA (US)

(72) Inventors: Kyungmin Park, Vienna, VA (US); Esmael Hejazi Dinan, McLean, VA (US); Weihua Qiao, Herndon, VA (US); Taehun Kim, Fairfax, VA (US); Jinsook Ryu, Oakton, VA (US); Peyman Talebi Fard, Vienna, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/478,788

(22) Filed: Sep. 29, 2023

(65) Prior Publication Data
US 2024/0114440 A1  Apr. 4, 2024

Related U.S. Application Data

(63) Continuation of application No. 17/174,539, filed on Feb. 12, 2021, now Pat. No. 11,812,369.
(Continued)

(51) Int. Cl.
*H04W 48/16* (2009.01)
*H04B 17/318* (2015.01)
(Continued)

(52) U.S. Cl.
CPC .......... *H04W 48/16* (2013.01); *H04B 17/318* (2015.01); *H04W 16/02* (2013.01); *H04W 74/0833* (2013.01)

(58) Field of Classification Search
CPC . H04W 48/16; H04W 16/02; H04W 74/0833; H04W 16/04; H04W 48/20; H04B 17/318; H04B 1/7075
See application file for complete search history.

(56) References Cited

U.S. PATENT DOCUMENTS 10,484,886 B2    11/2019   Griot et al.
2019/0045345 A1*  2/2019   Lee .................. H04L 1/1812
(Continued)

FOREIGN PATENT DOCUMENTS

WO   2017074486 A1   5/2017
WO   2017098441 A1   6/2017
(Continued)

OTHER PUBLICATIONS

Wan Lei et al: "4G/5G Spectrum Sharing: Efficient 5G Deployment to Serve Enhanced Mobile Broadband and Internet of Things Applications" IEEE Vehicular Technology Magazine, IEEE, US, vol. 13, No. 4, Dec. 1, 2018.
(Continued)

*Primary Examiner* — Mewale A Ambaye
(74) *Attorney, Agent, or Firm* — Banner & Witcoff, Ltd.

(57) ABSTRACT

A wireless device may communicate with a base station via a cell. A cell may be selected for wireless communications based on having a configuration that is capable of serving certain wireless resources associated with a wireless device. A wireless device may select a cell that comprises a communication link supporting certain wireless resources that may be required for use by the wireless device.

27 Claims, 27 Drawing Sheets

Related U.S. Application Data

(60) Provisional application No. 62/976,046, filed on Feb. 13, 2020.

(51) Int. Cl.
*H04W 16/02* (2009.01)
*H04W 74/0833* (2024.01)

(56) References Cited

U.S. PATENT DOCUMENTS

| | | | | |
|---|---|---|---|---|
| 2019/0110300 | A1* | 4/2019 | Chen | H04W 74/02 |
| 2019/0387461 | A1* | 12/2019 | Ishii | H04W 48/12 |
| 2022/0104302 | A1* | 3/2022 | Zhou | H04W 72/23 |
| 2024/0155696 | A1* | 5/2024 | Cui | H04L 5/0048 |
| 2024/0430901 | A1* | 12/2024 | Zhou | H04L 5/0055 |

FOREIGN PATENT DOCUMENTS

| | | |
|---|---|---|
| WO | 2017197125 A1 | 11/2017 |
| WO | 2019099361 A1 | 5/2019 |
| WO | 2019099463 A1 | 5/2019 |

OTHER PUBLICATIONS

Jul. 8, 2021—European Search Report—EP 21156841.5.
S2-1912732 SA WG2 Meeting #136, Reno, USA, Nov. 18-22, 2019, Source: Samsung, AT&T, Sprint, InterDigital, Title: Key Issue on 5GC assisted cell selection to access network slice.
S2-1911617 SA WG2 Meeting #136, Reno, USA, Nov. 18-22, 2019, Source: Samsung, AT&T, Sprint, Title: Key Issue on 5GC assisted cell selection to access network slice.
RP-193254 3GPP TSG-RAN Meeting #86, Sitges, Barcelona, Dec. 9-12, 2019, Source: CMCC, Verizon, Title: Study on enhancement of RAN Slicing.
RP-193169 3GPP TSG-RAN Meeting #86, Sitges, Barcelona, Dec. 9-12, 2019, Source: CMCC, Verizon, Title: Study on enhancement of RAN Slicing.
RP-192601 3GPP TSG RAN Meeting #86, Sitges, Barcelona, Dec. 9-12, 2019, Document for: discussion, Agenda Item: 9.1.2.
RP-192599 3GPP TSG-RAN Meeting #86, Sitges, Barcelona, Dec. 9-12, 2019, Source: CMCC, Title: Second round email discussion for R17 proposals on slicing.
R3-171250 3GPP TSG-RAN WG3 #95bis, Spokane, USA, Apr. 3-7, 2017, Source: Huawei, Title: Slice Awareness of Availability during Mobility.
R2-1916170 3GPP TSG-RAN WG2 Meeting #108, Reno, USA, Nov. 17-22, 2019, Source: LG Electronics, Title: Access control for PRN.
R2-1916097 3GPP TSG-RAN WG2 Meeting #108, Reno, Nevada, US, Nov. 18-22, 2019, Source: vivo, Title: Consideration on Network identifier for SNPN.
R2-1915989 3GPP TSG-RAN WG2 Meeting #108, Reno, USA, Nov. 18-22, 2019, Source: CMCC, Title: Cell selection and reselection for NPN.
R2-1915957 3GPP TSG-RAN WG2 Meeting #108, Reno, USA, Nov. 18-22, 2019, Source: Huawei, HiSilicon, Title: General considerations on idle and inactive mode for NPN.
R2-1915807 3GPP TSG-RAN WG2 Meeting #108, Reno, USA, Nov. 18-22, 2019, Source: Qualcomm Incorporated, Title: Views on cell reselection for CAGs.
R2-1915800 3GPP TSG-RAN WG2 Meeting #108, Reno, USA, Nov. 18-22, 2019, Source: Rapporteur (Qualcomm Incorporated), Title: Running 38.304 CR for PRN.
R2-1915788 3GPP TSG-RAN WG2 Meeting #108, Reno, US, Nov. 18-22, 2019, Source: Qualcomm Incorporated (rapporteur), Title: Report for email discussion [107bis#64][PRN] Suitable and acceptable NPN cells (Qualcomm).
R2-1915739 3GPP TSG-RAN WG2 Meeting #108, Reno, Nevada, USA, Nov. 18-22, 2019, Source: Intel Corporation, Title: Further considerations on mobility for CAG.
R2-1915384 3GPP TSG-RAN WG2 Meeting #108, Reno, USA, Nov. 18-22, 2019, Source: Nokia, Nokia Shanghai Bell, Title: Network and cell (re)selection in SNPN access mode.
R2-1915089 3GPP TSG-RAN WG2 Meeting #108, Reno, USA, Nov. 18-22, 2019, Source: ZTE Corporation, Sanechips, Title: Consideration on the PCI Range.
R2-1914732 3GPP TSG RAN WG2 Meeting #108, Reno, Nevada, USA, Nov. 18-22, 2019, Source: Intel Corporation, Title: Access Control for SNPN and CAG.
R2-1914626 3GPP TSG-RAN WG2 Meeting #108, Reno, USA, Nov. 18-22, 2019, Source: Ericsson, Title: Cell Selection and Reselection aspects of NPN.
R2-1914439 3GPP TSG-RAN WG2 Meeting #108, Reno, USA, Nov. 18-22, 2019, Source: CATT, Title: Open Issues for Cell Selection and Reselection of NPN cell.
Official Document NG. 116—Generic Network Slice Template, Version 1.0, May 23, 2019, Copyright © 2019 GSM Association.
3GPP TS 38.331 V15.7.0 (Sep. 2019), Technical Specification, 3rd Generation Partnership Project; Technical Specification Group Radio Access Network; NR; Radio Resource Control (RRC) protocol specification (Release 15).
3GPP TS 38.321 V15.8.0 (Dec. 2019), Technical Specification, 3rd Generation Partnership Project; Technical Specification Group Radio Access Network; NR; Medium Access Control (MAC) protocol specification (Release 15).
3GPP TS 38.304 V15.6.0 (Dec. 2019), Technical Specification, 3rd Generation Partnership Project; Technical Specification Group Radio Access Network; NR; User Equipment (UE) procedures in Idle mode and RRC Inactive state (Release 15).
3GPP TS 38.300 V16.0.0 (Dec. 2019), Technical Specification, 3rd Generation Partnership Project; Technical Specification Group Radio Access Network; NR; NR and NG-RAN Overall Description; Stage 2 (Release 16).
3GPP TS 38.101-2 V16.1.0 (Sep. 2019), Technical Specification, 3rd Generation Partnership Project; Technical Specification Group Radio Access Network; NR; User Equipment (UE) radio transmission and reception; Part 2: Range 2 Standalone (Release 16).
3GPP TS 38.101-1 V16.1.0 (Sep. 2019), Technical Specification, 3rd Generation Partnership Project; Technical Specification Group Radio Access Network; NR; User Equipment (UE) radio transmission and reception; Part 1: Range 1 Standalone (Release 16).
Holma et al., "5G Technology 3GPP New Radio", © 2020 JohnWiley & Sons Ltd.

\* cited by examiner

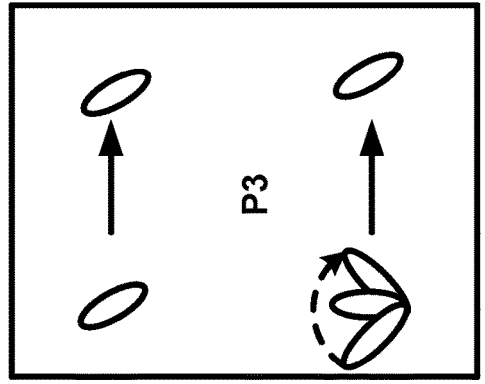
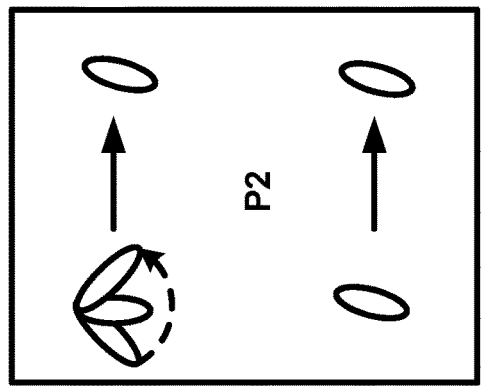
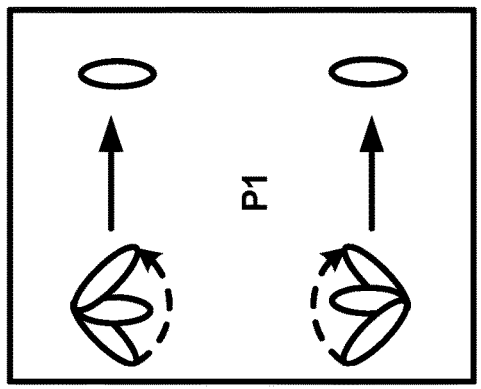
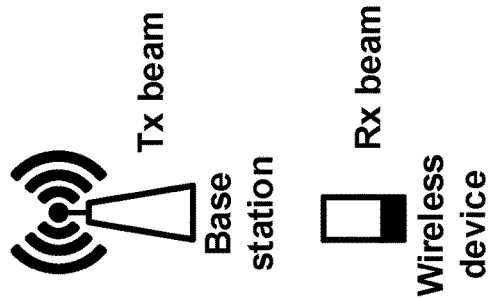
FIG. 12A
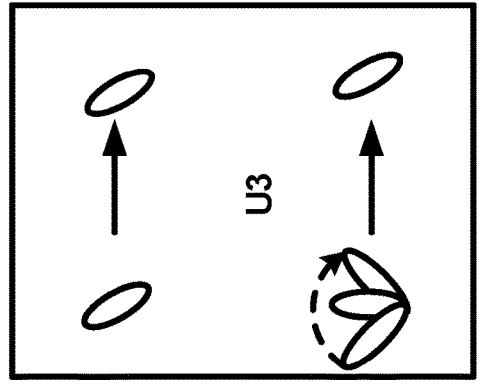
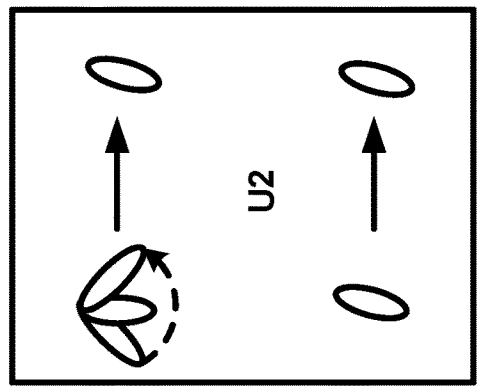
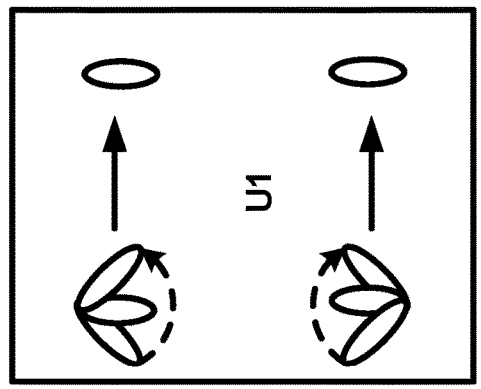
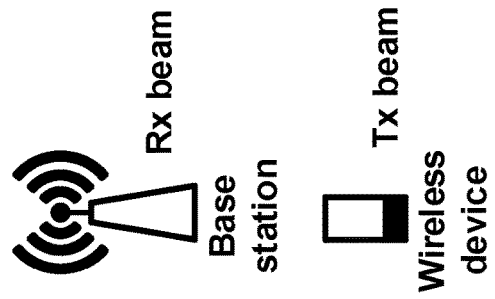
FIG. 12B

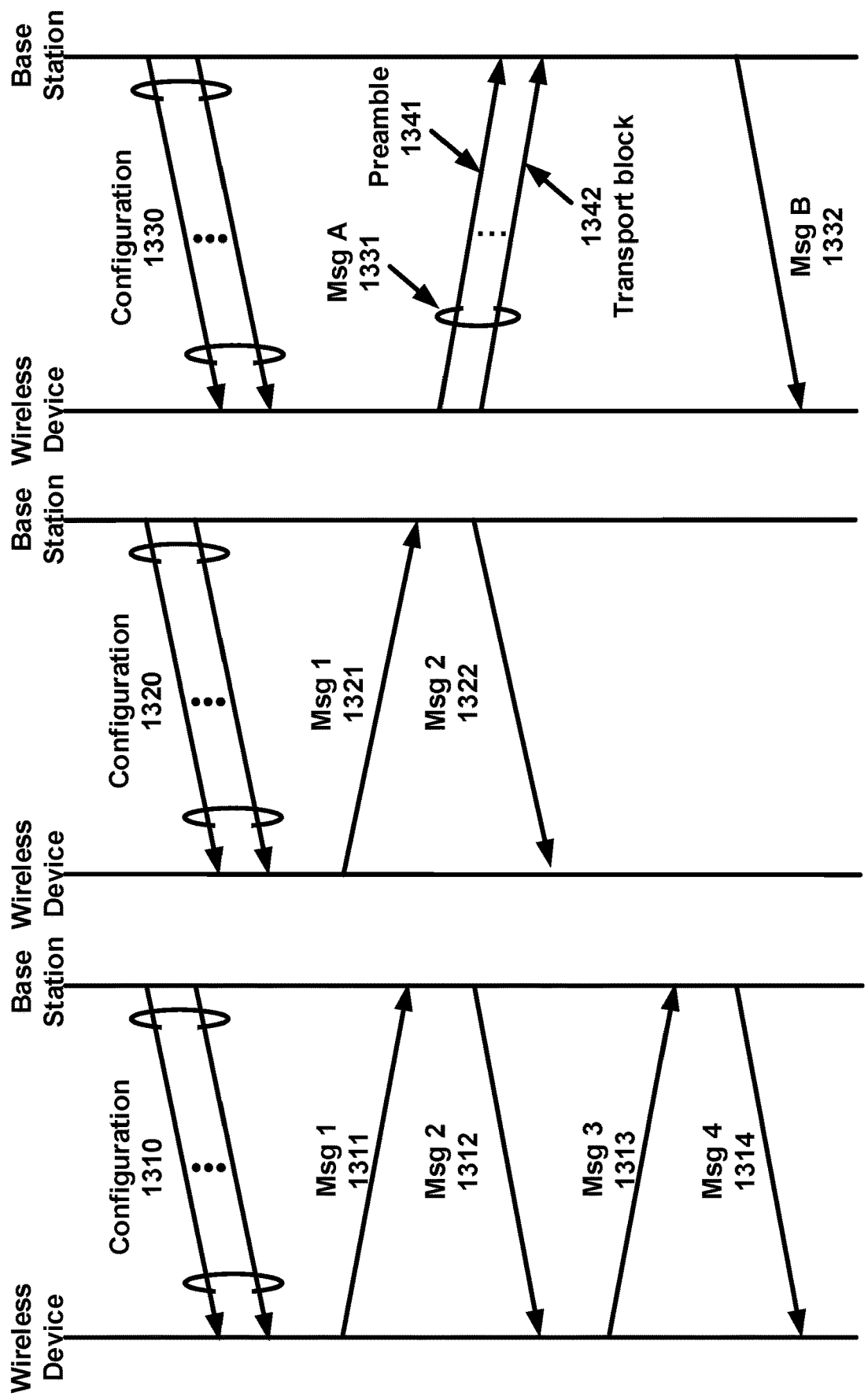

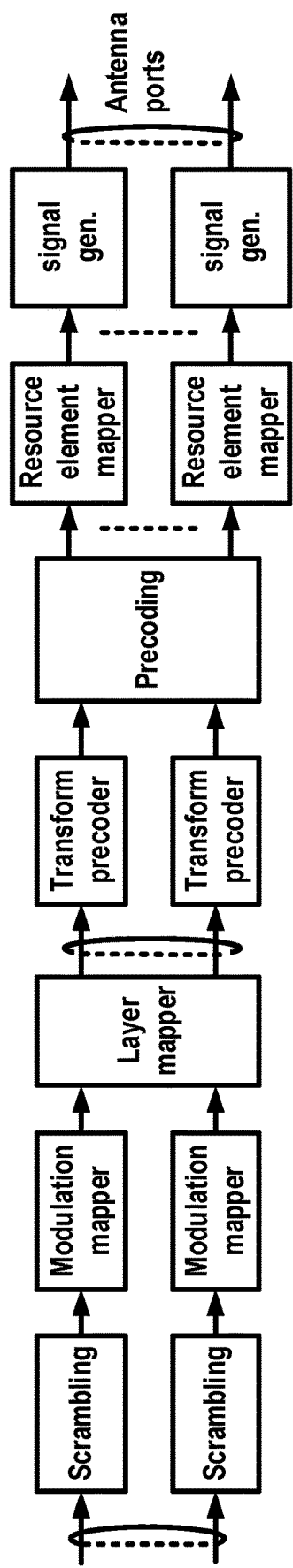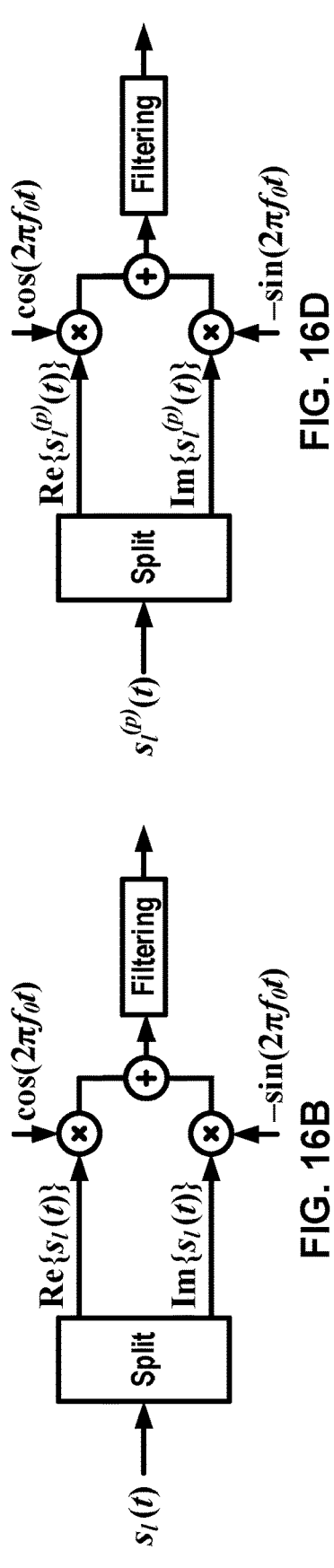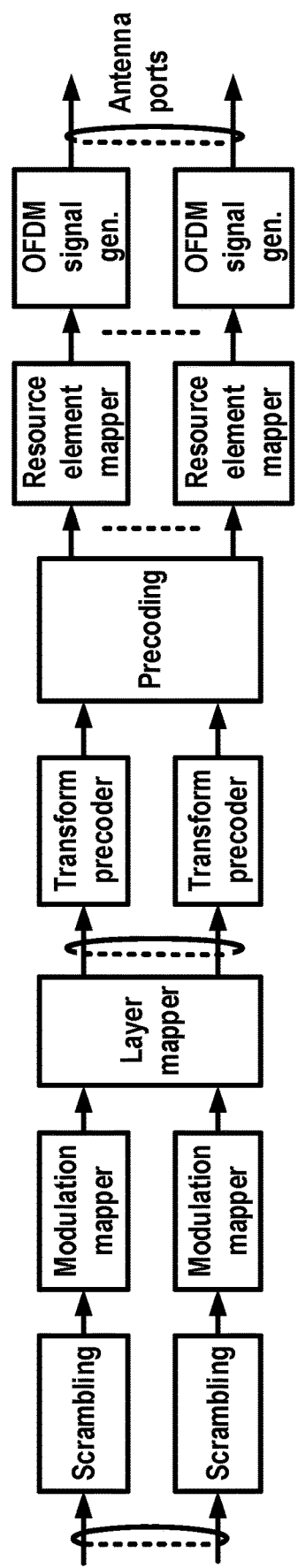
FIG. 16A
FIG. 16B
FIG. 16C
FIG. 16D

CELL SELECTION FOR WIRELESS COMMUNICATIONS

CROSS-REFERENCE TO RELATED APPLICATIONS

This application is a continuation of and claims priority to U.S. patent application Ser. No. 17/174,539, filed Feb. 12, 2021, which claims the benefit of U.S. Provisional Application No. 62/976,046, filed on Feb. 13, 2020, each of which is hereby incorporated by reference in its entirety.

BACKGROUND

Wireless devices communicate with the network and/or base stations via cells. Wireless devices perform cell selection for communication via one or more cells.

SUMMARY

The following summary presents a simplified summary of certain features. The summary is not an extensive overview and is not intended to identify key or critical elements.

A cell may be determined/selected for wireless communications based on one or more criteria, such as a quality of a received signal (e.g., received power) and/or a configuration (e.g., frequency range(s) of the cell and/or of the base station). A wireless device may communicate using certain wireless resources (e.g., network slice(s) and/or any other wireless resources) that may require a particular configuration of a cell (e.g., frequency range(s)) of communication link(s) in the cell). Cell selection based on only a quality of a received signal (e.g., received power) may lead to a wireless device selecting a cell that does not sufficiently serve a particular requirement of the wireless device. Cell selection may be improved by determining whether a cell has a configuration that is capable of serving certain wireless resources associated with a wireless device before that cell is selected. For example, a wireless device may select a cell based on whether a communication link in the cell (e.g., a normal uplink, a supplementary uplink, a downlink, and/or any other link) has a configuration (e.g., operates within certain frequency range(s)) that supports use of certain wireless resources (e.g., network slices(s) and/or any other wireless resources) that may be required for use by the wireless device, such as for a particular service or communication.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

DETAILED DESCRIPTION

Figure 1A:
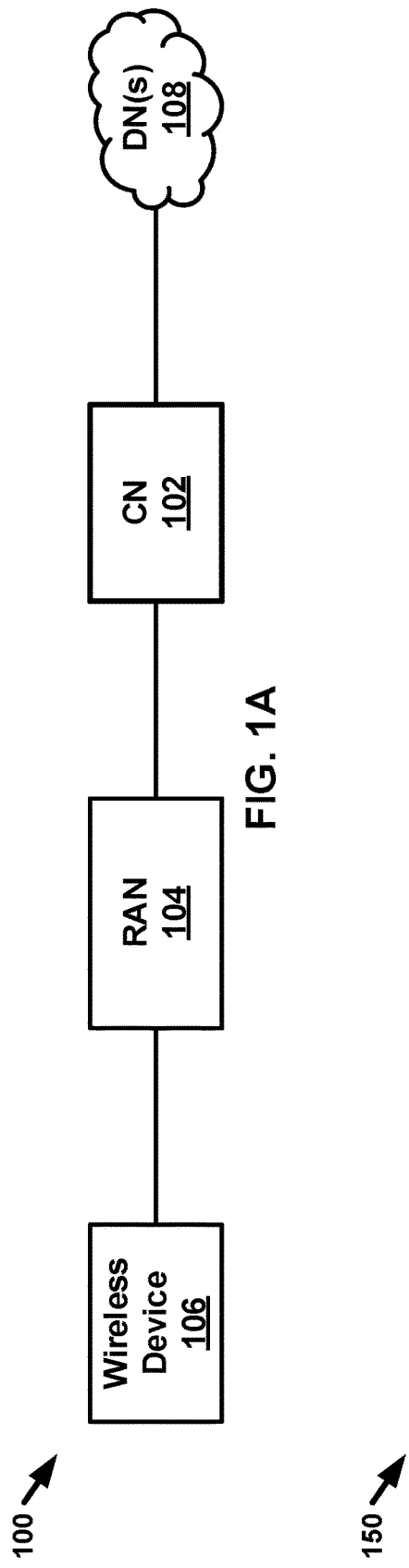
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to cell selection for wireless communications.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/ configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
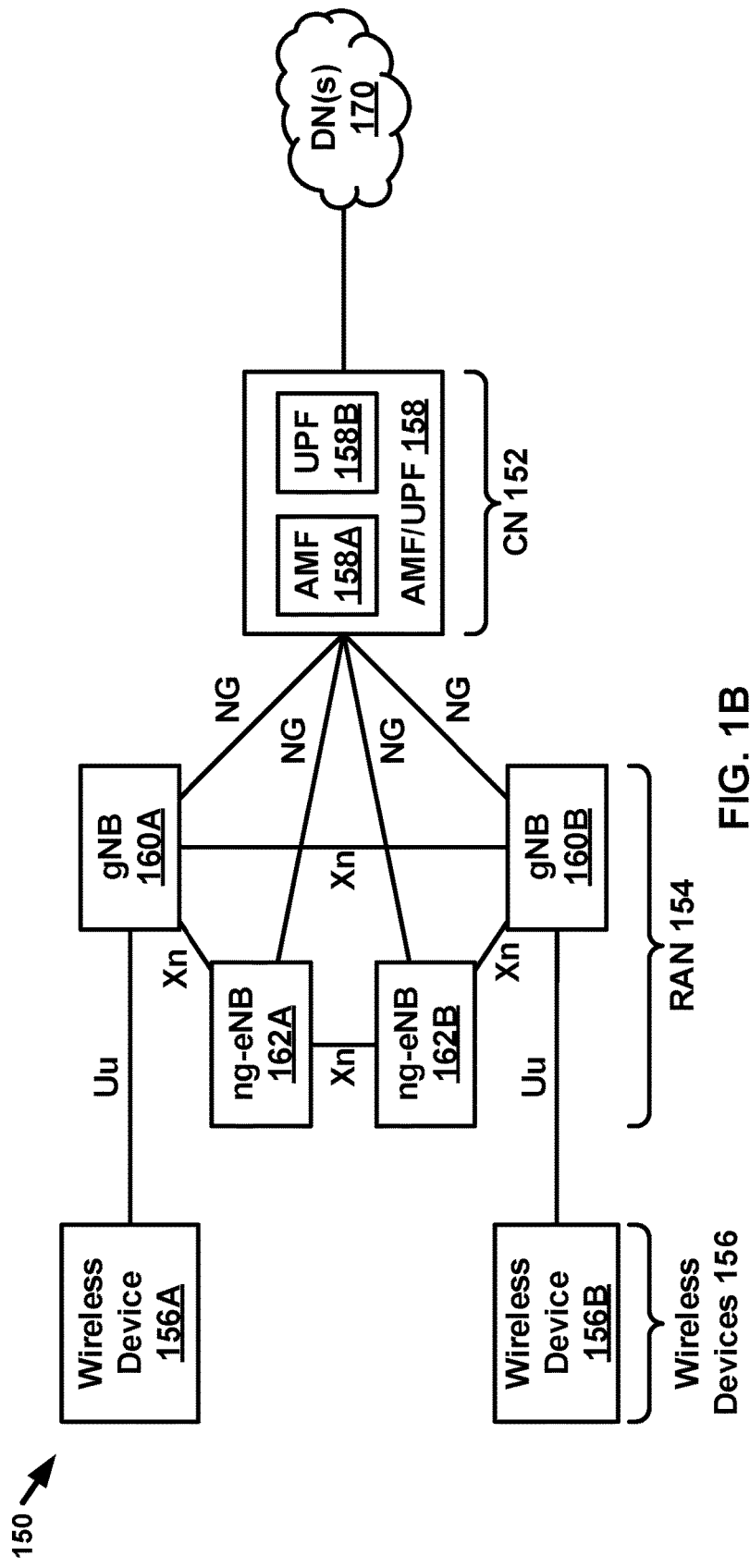

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s)

156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
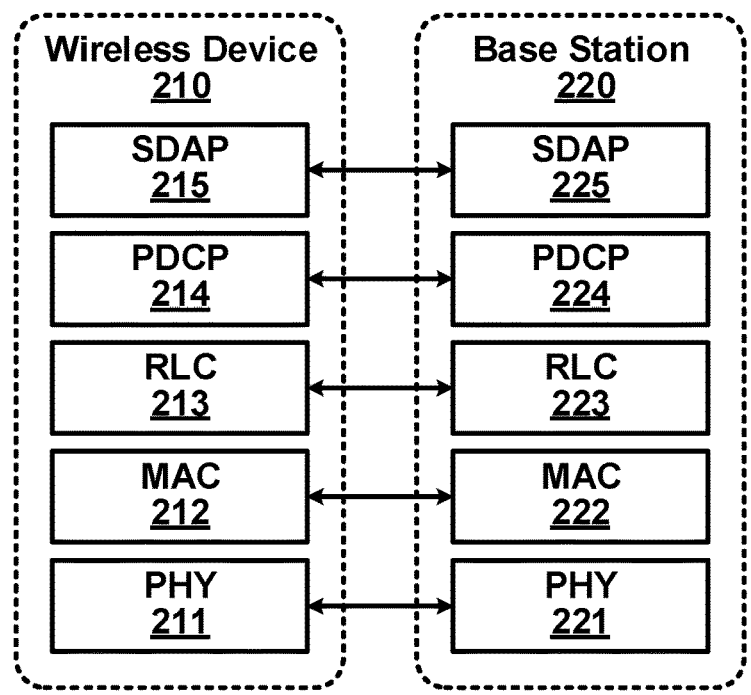
FIG. 2A shows an example user plane.
Figure 2B:
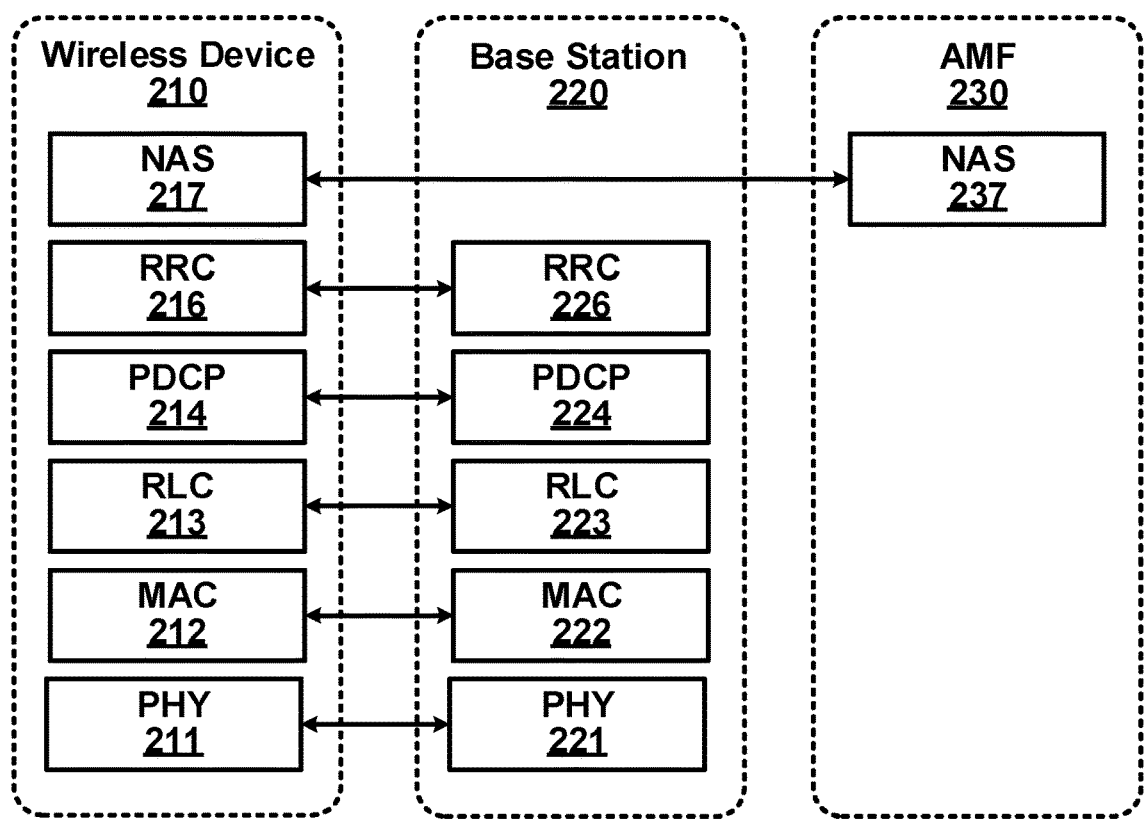
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
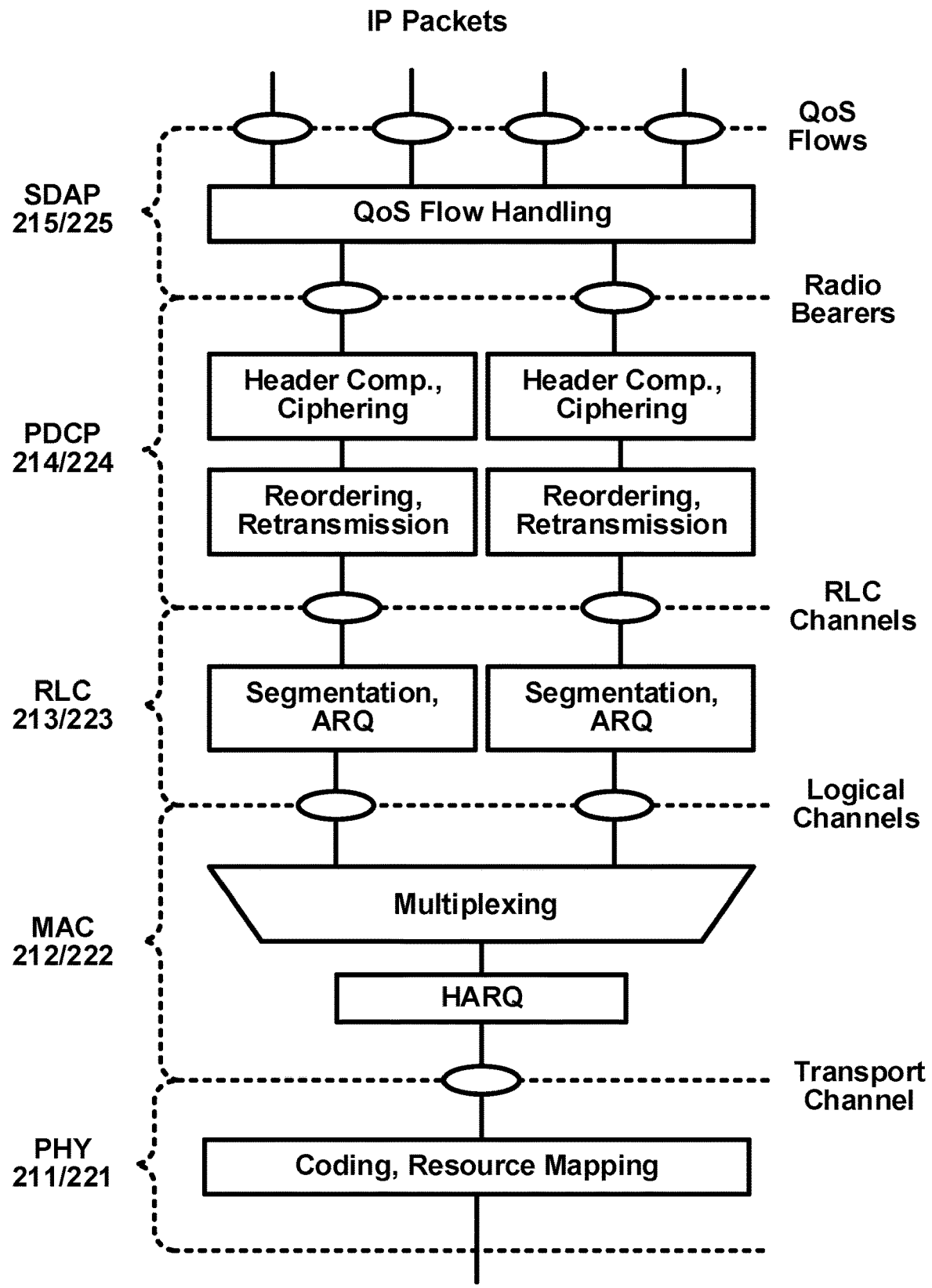
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MAC s 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
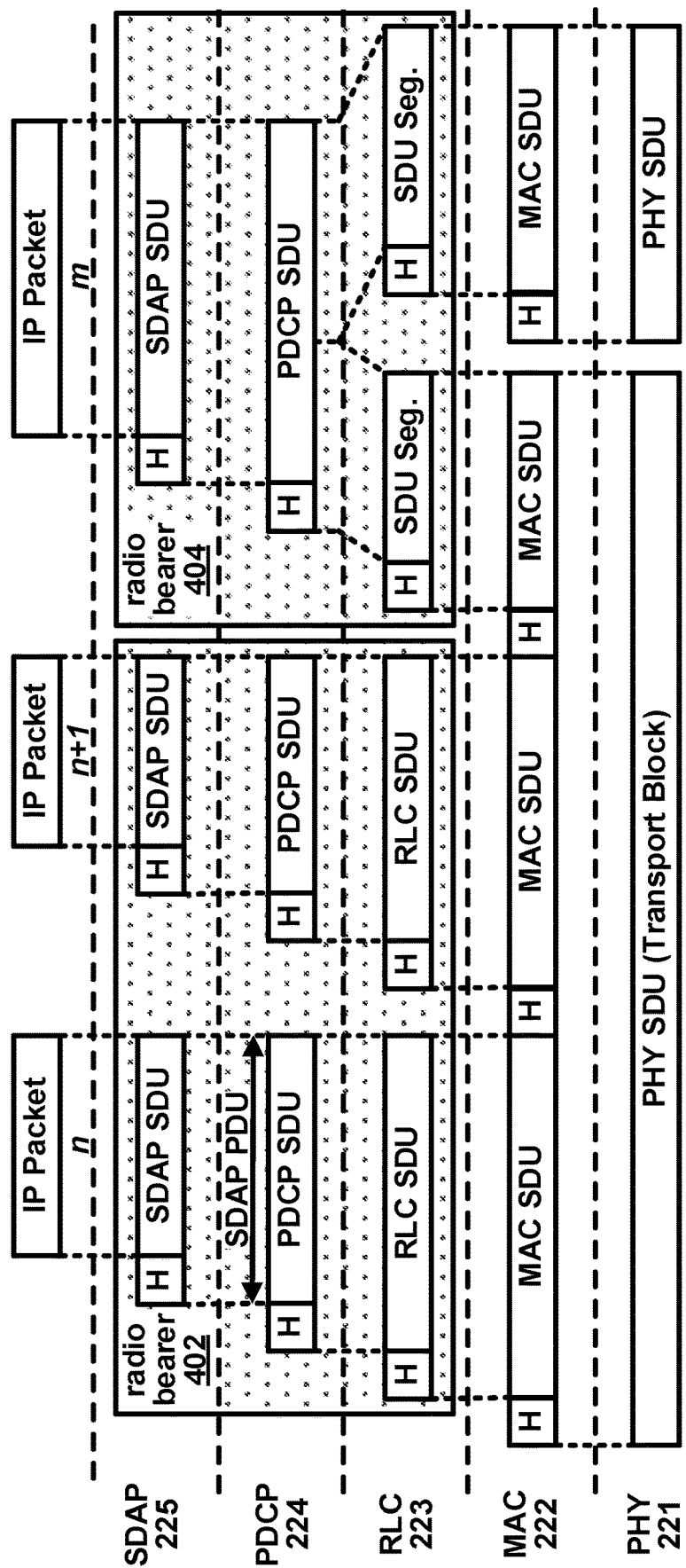
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
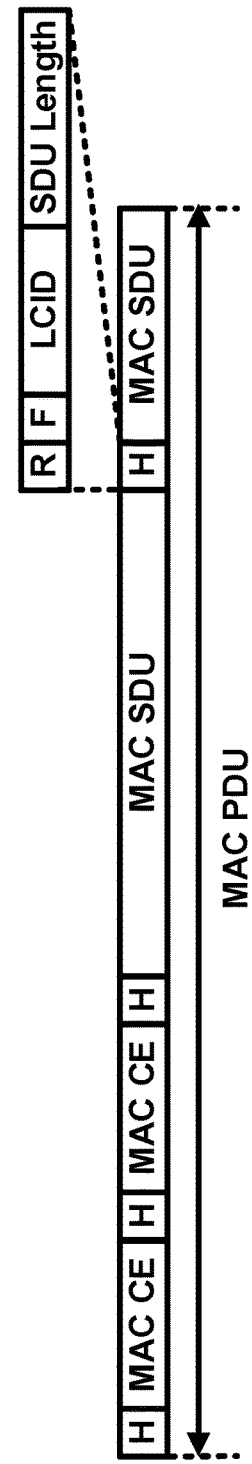
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
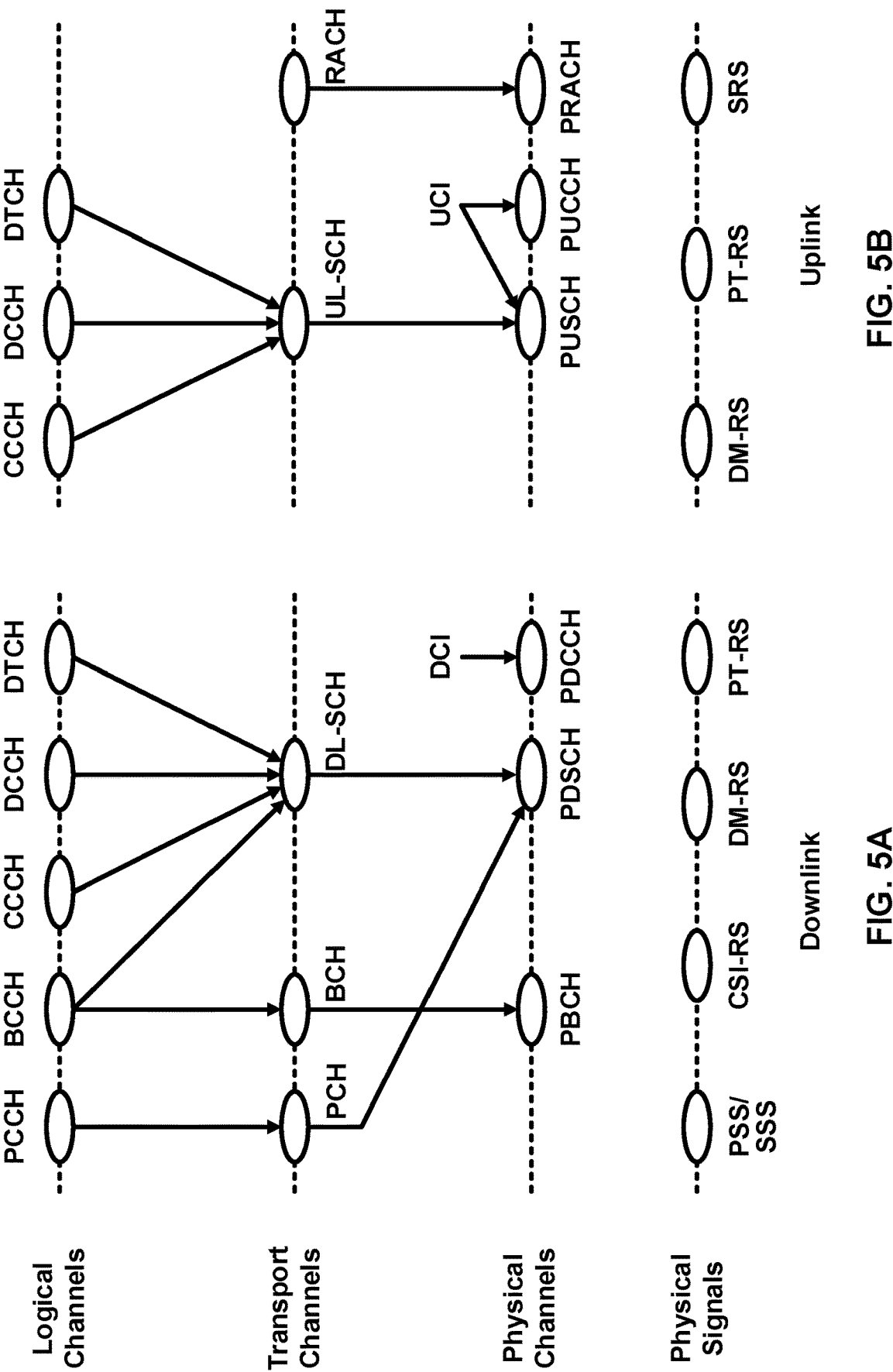
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIB s from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
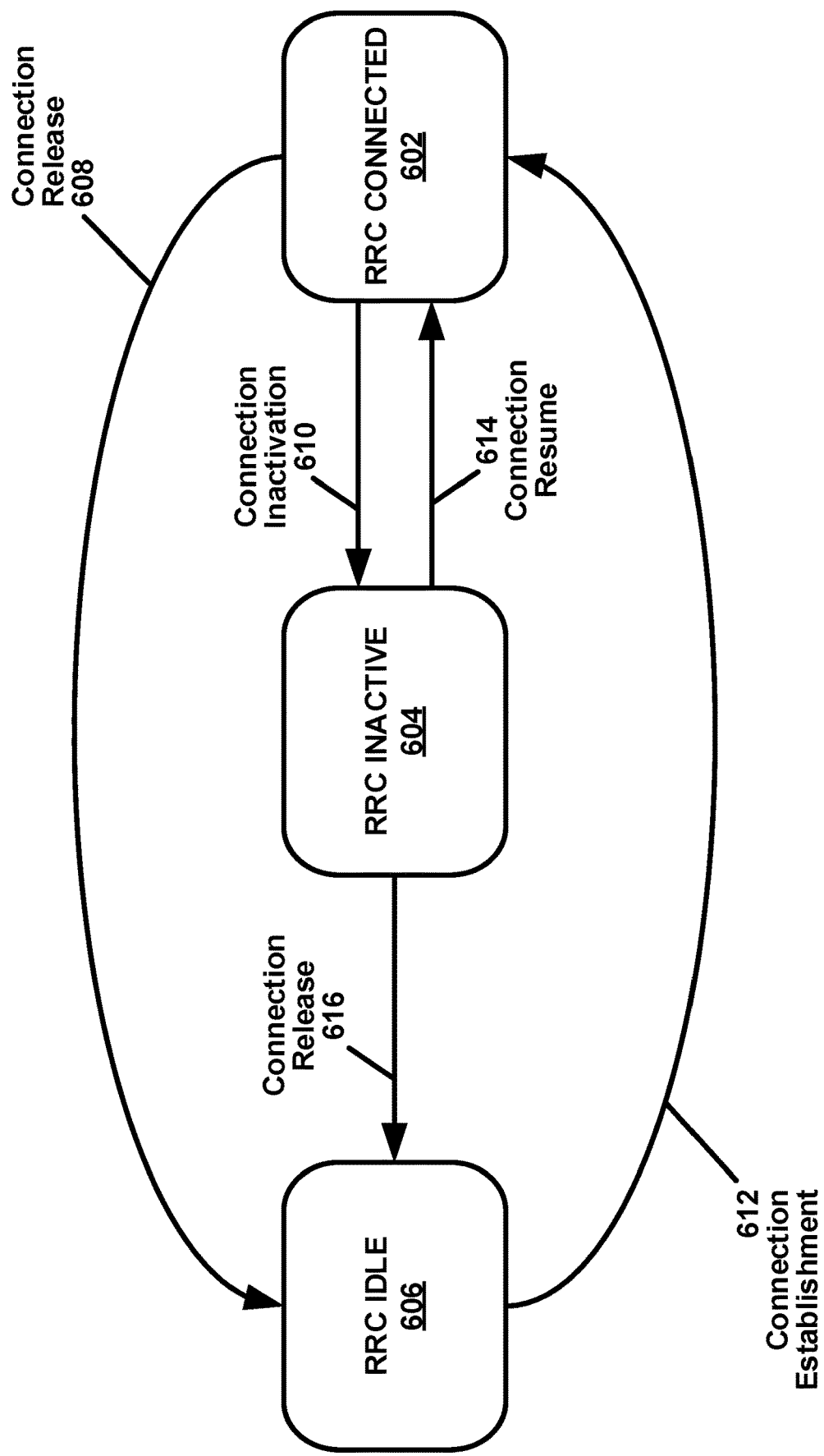
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
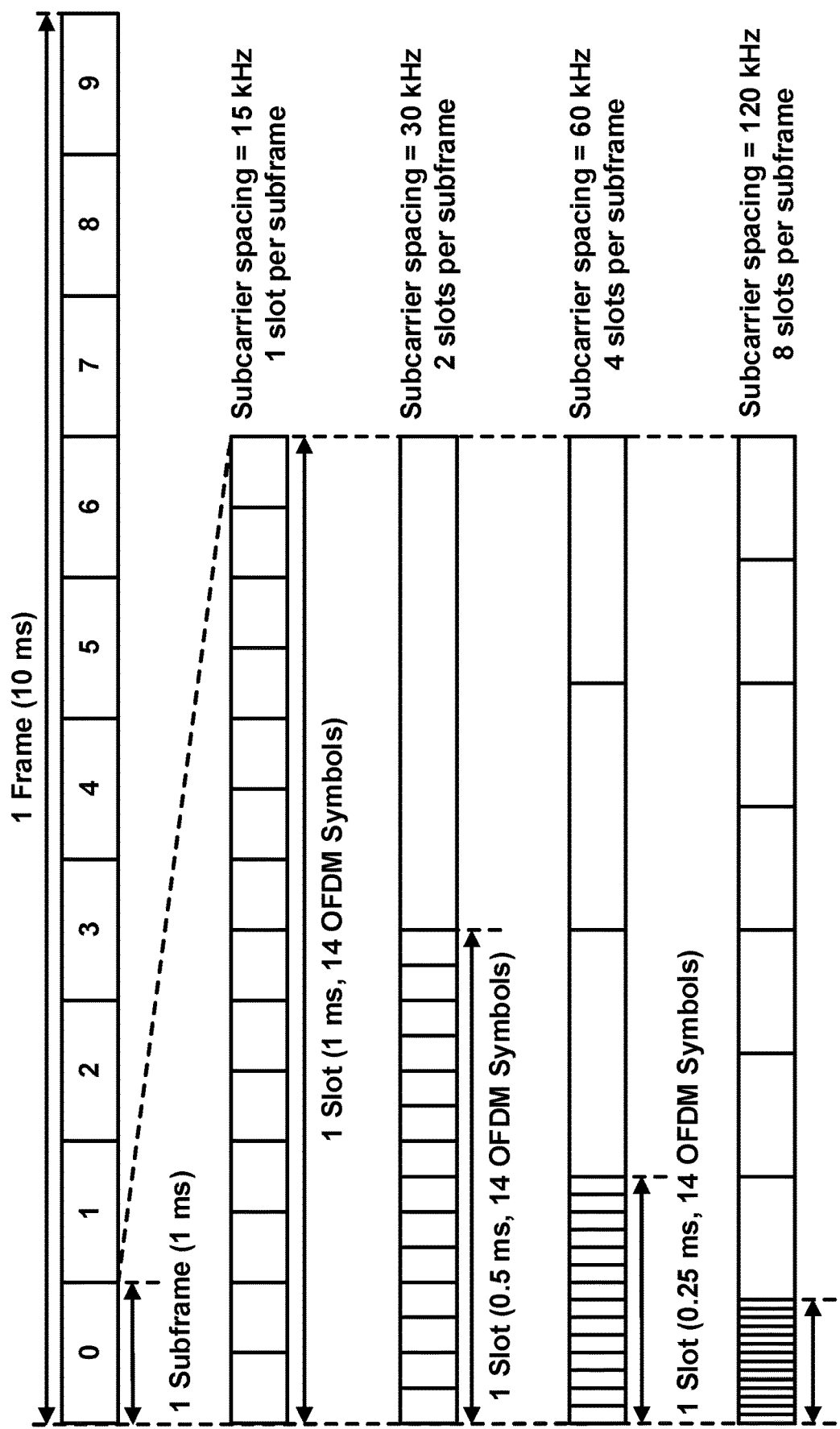
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
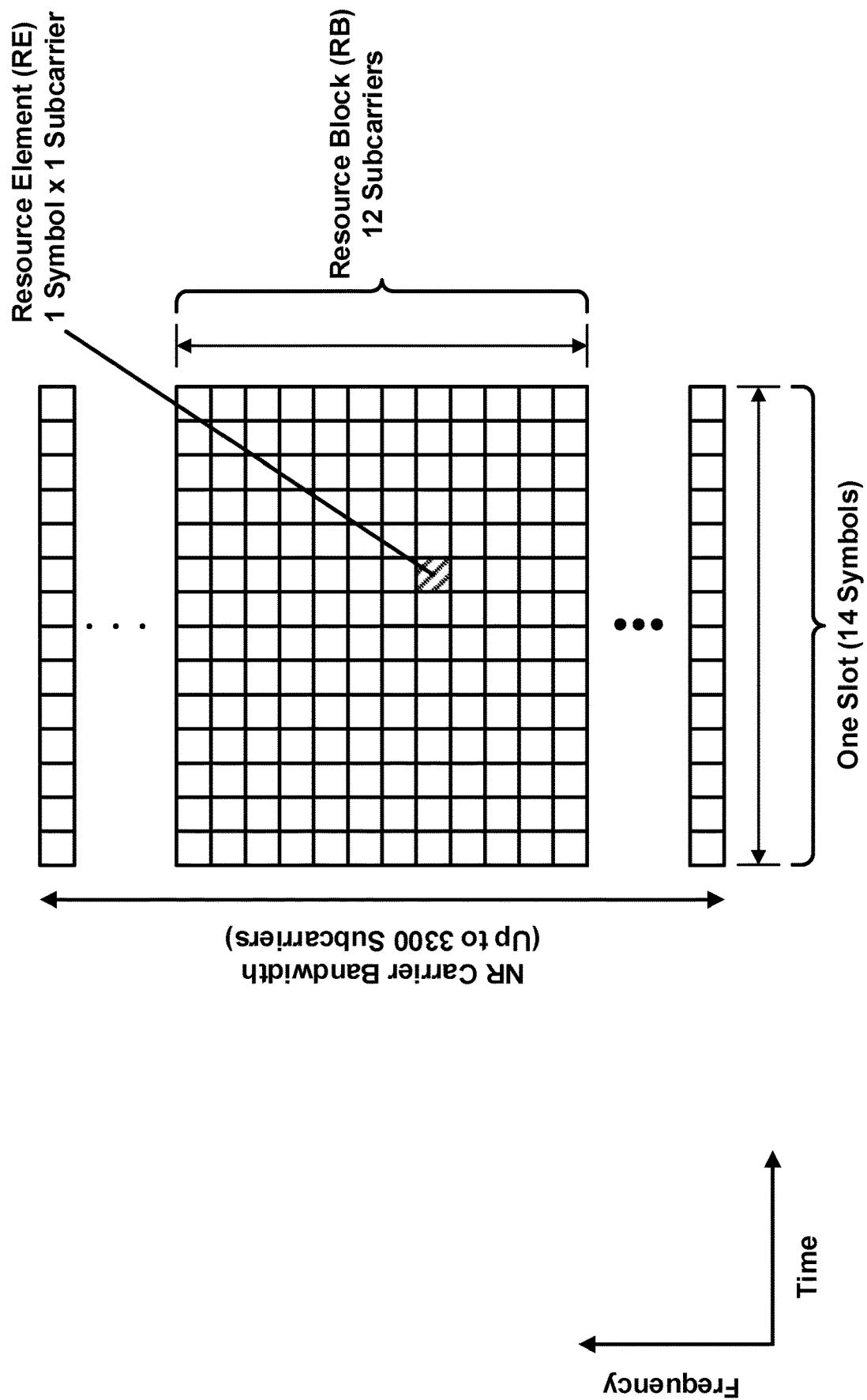
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
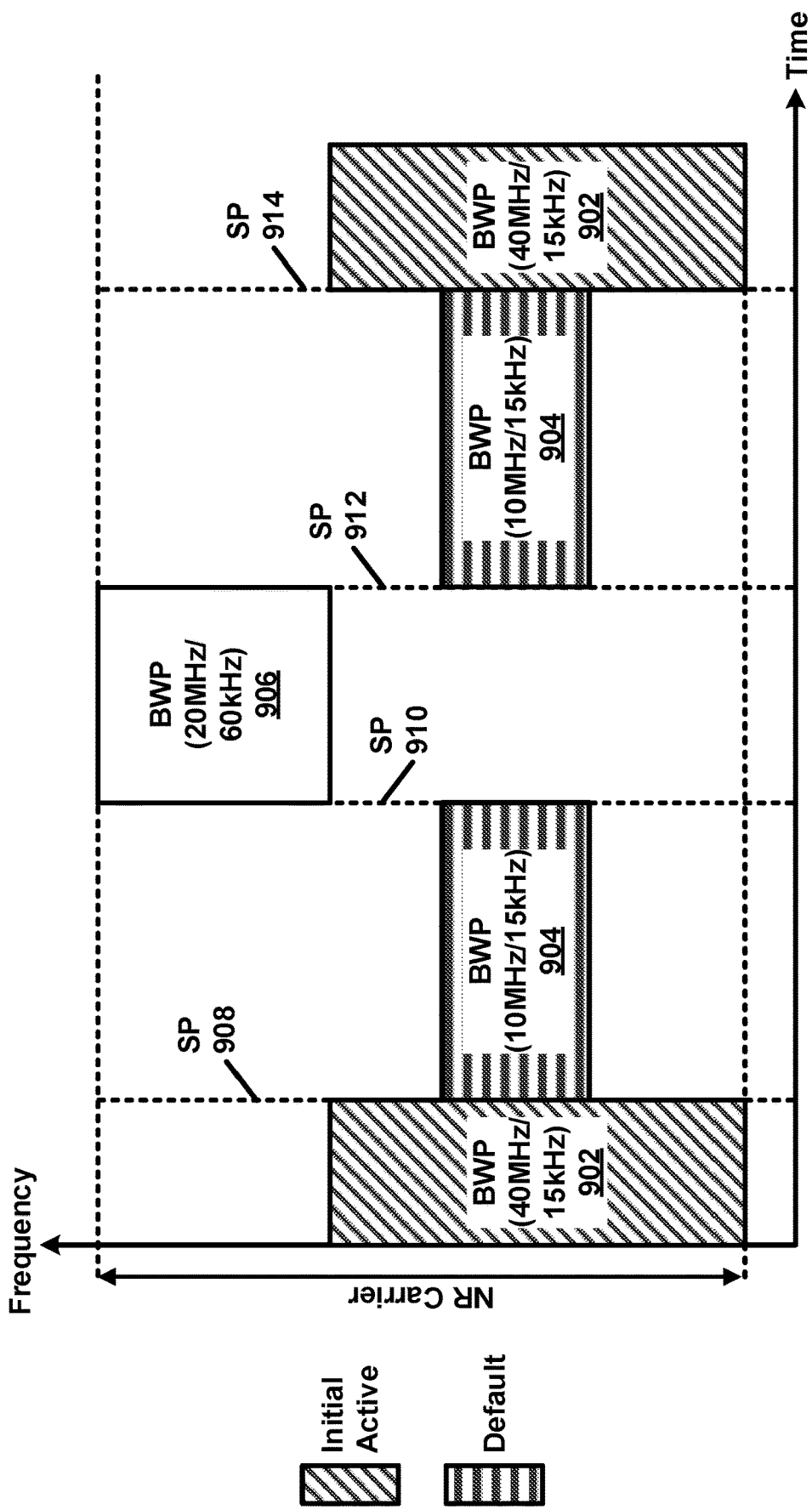
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
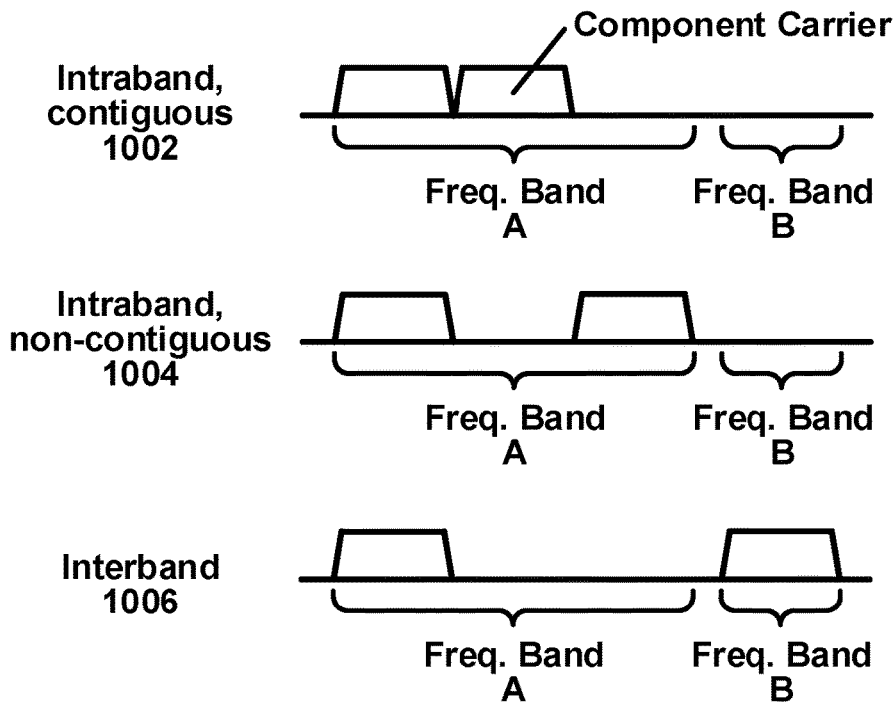
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
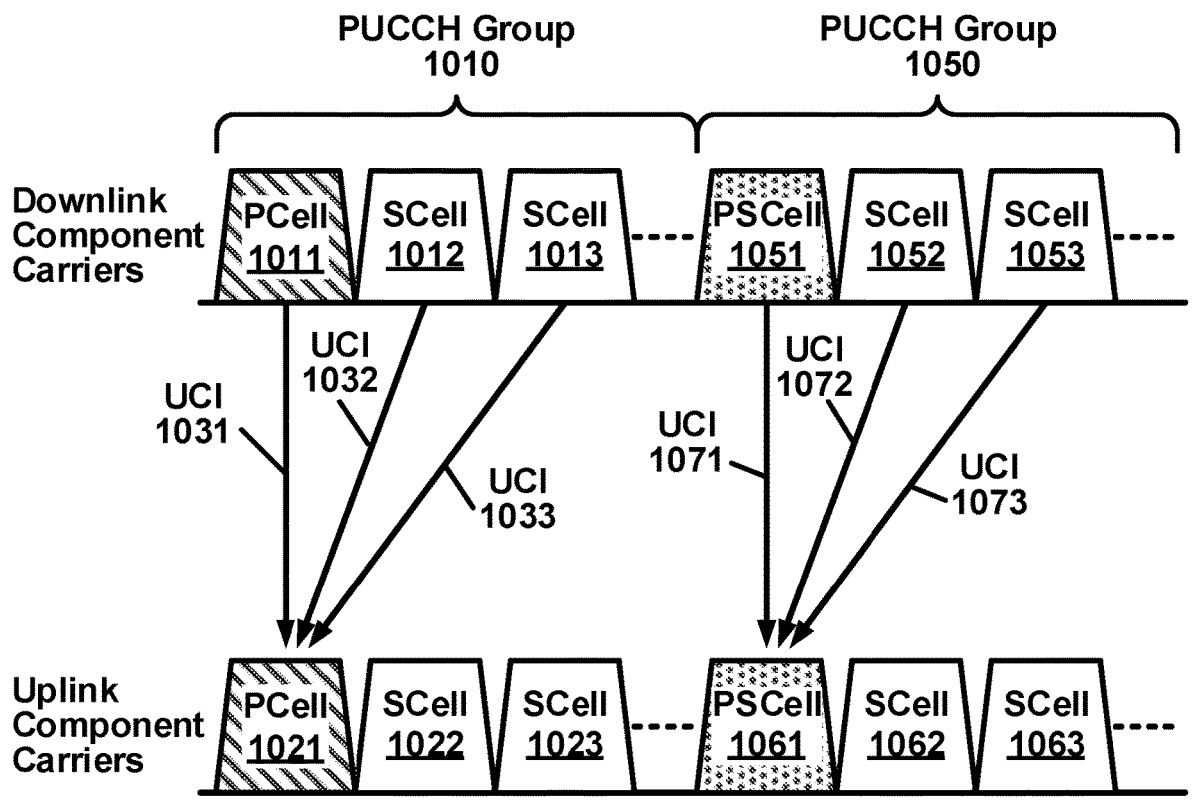
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
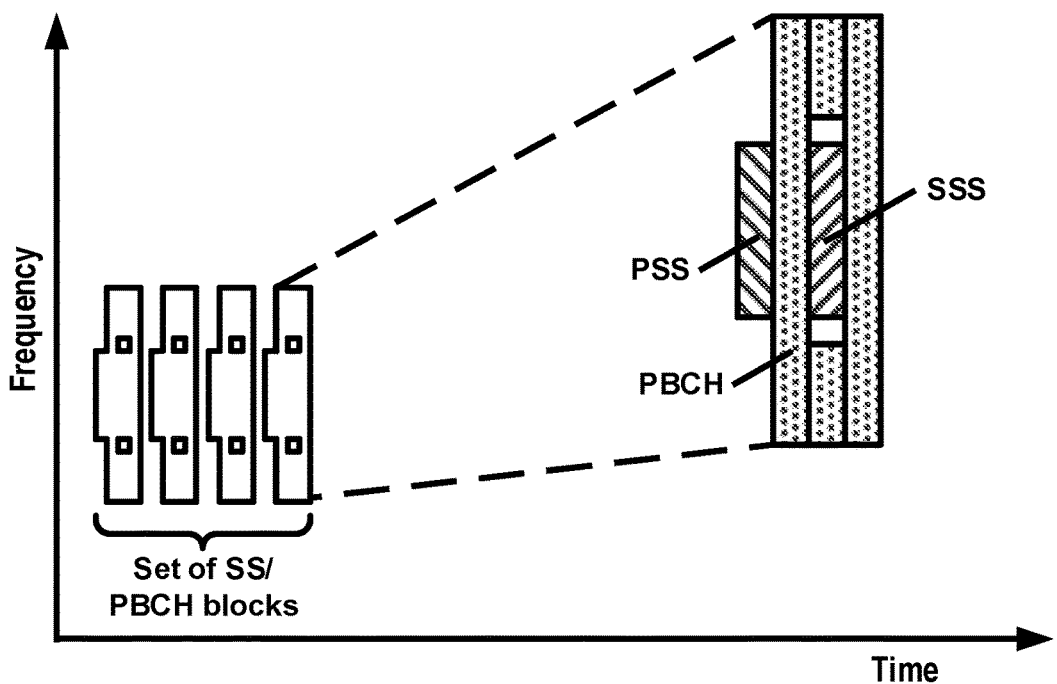
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/ employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/ confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
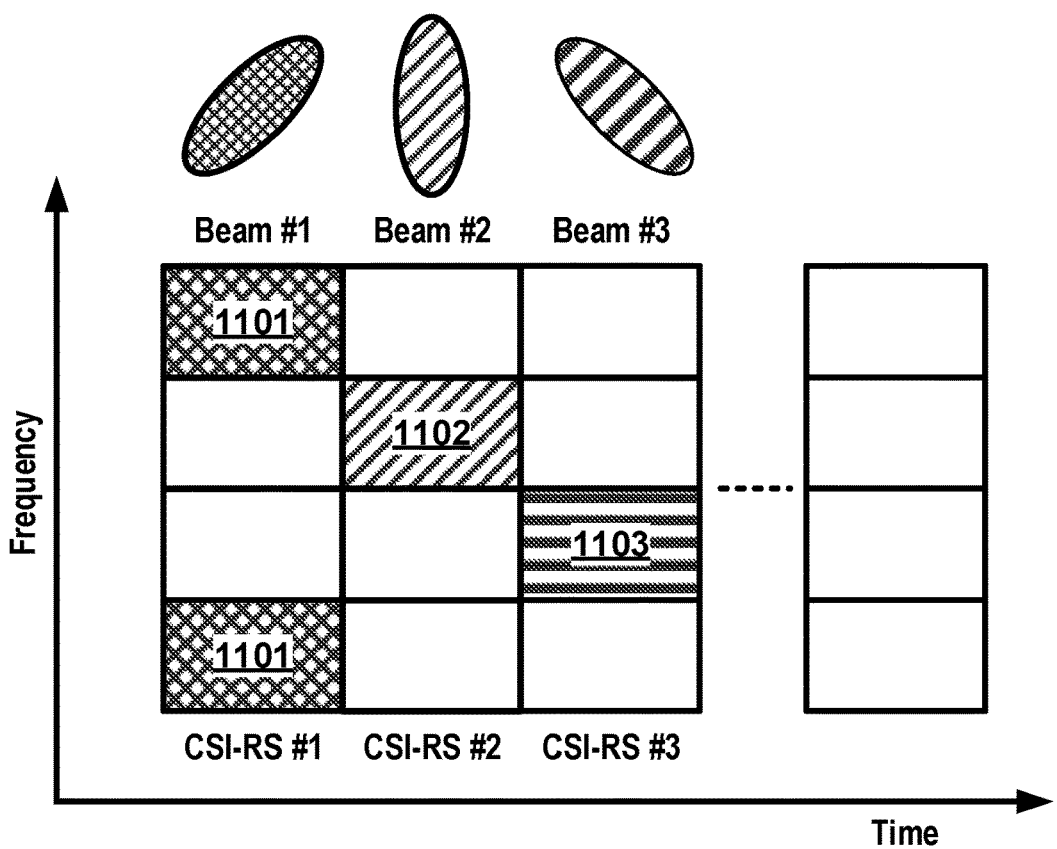
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counterclockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counterclockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIB s) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplementary uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), fid may be an index of the PRACH occasion in the frequency domain (e.g., 0≤fid<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
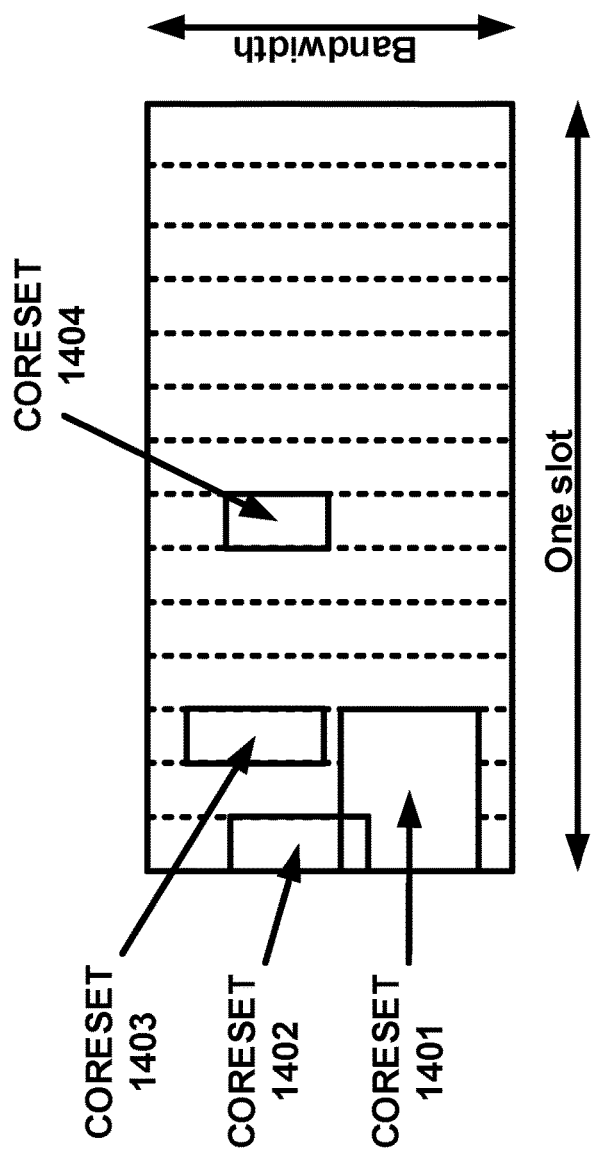
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
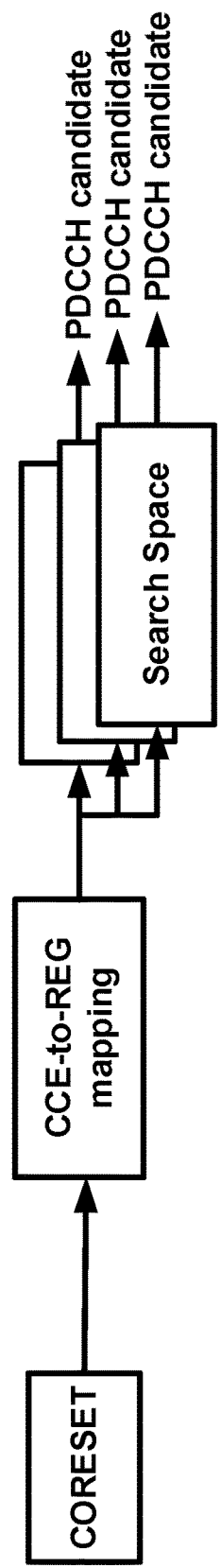
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
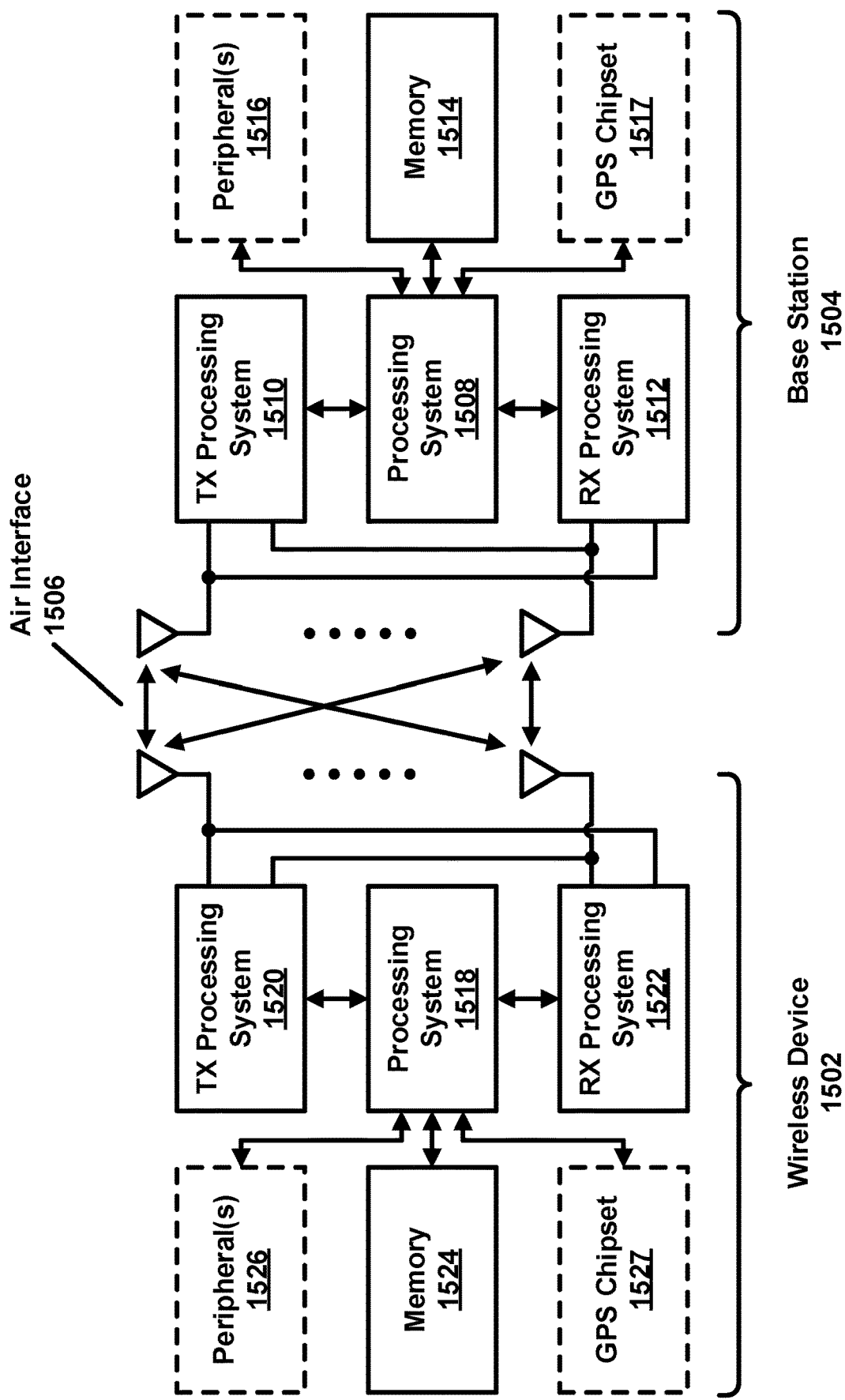
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
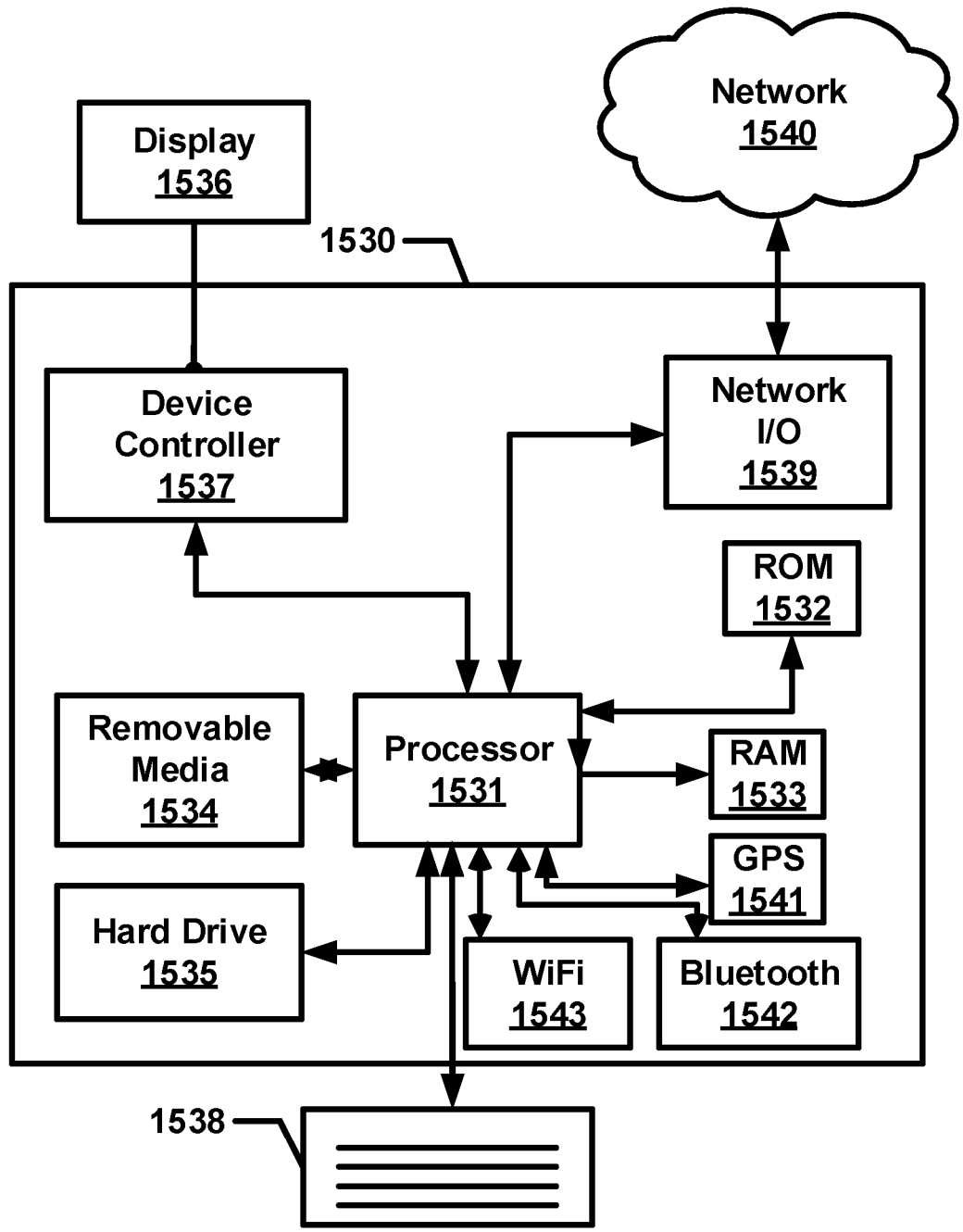
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless communications may use one or more frequency ranges. A communication system may be configured for one or more frequency ranges. For example, frequency ranges may comprise at least a first frequency range 1 (FR1) (e.g., 410 MHz-7125 MHz) and/or a second frequency range (FR2) (e.g., 24250 MHz-52600 MHz). Any quantity of frequency ranges may be used (e.g., FR3, FR4, etc.). A frequency range may comprise any range/band of frequencies (e.g., 100 MHz, 1 GHz, 10 GHz, etc.) For example, a radio spectrum for a communication system (e.g., 5G, 6G, or any other communication system) may be more than ten times wider than the radio spectrum for another communication system (e.g., 4G, 3G, and/or any other communication system). At least some operational spectrum bands (e.g., practical operational spectrum bands) of a communication system (e.g., 4G, 3G, and/or any other communication system) may be less than 3 GHz (or any other frequency) in at least some (or many, or most) regions. As described further herein, a range of frequencies (e.g., a wide range of frequencies) may be used/configured/managed in an efficient manner for one or more communication systems (e.g., 2G, 3G, 4G, 5G, 6G, and/or any other communication system, and/or any spectral frequencies).

Wireless communications may comprise using one or more wireless resources. Wireless resources may comprise one or more of a time, frequency, code, and/or any other resource. A radio spectrum may support a plurality of resources and/or a plurality of types of resources, such as a network slice and/or any other resource. While various examples herein may refer to a network slice, or network slices, the examples herein may be used with any type of wireless resource(s). A wireless resource may comprise a portion of a network, a portion of bandwidth, communications, a portion of resources for a type of communications, a network slice, etc. Although network slice may be used herein, one skilled in the art readily recognizes that any type of wireless resource may be applied to the concepts described herein. A specific frequency band, or bands, may be used to access a specific network slice(s) and/or another type of a specific resource. For example, a wireless resource for a first service (e.g., a network slice for an eMBB service, or eMBB slice) may be supported in first frequency or frequency range (e.g., 2.6 GHz and/or 4.9 GHz, and/or any other frequency or range of frequencies). A wireless resource for a second service (e.g., a network slice for a URLLC service, or a URLLC slice) may be supported in a second frequency or frequency range (e.g., 4.9 GHz and/or any other frequency or range of frequencies). A lower frequency band (or bands) may be used for a first type(s) of service (e.g., for IoT and/or any other service(s)) while a higher frequency band (or bands) may be used for a second type(s) of service (e.g., for eMBB service(s) and/or any other service(s)). A combination of spectrum bands and wireless resources (e.g., network slices) may be used by operators requiring a service isolation/management and/or a high (e.g., maximum) use of spectrum bands that may be available for a communication system.

One or more configurations may be required for using a wireless resource. Determination of a RAT/frequency selection priority (RFSP) index may require considering, or taking into account, an allowed NSSAI or other identifier (e.g., for network slicing). A wireless device may select a RAN node (e.g., a proper RAN node). A communication system, and/or a particular deployment, may comprise a RAN node 1 supporting a first type of information/service (e.g., IoT S-NSSAI) in a first frequency or range of frequencies (e.g., 4.9 GHz or any other frequency or range of frequencies) and a RAN node 2 supporting a second type of information/service (e.g., eMBB S-NSSAI) in a first frequency or range of frequencies (e.g., 2.6 GHz or any other frequency or range of frequencies). A wireless device may select/determine a RAN node without knowing/determining which RAN node supports which type of information/service (e.g., which S-NSSAI). For example, a wireless device may select (e.g., camp on) RAN node 1 and send a registration request message (e.g., including eMBB S-NSSAI in a requested NSSAI). The wireless device may make such a selection based on one or more criteria (e.g., received power, interference indication, cell priority, carrier frequency priority, area restriction, PLMN, closed subscriber group (CSG), closed access group (CAG), etc.). However, the selected node (e.g., RAN node 1) may not serve the wireless device with a requested service (e.g., the eMBB network slice at the RAN node 1).

A network device may determine allowed information/resource(s) for a wireless device. For example, a network device (e.g., an AMF) may determine allowed information/resource(s) (e.g., NSSAI) based on a request (e.g., a requested NSSAI), wireless device subscription data, and/or information/resource(s) (e.g., S-NSSAIs) supported by a node (e.g., an access node, a RAN, a base station, agNB, and/or any other node) that a wireless device may be using (e.g., camping on) for communications. Allowed information/resource(s) (e/g., NSSAI) may be based on an allowed NSSAI comprising a list of S-NSSAI(s) in a requested NSSAI permitted based on subscribed S-NSSAIs. Allowed information/resource(s) (e/g., NSSAI) may be based on an allowed NSSAI comprising a list of S-NSSAI(s) for a serving PLMN which may be mapped to a HPLMN S-NSSAI(s) provided in mapping of a requested NSSAI permitted based on Subscribed S-NSSAIs. Allowed information/resource(s) (e/g., NSSAI) may be based on, if neither a requested NSSAI nor mapping of a requested NSSAI is/was provided or none of the S-NSSAIs in a requested NSSAI are permitted, S-NSSAI(s) marked as default in the subscribed S-NSSAIs and/or taking into account availability of network slice instances that are able to serve S-NSSAI(s) in the allowed NSSAI in current wireless device's tracking areas. Allowed information/resource(s) (e/g., NSSAI) may be based on an AMF learning S-NSSAIs supported per a TA by a node (e.g., a 5G-AN), for example, if nodes (e.g., 5G-AN nodes) establish or update an N2 connection with the AMF. One or more AMFs (e.g., per AMF set) may provide and/or update a network slice selection function (NSSF) with S-NSSAIs support per a TA. A node (e.g., a 5G-AN) may learn S-NSSAIs (e.g., per PLMN ID) from network devices (e.g., AMFs) it connects to support the nodes (e.g., 5G-AN nodes) that establish an N2 connection (e.g., with an AMF) or when a network device (e.g., an AMF) updates an N2 connection with the node (e.g., 5G-AN).

A network device may not allow information/resource(s) for a wireless device. For example, a network device (e.g., an AMF) may not allow a wireless device to use information/resource(s) (e.g., eMBB S-NSSAI) because that information/resource(s) (e.g., eMBB S-NSSAI) may not be supported by a node (e.g., a RAN node 1) and may provide default information/resource(s) (e.g., S-NSSAI in an allowed NSSAI) to the wireless device. An RFSP (e.g., set by a PCF) may be based on an allowed NSSAI (e.g., the default S-NSSAI), which may lead the wireless device to (re)select a cell supporting the default S-NSSAI. The wireless device may be able to access the default S-NSSAI afterward (e.g., even if the AMF could have provided eMBB S-NSSAI if the wireless device may be using/camping on another node, such as the RAN node 2). A node (e.g., a 5GC or any other node) may assist in selecting/determining a frequency band that may sufficiently support one or more wireless resources (e.g., network slices) that a wireless device may use/require for wireless communications. A radio spectrum supported by a wireless resource (e.g., a network slice) may be defined and/or restricted. A wireless devices may be restricted to one or more frequencies (or range(s) of frequencies) to be used for a wireless resource (e.g., a network slice). Limited frequencies may be used to access a wireless resource (e.g., a network slice). A wireless device may select/determine a frequency (or frequencies) that may be used to access one or more wireless resources (e.g., network slice(s)), for example, if an operator manages a different range of radio spectrums per resource (e.g., per network slice). A node/system (e.g., 5GS or any other node/system) may steer a wireless device to a specific frequency band or bands (e.g., to a 5G AN) that may support one or more wireless resources (e.g., network slices) that the wireless device may request/require (e.g., for wireless communications). A node/system (e.g., 5GS or any other node/system) may require information to determine/select a node (e.g., 5G-AN or any other node) for a wireless device. A wireless device may require information to select/determine a node (e.g., 5G-AN) for wireless communicating using a certain wireless resource(s) (e.g., network slice(s)).

Figure 17:
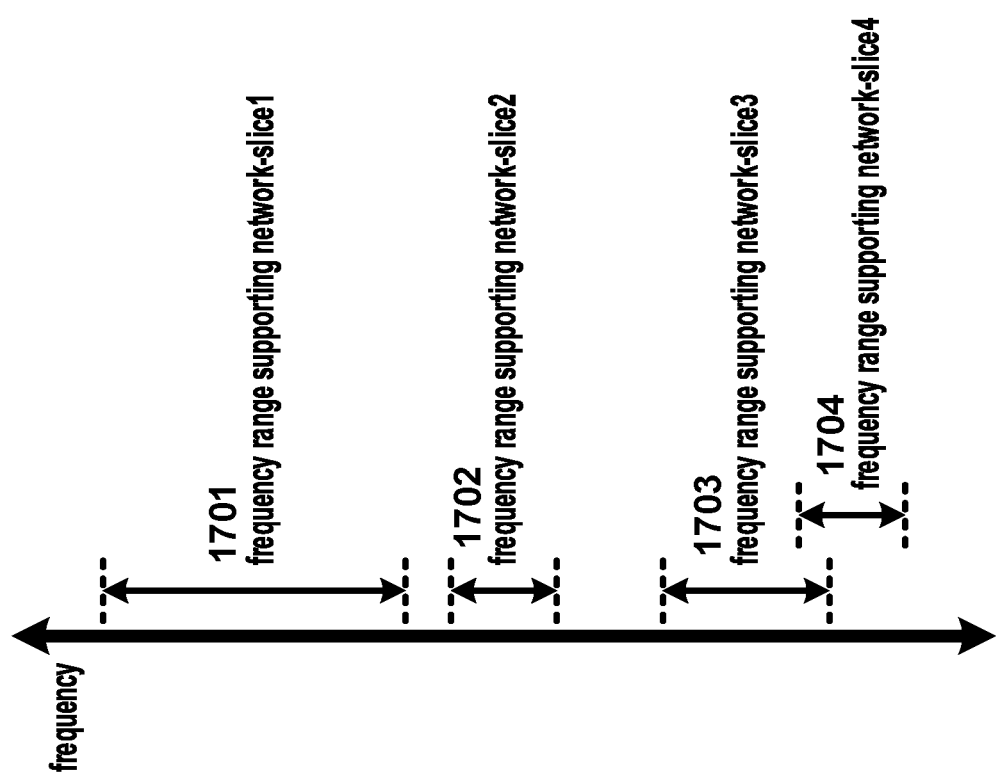
FIG. 17 shows an example of frequency ranges for wireless resources (e.g., network slices).

FIG. 17 shows an example of frequency ranges for wireless resources (e.g., network slices). Each frequency range may support one or more network slices. One or more frequencies, or frequency ranges, may be available (e.g., in a cell) for supporting a one or more communication links, such as a normal uplink (NUL), a supplemental uplink (SUL), any other uplink, a downlink, and uplink/downlink, and any other communication link. A first (e.g., high) frequency/frequency range (1701) may support a first network slice (e.g., network slice1). A second (e.g., mid-range) frequency/frequency range (1702) may support a second network slice (e.g., network slice2). A third (e.g., lower) frequency/frequency range (1703) may support a third network slice (e.g., network slice3). A fourth (e.g., low/lowest) frequency/frequency range (1704) may support a fourth network slice (e.g., network slice4). One or more frequencies/frequency ranges may be configured to overlap such that the frequency ranges may support one or more network slices in a plurality of frequencies/frequency ranges. For example, the third frequency/frequency range (1703) and the fourth frequency/frequency range (1704) may overlap, such that one or more of the frequencies/frequency ranges (1703 and/or 1704) may support a plurality of network slices (e.g., network slice3 and network slice4). Any quantity of frequencies/frequency ranges may be configured, in any frequency/frequency ranges, to support any quantity of network slices. A network slice may be restricted to at least one frequency range. A network slice may be associated with a service. For example, a network slice for a first service (e.g., an eMBB network slice) may be supported in a first frequency or a first range of frequencies (e.g., 2.6 GHz and/or 4.9 GHz, or any other frequency/frequency ranges). A network slice for a second service (e.g., a URLLC network slice) may be supported in a first frequency or a first range of frequencies (e.g., 4.9 GHz, or any other frequency/frequency ranges). Frequency ranges of different network slices may (or may not) overlap. A network slice (e.g., a URLLC network slice) may require a high frequency band to support a very low latency requirement (e.g., based on very small size slot). A network slice (e.g., an eMBB network slice) may require a high frequency band to support a very large throughput. A network slice (e.g., an IoT network slice and/or an mMTC network slice) may require a low frequency band to support a reliable communication with low power (e.g., based on good/low path loss, high robust radio channel, etc.). A network slice (e.g., a V2X network slice) may use a specific frequency band, which may be determined based on one or more requirements (e.g., based on a regulation such as indicated by the FCC, a government, a communication frequency regulation institute, etc.). Any quantity of network slices may require any quantity of characteristics (e.g., frequency/frequency band, throughput, latency, reliability, power, etc.).

Figure 18:
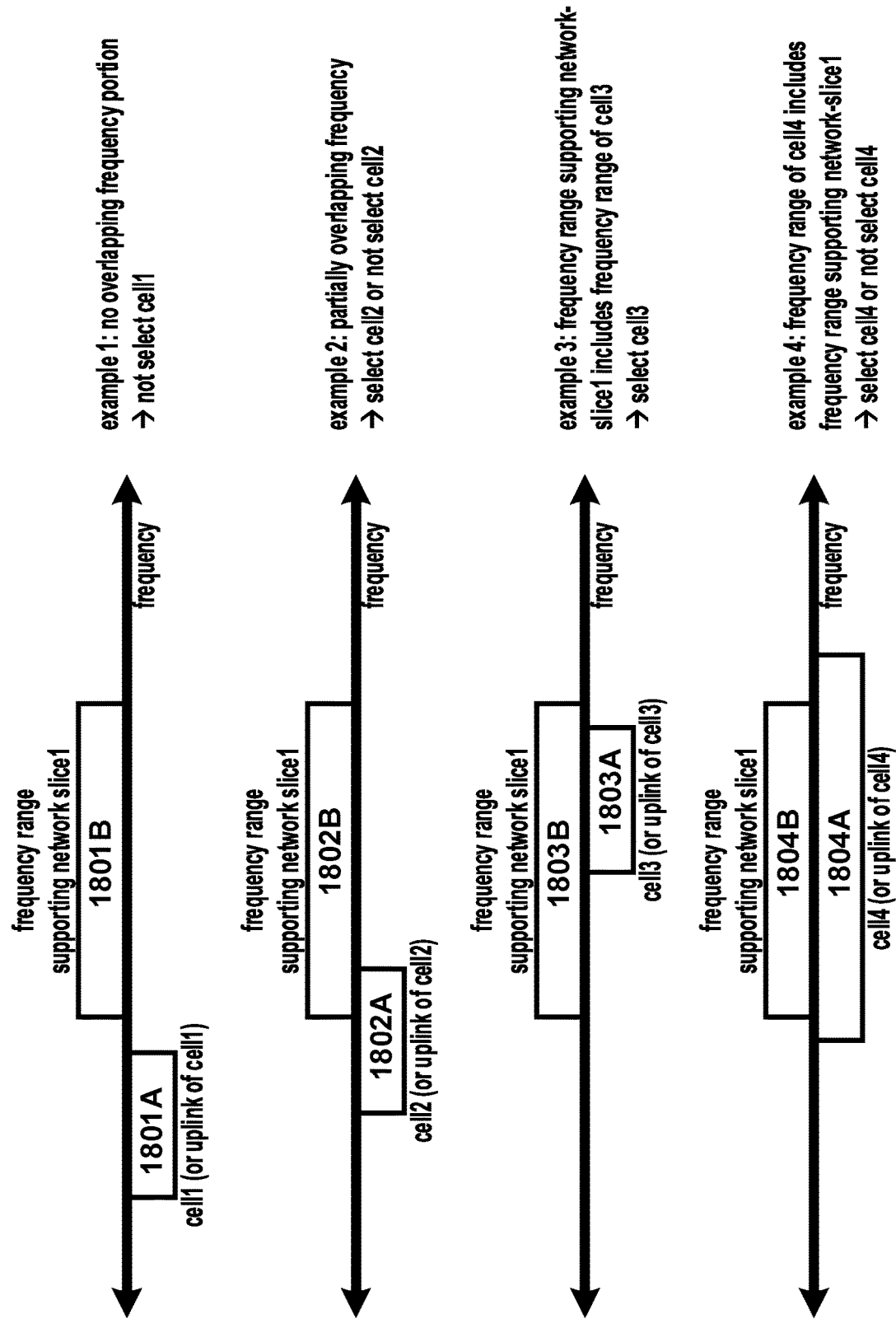
FIG. 18 shows an example of frequency ranges for cells and wireless resources (e.g., network slices).

FIG. 18 shows an example of frequency ranges for cells and wireless resources (e.g., network slices). One or more carrier frequency ranges of a cell, uplink of the cell, and/or downlink of the cell, may (or may not) be overlapped with a frequency range supported by a network slice. A carrier frequency range of a cell or an uplink of the cell may partially overlap a frequency range supported by a network slice. In a first example (e.g., example 1), a carrier frequency range (1801A) of a cell (e.g., cell1 or uplink of cell1) may not be overlapping with a frequency range supported by a network slice (1801B). A wireless device that requires the network slice may not select the cell1 (or the uplink of cell1), for example, if the carrier frequency range of the cell is not overlapping with a frequency range supported by the network slice. In a second example (e.g., example 2), a carrier frequency range (1802A) of a cell (e.g., cell2 or uplink of cell2) may be partially overlaps with a frequency range supported by a network slice (1802B). A wireless device that requires the network slice may (or may not) select the cell (e.g., cell2 or uplink of cell2), for example, based on an overlapping portion, a non-overlapping portion, and/or a cell selection policy. In a third example (e.g., example 3), a carrier frequency range (1803A) of a cell (e.g., cell3 or uplink of cell3) may be included in a frequency range supported by a network slice (1803B). A wireless device that requires the network slice may select the cell (e.g., select cell3), for example, if the carrier frequency range of the cell is within a frequency range supported by the network slice. In a fourth example (e.g., example 4), a carrier frequency range (1804A) of a cell (e.g., cell4 or uplink of cell4) may comprise a frequency range supported by a network slice (1804B). A wireless device that requires the network slice may (or may not) select the cell (e.g., cell4 or uplink of cell4), for example, based on an overlapping portion, a non-overlapping portion, and/or a cell selection policy. Although a frequency range supporting a network slice (e.g., 1804B) may be completely within the carrier frequency range (e.g., 1804A) of a cell (e.g., cell4 or uplink of cell4), the cell region may support additional frequencies that may not be available for supporting the network slice. A base station that may assign resources to a cell (or uplink of a cell) may include other frequencies that may be unused and/or unsupported by the network slice.

A wireless device may perform measurements for cell selection and/or reselection purposes. A wireless device may use parameters provided by the serving cell and/or for the final check on cell selection criterion, and/or a wireless device may use parameters provided by a target cell for cell reselection, for example, when evaluating characteristics (e.g., Srxlev and/or Squal) of non-serving cells for reselection evaluation purposes. A device (e.g., a NAS device) may control a RAT in which the cell selection may be performed, for example, by indicating RAT(s) associated with a selected PLMN, and/or by maintaining a list of forbidden registration area(s) and a list of equivalent PLMNs. A wireless device may determine/select a suitable cell based on an RRC idle and/or an RRC inactive state measurements and/or cell selection criteria. Information (e.g., stored information) for several RATs, if available, may be used by the wireless device, for example, in order to expedite the cell selection process.

A wireless device may search (e.g., regularly search) for a better cell according to cell reselection criteria, for example, even if the cell is already using (e.g., camped on) a cell. A cell may be selected, for example, if the cell is determined to be better than a cell currently being used. A change of cell may imply/indicate a change of RAT. A NAS layer may be informed if the cell selection and reselection result in changes in received system information relevant for NAS. A wireless device may use (e.g., camp on) a suitable cell (e.g., for normal service), and/or may monitor control channel(s) of that cell so that the wireless device may: receive system information from a PLMN; receive registration area information from a PLMN (e.g., tracking area information); receive other AS and NAS Information; receive paging and notification messages from the PLMN (e.g., if registered); initiate transfer to Connected mode; and/or the like.

Measurement quantity of a cell may depend on wireless device implementation, for example, for cell selection in multi-beam operations. A measurement quantity of a cell may be derived from amongst beams corresponding to the same cell based on SS/PBCH block, for example, for cell reselection in multi-beam operations, such as inter-RAT reselection from E-UTRA to NR. A measurement quantity of a cell may be derived from amongst beams corresponding to the same cell, such as follows: If nrofSS-BlocksToAverage (maxRS-IndexCellQual in E-UTRA) is not configured in SIB2/SIB4 (SIB24 in E-UTRA); or if absThreshSS-Blocks-Consolidation (threshRS-Index in E-UTRA) is not configured in SIB2/SIB4 (SIB24 in E-UTRA); and/or if the highest beam measurement quantity value is below or equal to absThreshSS-BlocksConsolidation (threshRS-Index in E-UTRA): a wireless device may derive a cell measurement quantity as the highest beam measurement quantity value. If nrofSS-BlocksToAverage (maxRS-IndexCellQual in E-UTRA) is configured in SIB2/SIB4 (SIB24 in E-UTRA); or if absThreshSS-BlocksConsolidation (threshRS-Index in E-UTRA) is configured in SIB2/SIB4 (SIB24 in E-UTRA); and/or if the highest beam measurement quantity value is greater than absThreshSS-BlocksConsolidation (threshRS-Index in E-UTRA): a wireless device may derive a cell measurement quantity as the linear average of the power values of up to nrofSS-BlocksToAverage (maxRS-Index-CellQual in E-UTRA) of highest beam measurement quantity values above absThreshSS-BlocksConsolidation (threshRS-Index in E-UTRA).

Cell selection may be performed by one or more procedures. Cell selection may be performed by one or more of the following procedures (e.g., cell selection procedure; determining whether a cell selection criterion is fulfilled). An initial cell selection procedure (e.g., if a wireless device has no prior knowledge of which RF channels are NR frequencies) may comprise one or more of the following: a wireless device may scan RF channels in bands (e.g., NR bands or any other bands) according to wireless device capabilities to find a suitable cell; a wireless device may (e.g., may need to) search for a strongest cell on a frequency/frequencies; and/or if a suitable cell is found, that cell may be selected. Cell selection by leveraging stored information may comprise one or more of the following; a procedure may require information (e.g., stored information) of frequencies and/or information on cell parameters from previously received measurement control information elements and/or from previously detected cells; if the wireless device has found a suitable cell, the wireless device may select it; and/or if no suitable cell is found, the initial cell selection procedure in may be started.

Priorities may (or may not) be used in cell selection. Priorities between different frequencies or RATs provided to a wireless device (e.g. a UE) by system information or dedicated signaling may (or may not) be used in cell selection. A cell selection criterion S may be satisfied/fulfilled if: Srxlev>0 AND Squal>0, where: Srxlev=Qrxlevmeas−(Qrxlevmin+Qrxlevminoffset)−Pcompensation−Qoffsettemp, and/or Squal=Qqualmeas−(Qqualmin+Qqualminoffset)−Qoffsettemp. Srxlev may comprise a cell selection RX level value (dB). Squal may comprise a cell selection quality value (dB). Qoffsettemp may comprise an offset temporarily applied to a cell (dB). Qrxlevmeas may comprise a measured cell RX level value (RSRP). Qqualmeas may comprise a measured cell quality value (RSRQ). Qrxlevmin may comprise a minimum required RX level in a cell (dBm). Qrxlevmin may be obtained from q-RxLevMinSUL, if present, in SIB1, SIB2 and SIB4, For example, if a wireless device supports SUL frequency for a cell. A cell specific offset may be added to the corresponding Qrxlevmin (e.g., to achieve a required minimum RX level in a concerned cell), for example, if QrxlevminoffsetcellSUL is present in SIB3 and SIB4 for the concerned cell. If QrxlevminoffsetcellSUL is not present in SIB3 and SIB4 for the concerned cell Qrxlevmin may be obtained from q-RxLevMin in SIB1, SIB2 and SIB4. A cell specific offset may be added to a corresponding Qrxlevmin (e.g., to achieve a required minimum RX level in a concerned cell), for example, if Qrxlevminoffsetcell is present in SIB3 and SIB4 for a concerned cell. Qqualmin may comprise a minimum required quality level in the cell (dB). A cell specific offset may be added (e.g., to achieve a required minimum quality level in a concerned cell), for example, if Qqualminoffsetcell is a signal for a concerned cell. Qrxlevminoffset may be an offset to a signal Qrxlevmin taken into account in the Srxlev evaluation as a result of a periodic search for a higher priority PLMN while using (e.g., camped normally in) a VPLMN. Qqualminoffset may comprise an offset to a signal Qqualmin taken into account in the Squal evaluation as a result of a periodic search for a higher priority PLMN while using (e.g., camped normally in) a VPLMN. Pcompensation may comprise, for FR1, (e.g., if a wireless device supports a additionalPmax in an NR-NS-PmaxList, if present), in SIB1, SIB2 and SIB4: max (PEMAX1−PPowerClass, 0)−(min(PEMAX2, PPowerClass)−min(PEMAX1, PPowerClass)) (dB); else: max (PEMAX1−PPowerClass, 0) (dB). Pcompensation may be set to 0, for example, for FR2. PEMAX1 and/or PEMAX2 may be a maximum transmit (TX) power level of a wireless device and/or may be used when sending (e.g., transmitting) via an uplink in a cell (e.g., in dBm) which may be defined as PEMAX. PEMAX1 and/or PEMAX2 may be obtained from a p-Max for SUL in SIB1 and/or NR-NS-PmaxList for SUL respectively in SIB1, SIB2, and/or SIB4, for example, if a wireless device supports an SUL frequency for a cell. PEMAX1 and/or PEMAX2 may be obtained from a p-Max and NR-NS-PmaxList respectively in SIB1, SIB2, and/or SIB4 for a normal UL, for example, if a wireless device does not support an SUL frequency for a cell. PPowerClass may comprise a maximum RF output power of a wireless device (dBm) according to a wireless device power class.

Signal values Qrxlevminoffset and Qqualminoffset may be applied when a cell is evaluated for cell selection as a result of a periodic search for a higher priority PLMN (e.g., if/while using, or camped normally in, a VPLMN). A wireless device may check an S criteria of a cell using parameter values stored from a different cell of a higher priority PLMN, for example, during a periodic search for higher priority PLMN.

Absolute priorities of different frequencies (e.g., NR or inter-RAT frequencies) may be provided to a wireless device in system information, in an RRCRelease message, and/or by inheriting from another RAT at inter-RAT cell (re) selection. In the case of system information, a frequency (e.g., NR or inter-RAT frequency) may be listed/provided/indicated without a priority (e.g., a field cellReselectionPriority may be absent for that frequency). A wireless device may ignore priorities provided in system information, for example, if priorities are provided in dedicated signaling. If a wireless device may apply priorities provided by system information from current cell, and/or the wireless device may preserve priorities provided by dedicated signaling and/or deprioritizationReq received in RRCRelease, for example, if the wireless device is using (e.g., camped on) any cell state. A wireless device may consider/determine a current frequency to be the lowest priority frequency (e.g., lower than any of network configured values), for example, if/when the wireless device is in a state (e.g., in a camped normally state) that has dedicated priorities other than for a current frequency.

A wireless device may perform cell reselection evaluation for frequencies (e.g. NR and/or inter-RAT frequencies) that may be given in system information and/or for which the wireless device has a priority provided. In case a wireless device receives RRCRelease with deprioritizationReq, the wireless device may consider/determine current frequency and stored frequencies due to a previously received RRCRelease with deprioritisationReq or frequencies (e.g., NR frequencies) to be the lowest priority frequency (e.g., lower than network configured values) while a timer (e.g., T325) is running irrespective of camped RAT. A wireless device may delete/remove a stored deprioritization request(s), for example, if/when a PLMN selection is performed on request by NAS. A wireless device may search for a higher priority layer for cell reselection, for example, after a change of priority.

A wireless device may delete/remove priorities provided by dedicated signaling if/when: the wireless device enters a different RRC state; an optional validity time of dedicated priorities (e.g., T320) expires; the wireless device receives an RRCRelease message with a field (e.g., cellReselectionPriorities) being absent; a PLMN selection is performed on request by NAS; and/or the like. Equal priorities between RATs may (or may not) be supported.

A wireless device may not consider/determine black listed cells as candidates for cell reselection. A wireless device in an idle state (e.g., RRC_IDLE state) may inherit priorities provided by dedicated signaling and/or a remaining validity time (e.g., T320 in NR and/or E-UTRA), if configured, at inter-RAT cell (re)selection. A network may assign dedicated cell reselection priorities, for example, for frequencies not configured by system information.

A wireless device may limit required measurements (e.g., by following one or more rules/procedures). If a serving cell fulfils/satisfies Srxlev>SIntraSearchP and Squal>SIntraSearchQ, a wireless device may choose/determine not to perform intra-frequency measurements. If a serving cell does not fulfil/does not satisfy Srxlev>SIntraSearchP and Squal>SIntraSearchQ, a wireless device may perform intra-frequency measurements. A wireless device may apply the following rules for frequencies (e.g., NR inter-frequencies and inter-RAT frequencies) which may be indicated in system information (e.g., for which a wireless device has priority provided). A wireless device may perform measurements of higher priority NR inter-frequency or inter-RAT frequencies, for example, a NR inter-frequency or inter-RAT frequency with a reselection priority higher than a reselection priority of a current NR frequency. For a NR inter-frequency measurement with an equal or lower reselection priority than a reselection priority of a current NR frequency and for inter-RAT frequency measurement with lower reselection priority than a reselection priority of the current NR frequency: if a serving cell fulfils/satisfies Srxlev>SnonIntraSearchP and Squal>SnonIntraSearchQ, a wireless device may choose not to perform measurements of NR inter-frequencies or inter-RAT frequency cells of equal or lower priority; if a serving cell does not fulfil/does not satisfy Srxlev>SnonIntraSearchP and Squal>SnonIntraSearchQ, a wireless device may perform measurements of NR inter-frequencies or inter-RAT frequency cells of equal or lower priority.

A wireless device may communicate with a base station via a cell. A cell may be determined/selected for wireless communications based on as a quality of a received signal (e.g., received power) and/or a configuration (e.g., frequency range(s) of the cell and/or of the base station). One or more links/channels (e.g., uplink, downlink, supplementary link etc.) may be selected/determined for wireless communications, for example, based on one or more criteria (e.g., frequency, latency, throughput, received power, capacity, etc.). A wireless device may be required to perform cell selection/reselection (e.g., to communicate with a base station in a cell, for roaming/handover to a new cell, etc.). Cell selection may be based on whether a coverage area of a cell provides communications to the wireless device that satisfy a power level/threshold (e.g., RSRP) and/or a quality threshold (e.g., RSRQ) that may be based on a location of the wireless device (e.g., within the cell). A wireless device may determine/select (or not select) a particular cell for communication with a base station, for example, based on the power level/threshold. A wireless device may determine/select a cell based on a received power of a downlink signal via the cell. A wireless device may determine to communicate using certain wireless resources (e.g., network slice(s) and/or any other wireless resources) that may require a particular configuration of a cell (e.g., frequency range(s)) of communication link(s)). Cell selection based on only a quality of a received signal (e.g., received power) may lead to a wireless device selecting a cell that does not sufficiently serve a particular requirement of the wireless device. Cell selection may be improved by determining whether a cell has a configuration that is capable of serving certain wireless resources associated with a wireless device before that cell is selected. For example, a wireless device may select a cell based on whether a communication link in the cell (e.g., a normal uplink, a supplementary uplink, a downlink, and/or any other link) has a configuration (e.g., operates within certain frequency range(s)) that supports use of certain wireless resources (e.g., network slices(s) and/or any other wireless resources) that may be required for use by the wireless device, such as for a particular service or communication. A wireless resource (e.g., network slice(s)) may be associated with a type of service/communication (e.g., eMBB, URLLC, and/or any other type of service/communication). A wireless device may require the wireless resource (e.g., network slice(s)) for wireless communications associated with the type of service/communication. By determining/selecting a cell based on a capability of the cell to accommodate the wireless resource (e.g., based on the cell having a frequency/frequencies, or frequency range(s), available on a communication link for servicing a network slice), improvements may be achieved such as improved service, reduced likelihood of cell handover, and/or increased efficiency.

A wireless device may require a network slice (e.g., for one or more services). The wireless device may supports limited frequencies. A cell may comprise multiple uplinks that use a different frequency spectrum, for example, an NUL and an SUL (and/or any other link, such as an uplink, a downlink, and/or a downlink/uplink). A wireless device may not be able to send (e.g., transmit) packets associated with a network slice via the cell if a frequency of a selected uplink among the multiple uplinks does not support the network slice, for example, if a wireless device uses a cell comprising multiple uplinks. Service interruptions and/or service delays of a wireless device using a network slice may be increased, for example, if cell selection fails to sufficiently account for requirements of a wireless device (e.g., a wireless resource such as a network slice, a service associated with wireless communications, and/or the like).

A wireless device may be located in a first cell. The first cell may be configured with a first communication link (e.g., a normal uplink (NUL) or any other uplink and/or downlink). The first cell may be configured with a second communication link (e.g., a supplementary uplink (SUL), NUL, or any other uplink and/or downlink). The wireless device may determine to communicate data/information/packets associated with a wireless resource (e.g., a network slice). The wireless device may measure the first cell to determine whether a received power satisfied (e.g., is equal to or larger than) a power value for selection between the first communication link or the second communication link. If the wireless device determines that the wireless resource (e.g., the network slice) supports the frequency/frequencies (or frequency range(s)) of the first communication link (e.g., if selection criteria is satisfied), the wireless device may select/determine the first cell. The wireless device may select/determine the first cell, for example, for a random access procedure to establish wireless communications (e.g., with a base station) via the cell. If the wireless device determines that the wireless resource (e.g., the network slice) does not support the frequency/frequencies (or frequency range(s)) of the first communication link (e.g., if selection criteria is not satisfied), the wireless device may not select (or may determine not to select) the first cell, or the wireless device may deprioritize (or determine to deprioritize) the first cell relative to one or more other cells that may be available. The wireless device may select/determine a second cell (or another cell), for example, for a random access procedure to establish wireless communications (e.g., with another base station) via the second cell. The wireless device may select/determine the second cell, for example, based on the second cell supporting the frequency/frequencies (or frequency range(s)) of a communication link via the second cell, such as for supporting the wireless resource (e.g., network slice(s)). The wireless device may select/determine the second cell rather than the first cell, for example, even if a received power (e.g., RSRP) and/or quality (e.g., RSRQ) associated with the second cell is less than a threshold and/or less than a received power (e.g., RSRP) and/or quality (e.g., RSRQ) associated with the second cell.

A wireless device may select a cell based on one or more frequencies of a link such as an uplink (e.g., NUL and/or SUL) of the cell. The wireless device may select a cell to use a wireless resource such as a network slice. Depending on an uplink frequency that may be used at a cell, a wireless device may determine whether to select the cell to use a network slice. A wireless device may select a link (e.g., an uplink, a downlink, an uplink/downlink, etc.) of a cell based on frequencies of links (e.g., NUL and/or SUL) of the cell to use a network slice. A wireless device may select an SUL to use a network slice, for example, if an NUL is available. A wireless device may receive configuration parameters indicating at least one uplink (e.g., NUL and/or SUL) that may be allowed to use for transmission of transport blocks of/on a logical channel that may be associated with a network slice. A wireless device may determine whether to use a granted radio resource of a link (e.g., an SUL or an NUL) to send (e.g., transmit) a transport block associated with a logical channel. By performing cell selection as described herein, advantages may result such as reduced service interruptions and/or service delays, and/or increased service reliability of a wireless device and/or of wireless devices.

A wireless device may be in an idle state (e.g., RRC idle state). A wireless device may be in an inactive state (e.g., RRC inactive state). A wireless device may be located in one or more coverage regions serviced by a base station. The coverage regions may be determined by cell selection criteria, for example, based on a relationship of a received power in that region, a location of the wireless device, and/or a value of a power value relative to a threshold. A wireless device may monitor cells to select a cell and/or use (e.g., camp on) the cell for wireless communications, for example, if the wireless device is in an idle or inactive state, such as an RRC idle state or an RRC inactive state. The wireless device may perform a random access procedure on the selected cell to establish an RRC connection and/or may monitor paging occasions on the selected cell to receive a core network paging and/or a RAN paging. The monitored cells and/or the selected cells (e.g., and/or a frequency band of the monitored cells and/or the selected cells) may support one or more wireless resources, such as network slices, and/or may not support some wireless resources (e.g., network slices). One or more uplinks (e.g., NUL, SUL, etc.) of the monitored cells and/or the selected cells (e.g., and/or a frequency band of the one or more uplinks of the monitored cells and/or the selected cells) may support one or more network slices and/or may not support some network slices. The wireless device may be located in a coverage area of a first cell (e.g., cell1) and/or coverage area of a second cell (e.g., cell2). The first cell may be served, operated, and/or controlled by a base station. The second cell may be served by the base station and/or by a second base station.

Figure 19:
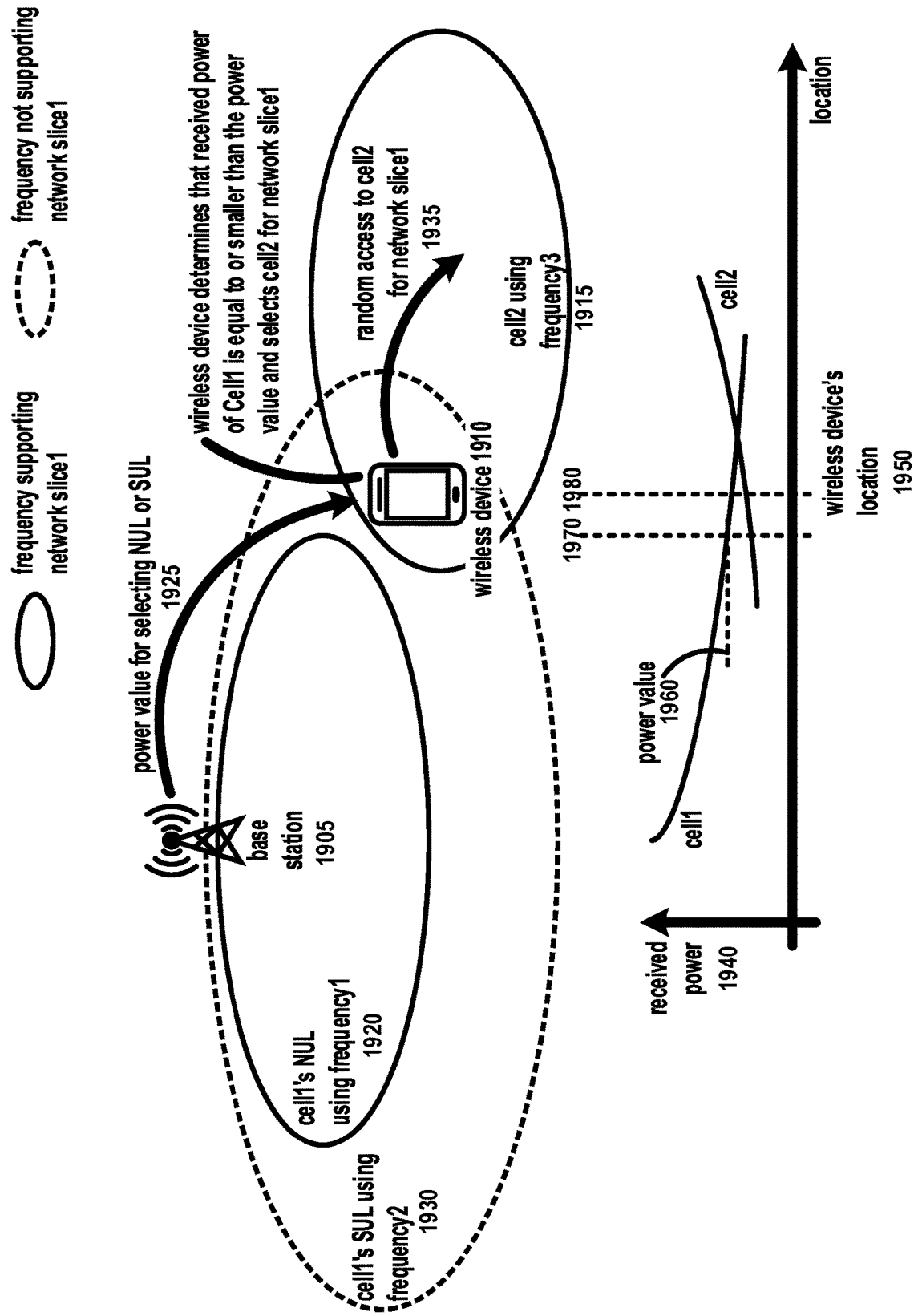
FIG. 19 shows an example of cell selection for a wireless device.

FIG. 19 shows an example of cell selection for a wireless device. A wireless device 1910 may select a cell based on determining an uplink, and/or a network slice or other wireless resource, that the wireless device 1910 may require for wireless communications. While three coverage areas are shown, any quantity of coverage areas may be used. A first coverage area (1920) may correspond to a first link (e.g., NUL) using a first frequency (e.g., frequency1) in a first cell associated with a base station (1905). A second coverage area (1930) may correspond to a second link (e.g., SUL) using a second frequency (e.g., frequency2) in the first cell associated with the base station (1905). A third coverage area (1915) may correspond to a third link (e.g., NUL, SUL, or any other uplink) using a third frequency (e.g., frequency3) in a second cell (e.g., that may be associated with another base station (not shown)). The wireless device 1910 may determine to communicate (e.g., send/receive packets) associated with a network slice (e.g., network slice1). The network slice may be restricted to a frequency range. The wireless device 1910 may receive (e.g., from the base station 1905) a system information block of a first cell (e.g., cell1), for example, as step 1925. The system information block may comprise a power threshold (e.g., power value, RSRP-threshold, etc.) for selection between a first uplink (e.g., an NUL) and a second uplink (e.g., an SUL). The wireless device 1910 may perform a random access procedure via a second cell (e.g., at step 1915) based on: a received power of the first cell being equal to or smaller than the power threshold; and/or at least a portion of the second uplink of the first cell not being within the frequency range. The wireless device 1910 may select the second cell (e.g., cell2) for a network slice (e.g., network slice1), for example, if the wireless device 1910 determines that the received power of the first cell (e.g., cell1) is equal to or smaller than the power value. The wireless device may send (e.g., transmit) one or more transport blocks associated with the network slice via the second cell. Received power (e.g., 1940) in two cells (e.g., cell 1 and cell 2) is shown relative to a location (e.g., 1950) of a wireless device (e.g., the wireless device 1910) within each cell. The received power (e.g., 1940) for each cell (e.g., cell1 and cell2) may correspond to a wireless device's location (e.g., 1950), and/or distance, from a base station (e.g., base station 1905). A power value/threshold (e.g., 1960) may be used to determine whether the wireless device (e.g., the wireless device 1910) selects a first cell (e.g., cell1) and/or a second cell (e.g., cell2). For example, if the wireless device is located within the first cell and determines a received power (e.g., 1940) above a threshold, such as if the wireless device is located (e.g., based on location 1950 being at or to the left of location 1970) in the first cell and has a received power 1940 along the cell1 curve that is greater than the power value 1960, the wireless device may select the first cell. If the wireless device is located within the second cell and determines a received power (e.g., 1940) above a threshold, such as if the wireless device is located (e.g., based on location 1950 at or to the right of location 1980) in the second cell and has a received power 1940 along the cell2 curve that is greater than the power value 1960, the wireless device may select the second cell. Cell selection may be based on determining that a received power from a first cell is smaller than a threshold and that an SUL does not support a network slice. The first cell using the second frequency (e.g., frequency2) may not be supported (e.g., indicated by the dotted line for the second coverage area 1930) by the network slice (e.g., network slice1). In the third coverage area (1915), the wireless device may have a received power from the first cell (e.g., associated with/of cell1, from the base station 1905) greater than the received power of the second cell (e.g., cell2). The wireless device may select the second cell (e.g., cell2 using frequency3), for example, based on the wireless device determining a received power of from the second cell greater than the received power from the first cell. The second cell (e.g., cell2) may be selected (and/or the first cell may not be selected) for the network slice (e.g., network slice1), for example, based on the first cell having an SUL (e.g., cell1's SUL) using a frequency (e.g., frequency2) that may not be supported (e.g., shown as a dotted line). A cell selection procedure may require that a cell (e.g., cell2) using the frequency of an SUL (e.g., frequency3) is selected even if the received power (or threshold power value) for another cell (e.g., cell1) may be greater than the selected cell (e.g., cell2), for example, if a base station of the non-selected cell (e.g., cell1 base station 1905) does not support the network slice that contains non-selected cell's SUL (e.g., cell1's SUL using frequency2). The wireless device 1910 may select the next best available cell coverage region (e.g., 1915) that may service the network slice (e.g., cell2 using frequency3).

The wireless device may determine to communicate packets associated with a network slice (e.g., network slice1). The wireless device may be in an RRC idle state or in an RRC inactive state at a time that the wireless device determines to use the network slice. Determining whether to communicate packets/data/information associated with a network slice may comprise at least one of: determining to start/initiate a service associated with the network slice; receiving, by a lower layer (e.g., NAS, RRC, MAC, etc.) of the wireless device from a higher layer (e.g., application layer) of the wireless device, an indication of initiation of a service/session associated with the network slice; receiving, by the wireless device, a paging message and/or a paging indication, and or the like. The paging indication may indicate at least one of: the network slice; the frequency range; a list of carrier/cell associated with the frequency range and/or the network slice; and/or the like.

Determining to communicate packets associated with a network slice may comprise one or more of generating, buffering, and/or queuing data or one or more packets associated with the network slice to send (e.g., transmit). The data of one or more packets associated with the network slice may relate to a packet flow (e.g., a PDU session, a QoS flow, a bearer, a logical channel, etc.) associated with the network slice.

A network slice may be restricted to a frequency range (e.g., FR2, 5.8 GHz 8.1 GHz, 7 GHz, and/or any other frequencies/frequency range(s)), such as described herein with respect to FIG. 17 and/or FIG. 18. A network slice may not be supported/served via at least some other frequency ranges. The wireless device may receive, from a network (e.g., base station, AMF, core network node, etc.), one or more parameters indicating one or more frequency ranges that the network slice supports (e.g., is restricted to). The wireless device may be configured (e.g., pre-configured)

with the frequency range that the network slice supports (e.g., is restricted to). The configuration (e.g., pre-configuration) of the frequency range of the network slice may be configured within a subscriber identification module (SIM) card and/or a memory of the wireless device.

A wireless device may receive a system information block (SIB) (e.g., one or more SIBs, etc.) of a first cell (e.g., cell1). The wireless device may receive the SIB via the first cell. The SIB (e.g., the one or more SIBs) may comprise a power threshold (e.g., power value, RSRP-threshold, rsrp-ThresholdSSB-SUL, etc.) for selection between a first uplink (e.g., a normal uplink (NUL)) and a second uplink (e.g., a supplementary uplink (SUL)) (or any other uplinks, downlinks, and/or uplink(s)/downlink(s)). The SIB may c SIB1. The SIB may comprise a serving cell configuration common SIB (e.g., ServingCellConfigCommonSIB) that may comprise an uplink configuration common SIB (e.g., UplinkConfigCommonSIB). The SIB and/or the uplink configuration common SIB may comprise a bandwidth part uplink common (e.g., BWP-UplinkCommon) that may comprise a RACH configuration common (e.g., RACH-ConfigCommon). The RACH configuration common may comprise the power threshold (e.g., rsrp-ThresholdSSB-SUL). The power threshold may be applied to one or more BWPs of the first cell. The power threshold may indicate a RSRP range (e.g., RSRP-Range, power range value). The power threshold may indicate an integer value that may be mapped to a configured (e.g., pre-configured) table, such as in dB and/or dBm unit (e.g., −141 dBM~−140 dBM, or any other value). The power threshold may indicate a power value (e.g., −150 dBM or any other value). The SIB may indicate that the wireless device may select the second uplink, for example, if a received power (e.g., RSRP) for the first cell is smaller than or equal to the power threshold. The SIB may indicate that the wireless device may select the first uplink, for example, if a received power (e.g., RSRP) for the first cell is larger than or equal to the power threshold.

The wireless device may measure a received signal (e.g., RSRP and/or RSRQ) via the first cell. The wireless device may monitor one or more reference signals (e.g., synchronization signal) of the first cell. The wireless device may receive reference signal configuration information of the one or more reference signals via at least one SIB from a base station that serves/operates/controls the first cell. The reference signal configuration information may comprise scheduling parameters (e.g., indicating transmission timing, periodicity, offset, frequency, etc.) of the one or more reference signals. The wireless device may monitor the one or more reference signals based on the reference signal configuration information. The wireless device may combine/average one or more received powers (e.g., or qualities) of the one or more reference signals. The wireless device may determine the RSRP (and/or RSRQ) of the first cell based on the combined received power (and/or quality) of the one or more reference signals. The RSRP determined based on the combined received power (and/or quality) of the one or more reference signals may be a received power of the first cell.

The wireless device may determine that the received power and/or quality (e.g., the RSRP and/or the RSRQ) of the first cell may be equal to or smaller than the power/quality threshold. The received power/quality of the first cell being equal to or smaller than the power/quality threshold may indicate that the wireless device may select the second uplink (e.g., the supplementary uplink) for uplink transmissions via the first cell. Based on the wireless device determining whether the received power of the first cell is equal to or smaller than the power threshold and/or based on the SIB, the wireless device may determine, know, or realize that the wireless device may use the second uplink for a random access (e.g., to send a random access preamble for the random access). The second uplink may not support the network slice (e.g., network slice1 in FIG. 19), for example, even if the wireless device selects the first cell (e.g., cell1 in FIG. 19). Based on the wireless device determining whether the received power of the first cell being equal to or smaller than the power threshold and/or based on the SIB, the wireless device may expect or forecast that the base station serving, operating, or controlling the first cell may configure the wireless device to use the second uplink (e.g., which does not support the network slice), after a random access procedure via the first cell. If the wireless device performs a random access procedure via the first cell and/or establishes a connection (e.g., RRC connection) via the first cell, the base station that serves, operates, or controls the first cell may configure the wireless device to use the second uplink (e.g., the supplementary uplink) for a reliable radio condition based on a low frequency of the second uplink. For example, based on a measurement report (e.g., CSI report, RRC measurement report, SRS, etc.) indicating the received power of the wireless device that is equal to or smaller than the power threshold, a frequency band of the first uplink may have high path loss and/or unreliable radio condition. The wireless device with the received power of the first cell being equal to or smaller than the power threshold may not have a reliable uplink connection via the first uplink of the first cell.

The wireless device may not select the first cell, to use (e.g., camp on), based on one or more of: the received power/quality (e.g., RSRP and/or RSRQ) of the first cell being equal to or smaller than the power/quality threshold; and/or at least a portion of the second uplink (e.g., the supplementary uplink) not being within the frequency range (e.g., as described with respect to FIG. 19). The wireless device not-selecting the first cell may be based on a cell selection criterion being fulfilled/satisfied for the first cell. The wireless device may not select the first cell if the cell selection criterion is fulfilled/satisfied for the first cell, for example, due to the received power of the first cell being equal to or smaller than the power threshold and/or due to at least a partial frequency band of the second uplink of the first cell not supporting the network slice.

A wireless device may deprioritize a cell. For example, the wireless device may deprioritize a first cell, to use (e.g., camp on), based on: the received power (e.g., RSRP and/or RSRQ) of the first cell being equal to or smaller than the power threshold; and/or at least a portion of the second uplink (e.g., the supplementary uplink) not being within the frequency range (e.g., at least a portion of frequency band of the second uplink being not supported by the network slice). Deprioritizing the first cell may comprise applying a negative weight value for selecting the first cell. Deprioritizing the first cell may comprise applying a negative weight value for the first cell during the cell selection procedure of the wireless device. A wireless device may monitor a plurality of cells and/or compare received power for the plurality of cells (e.g., cell1 and cell2). The wireless device may introduce a weighted value (e.g., a negative or positive value) consistent with the selection criteria, network conditions, throughput, quality of service, and/or the like, for example, if the power comparison yield values that are close in magnitude. If the difference between the received powers is substantial (e.g., greater than a threshold), then introducing a weighted value may not impact which cell is selected. The weighted value may be negative to reflect that a base station does not support a network slice for a cell (e.g., base station 1905 does not support the network slice1 for cell1's SUL using frequency2), which may lead to the cell not being selected (or the cell being less likely to be selected).

At least a portion of an uplink (e.g., a supplementary uplink) may comprise at least one of: any frequency portion of a second uplink; or all frequency portion of a second uplink (e.g., as shown in examples of cell1, cell2, and/or cell 4 in FIG. 18). The SIB may comprise a carrier frequency range of at least one of: the first cell; a downlink of the first cell; the first uplink of the first cell; the supplementary uplink of the second cell; and/or the like. One or more SIB s (e.g., the SIB and/or the SIB1) may indicate frequency ranges of the first uplink and/or the second uplink of the first cell. A wireless device may receive the one or more SIB s. A wireless device may determine, based on the frequency ranges indicated in the one or more SIB s, whether the second uplink of the first cell supports the network slice and/or whether to select the first cell. One or more SIB s (e.g., the SIB and/or the SIB1) may indicate at least one first network slice that the first uplink of the first cell supports and/or at least one second network slice that the second uplink supports. The wireless device may receive the one or more SIB s. The wireless device may determine whether the at least one first network slice comprises the network slice and/or whether the at least one second network slice comprises the network slice. The wireless device may determine whether to select the first cell based on the at least one first network slice of the first uplink and/or based on the at least one second network slice of the second uplink. The wireless device may determine to not select the first cell based on the at least one second network slice of the second uplink not comprising the network slice when the received power of the first cell being is smaller than or equal to the power threshold.

The wireless device may be using (e.g., may have camped on) the first cell for wireless communications. The wireless device may determine to perform a cell reselection based on one or more of: determining to communicate packets associated with a network slice; received power of q cell being equal to or smaller than the power threshold; at least a portion of q second uplink (e.g., q supplementary uplink) not being within q frequency range; at least one second network slice of a second uplink not comprising the network slice; and/or the like. Performing the random access procedure via the second cell may be based on cell reselection.

A wireless device may select/determine a second cell based on not selecting a first cell. A wireless device may perform a random access procedure via a second cell based on one or more of: a received power of the first cell being equal to or smaller than the power threshold; at least a portion of the second uplink of the first cell not being within the frequency range of the network slice; the at least one second network slice of the second uplink not comprising the network slice; and/or the like. The network slice may support a frequency of the second cell. At least a portion of the second cell may be within the frequency range. The wireless device may receive one or more second SIB s (e.g., via the second cell) indicating at least one of the frequencies of the second cell and/or a list of network slices that the second cell may utilize. The network slices (e.g., the list of network slices) of the second cell comprise the network slice with which the wireless device determined to communicate associated packets.

Performing a random access procedure via the second cell may be based on a cell selection criterion being fulfilled/ satisfied for the first cell. The cell selection criterion may be based on the received power of the first cell. Performing the random access via the second cell may be based on a cell selection criterion being fulfilled/satisfied for the second cell.

After a random access procedure via a cell, a wireless device may send (e.g., transmit) transport blocks (e.g., packets) associated with a network slice via the cell. After the random access procedure via the cell, the wireless device may receive transport blocks (e.g., packets) associated with the network slice via the second cell.

Figure 20:
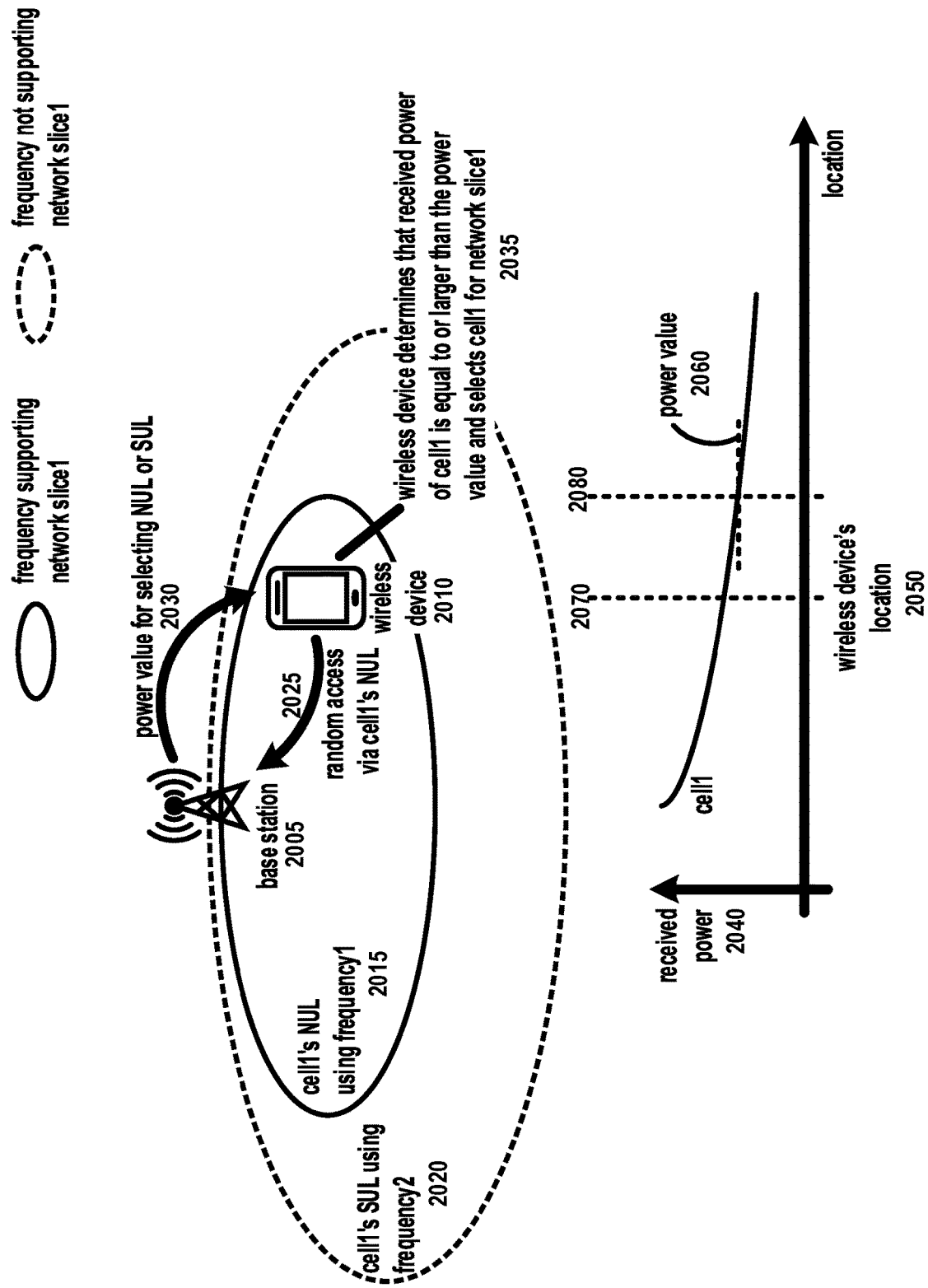
FIG. 20 shows an example of cell selection for a wireless device.

FIG. 20 shows an example of cell selection for a wireless device. A wireless device 2010 may select a cell (e.g., cell1). The wireless device 2010 may select the first cell, for example, based on determining an uplink, and/or a network slice, for the wireless device 2010 to use (e.g., that may be required for wireless communications by the wireless device). A base station 2005 may support an uplink (e.g., cell1's NUL) using a first frequency (e.g., frequency1). The wireless device may be located within an uplink's range (e.g., the NUL frequency range 2015). A second uplink (e.g., SUL) may use a second frequency (e.g., frequency2) that may not support the network slice. The wireless device 2010 may be located in at least two coverage regions/areas comprising a first region/area (e.g., 2015) corresponding to the cell's first uplink using the first frequency (e.g., cell1's NUL using frequency1) and a second region/area (e.g., 2020) corresponding to the cell's second uplink using the second frequency (e.g., cell1's SUL using frequency2). The wireless device 2010 may receive, from the base station 2005, a power value for selecting the first uplink and/or the second uplink (e.g., at step 2030). The wireless device may determine a received power and/or the power value. The wireless device 2010 may select the first cell (e.g., at step 2035), and/or perform a random access via the first uplink (e.g., cell1's NUL (e.g., by sending or transmitting a random access preamble via the first uplink), for example, if the received power (e.g., RSRP and/or RSRQ) of the first cell satisfied (e.g., is equal to or larger than) a threshold and/or if at least a portion of the first uplink is within the frequency range of the network slice. The wireless device 2010 may select the first cell, for example, based on at least one network slice of the first uplink comprising the network slice for the wireless device 2010 (e.g., if the received power of the first cell is larger than or equal to the power threshold). The wireless device 2010 may determine, based on the frequency range(s) indicated in one or more SIB s received from base station 2005, that the first uplink of the first cell supports the network slice and/or that the wireless device 2010 selects the first cell for the (e.g., network slice1). Based on the random access procedure (e.g., a successful random access procedure) via the first uplink (e.g., cell1's NUL), the wireless device 2010 may transmit/receive, to/from the base station 2005 of the first cell (e.g., via the cell and/or via the first uplink of the cell), transport blocks (e.g., at least one packet) associated with the network slice. Received power (e.g., 2040) in the cell (e.g., cell1) is shown relative to a location (e.g., 2050) of a wireless device (e.g., the wireless device 2010) within the cell. The received power (e.g., 2040) for the cell (e.g., cell1) may correspond to a wireless device's location (e.g., 2050), and/or distance, from a base station (e.g., base station 2005). The wireless device 2010 may determine that a received power of a cell (e.g., cell1) satisfies (e.g., is equal to or greater than) a power value. The wireless device 2010 may select a cell (e.g., cell1) for a network slice (e.g., network slice1), for example, based on determining that the received power of the cell satisfies the power value. For example, if the wireless device is located within a cell and determines a received power (e.g., 2040) from the cell above a threshold, such as if the wireless device is located (e.g., based on location 2050 being at or to the left of location 2080, such as at location 2070) in the cell and has a received power 2040 along the cell1 curve that is greater than the power value 2060, the wireless device may select the cell (e.g., because the NUL of the cell supports the network slice that the wireless device needs). If the wireless device is located at a location in which it determines a received power (e.g., 2040) from the cell below a threshold, such as if the wireless device is located (e.g., based on location 2050 at or to the right of location 2080) and has a received power 2040 along the cell1 curve that is less than the power value 2060, the wireless device may not select the cell (e.g., because the SUL of the cell does not support the network slice that the wireless device needs). The wireless device 2010 may be located within a coverage region/area of a cell (e.g., cell1) and may be configured for a first frequency (e.g., NUL frequency1) that may be supported by the base station 2005. The wireless device 2010 may be located within a coverage area of a cell (e.g., cell1) and may not be configured for a second frequency (e.g., SUL frequency2) of the cell, such as the network slice (e.g., network slice1) may not be configured for the second frequency (e.g., SUL frequency2) of the cell. A coverage area/region (e.g., cell1's SUL using frequency2) may not be used to extend cell coverage for the wireless device to use the network slice (e.g., network slice1), for example, based on different frequencies of the coverage area/region and the network slice. The wireless device 2010 may be located in another coverage region/area (not shown) for a cell that may support the same frequency/frequencies (and/or frequency range(s)) required by the network slice (e.g., network slice1). The wireless device 2010 may select a cell comprising that other coverage region/area, for example, if that coverage region/area supports a communication link (e.g., an SUL) using the same frequency/frequencies (and/or frequency range(s)) required by the network slice and/or if a received power associated with the communication link satisfies a threshold (e.g., if a received power is greater than or equal to a power threshold).

Figure 21:
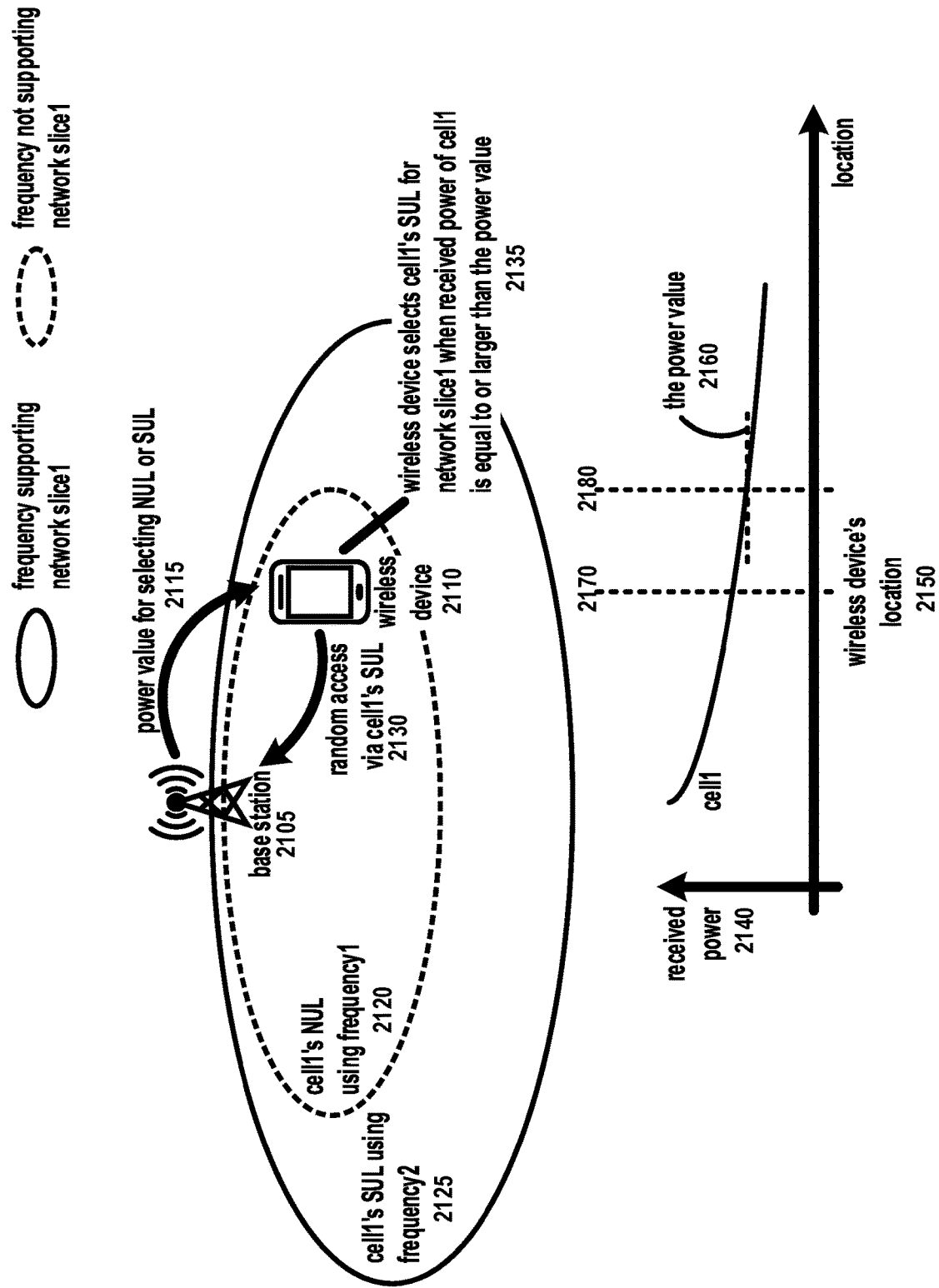
FIG. 21 shows an example of cell selection for a wireless device.

FIG. 21 shows an example of cell selection for a wireless device. A wireless device 2110 may select a cell (e.g., cell1). The wireless device 2110. May select an uplink of the cell. The wireless device 2110 may select the cell and/or the uplink of the cell, for example, based on a network slice for the wireless device 2110 to use (e.g., that may be required for wireless communications by the wireless device). A base station 2105 may be located within a first uplink's range (e.g., the NUL frequency range 2120). The base station may 2105 may be located within a second uplink's range (e.g., the SUL frequency range 2125). The first uplink (e.g., NUL) of the cell (e.g., cell1) may not support/use the frequency/frequencies (and/or frequency range(s)) of the network slice (e.g., shown by a dotted line for region/area 2120). The second uplink (e.g., SUL) of the cell (e.g., cell1) may support/use the frequency/frequencies (and/or frequency range(s)) of the network slice (e.g., shown by a solid line for region/area 2125). Cell selection criteria may indicate/require that the wireless device 2110 select the second uplink (e.g., SUL) of the cell (e.g., cell1), for example, based on the second uplink using (or being configured for) the frequency/frequencies (and/or frequency range(s)) required for the network slice (e.g., frequency2). The wireless device 2110 may receive a system information block of the cell (e.g., cell1). The system information block may comprise a power threshold (e.g., power value such as power value 2160, RSRP threshold, RSRQ threshold, etc.) for selection between at least one first uplink 2120 (e.g., an NUL) and one or more second uplinks 2125 (e.g., an SUL). The wireless device 2110 may be configured to select the first uplink 2120, for example, if a received power of the cell is equal to or greater than the power threshold. The wireless device 2110 may determine to communicate packets associated with the network slice, for example, via the first uplink 2120. The wireless device 2110 may select the second uplink 2125, for example, if the received power of the cell is equal to or greater than the power value. The wireless device 2110 may select the second uplink 2125, for example, based on the network slice not being supported by a frequency/frequencies of the first uplink 2120 (e.g., not being supported by at least a portion of the frequency/frequencies of the first uplink). The wireless device 2110 may send a random access preamble (e.g., at step 2130) via the second uplink 2125 of the cell for a random access procedure via the cell. The wireless device 2110 may perform, via the cell, a random access procedure comprising sending a random access preamble via the second uplink 2125 of the cell (e.g., at step 2130). The wireless device 2110 may send (e.g., transmit) and/or receive transport blocks (e.g., packets) associated with the network slice via the second uplink 2125, for example, based on the random access procedure (e.g., during and/or after a random access procedure). Received power (e.g., 2140) in the cell (e.g., cell1) is shown relative to a location (e.g., 2150) of a wireless device (e.g., the wireless device 2110) within the cell. The received power (e.g., 2140) for the cell (e.g., cell1) may correspond to a wireless device's location (e.g., 2150), and/or distance, from a base station (e.g., base station 2105). The wireless device may determine that a received power of a cell (e.g., cell1) satisfies (e.g., is equal to or greater than) the power value. The wireless device 2110 may select a cell (e.g., cell1) for a network slice (e.g., network slice1), for example, based on determining that the received power of the cell satisfies the power value. Physically, a coverage area of an NUL may comprise a coverage area of an SUL. A wireless device may use an NUL (e.g., based on a power value/threshold), for example, if the wireless device is located in the NUL coverage area. The wireless device may use an SUL (e.g., in the NUL coverage area), for example, if the NUL does not support a network slice that the wireless device needs. For example, if the wireless device is located within a first coverage area (e.g., NUL area) of a cell, the wireless device may select a communication link in a second coverage area (e.g., SUL area) if a communication link in the first coverage area (e.g., NUL) does not support a network slice and if the communication link in the second coverage area (e.g., SUL) does support the network slice. The wireless device may determine a received power (e.g., 2140) above a threshold, such as if the wireless device is located (e.g., based on location 2150 being at or to the left of location 2180, such as at location 2170) in the cell and has a received power 2140 along the cell1 curve that is greater than the power value 2160. The wireless device may select the cell, for example, based on the received power being above the threshold and based on at least one of the communication links in at least one coverage area (e.g., SUL of the SUL coverage area) supporting the network slice. The wireless device may select the cell, for example, but use the SUL (e.g., rather than the NUL) even if the wireless device may be in the NUL area. If the wireless device is located at a location in which it determines a received power (e.g., 2140) below a threshold, such as if the wireless device is located (e.g., based on location 2150 at or to the right of location 2180) and has a received power 2140 along the cell1 curve that is less than the power value 2160, the wireless device may not select the cell (or the wireless device may select the cell but use the SUL that supports the network slice). The wireless device 2110 may be located within a coverage area of a cell (e.g., cell1) and may not be configured for a first frequency (e.g., NUL frequency1) of the cell, such as the network slice (e.g., network slice 1) may not be configured for the first frequency (e.g., NUL frequency1) of the cell. A coverage area/region (e.g., cell1's SUL using frequency2) may be used to extend cell coverage for the wireless device to use the network slice (e.g., network slice1), for example, based on the same frequencies of the coverage area/region and the network slice. The wireless device 2110 may select the cell (e.g., cell1), for example, based on at least one communication link (e.g., cell1's SUL using frequency2) supporting the network slice.

A wireless device may select a second (e.g., secondary/supplementary) uplink, for example, if a received power of a cell comprising the second uplink is equal to or greater than the power value. The wireless device may select the second, for example, if the second uplink supports at least one network slice of the wireless device (e.g., uses/supports a frequency/frequencies of the network slice). The wireless device may select the second uplink, for example, if the network slice does not supporting a frequency/frequencies (e.g., at least a portion of the frequency/frequencies) of a first (e.g., primary/normal) uplink. The wireless device may be in an RRC idle state or in an RRC inactive state. The wireless device may ignore a power threshold for selecting the second uplink, for example, based on the network slice not supporting a frequency of the first uplink. Selecting the second uplink may be based on the second uplink supporting the network slice. At least a portion of the second uplink may be within a frequency range to which the network slice is restricted. At least a portion of the first uplink may not be within the frequency range for the network slice. The wireless device may select the second uplink, for example, based on at least a portion of the second uplink being within the frequency range of the network slice and/or at least a portion of the first uplink not being within the frequency range of the network slice.

The wireless device may measure an RSRP (e.g., and/or RSRQ) of one or more cells. The wireless device may monitor one or more reference signals (e.g., synchronization signal(s)) of the one or more cells. The wireless device may determine that the received power (e.g., the RSRP and/or the RSRQ) of at least one cell is equal to or greater than the power threshold for selection between a first uplink and at least a second uplink of the at least one cell, such as shown in FIG. 21. The received power of a cell being equal to or greater than the power threshold may indicate that the wireless device may select a first uplink (e.g., a normal uplink) for uplink transmissions (e.g., random access preamble transmission for a random access) via a first cell. Based on determining the received power of the first cell being equal to or greater than the power threshold and/or based on the SIB, the wireless device may determine, know, or realize that the wireless device may use the first uplink (e.g., the normal uplink), for a random access procedure (e.g., to send a random access preamble for the random access procedure), which may not support the network slice (e.g., network slice1 in FIG. 21), for example, if the wireless device selects the first cell (e.g., cell1 in FIG. 21). Based on determining the received power of the first cell being equal to or greater than the power threshold and/or based on the SIB, the wireless device may expect or forecast that a base station serving, operating, or controlling the first cell may configure the wireless device to use the first uplink, which may not support the network slice, after a random access procedure on the first cell via the first uplink. If the wireless device performs a random access via the first uplink of the first cell and/or establishes a connection (e.g., RRC connection) via the first cell, the base station that serves, operates, or controls the first cell may configure the wireless device to use the first uplink (e.g., the normal uplink).

A wireless device may not select a first uplink of a first cell, for a random access procedure on the first cell, based on one or more of: a received power (e.g., RSRP and/or RSRQ) of the first cell being equal to or greater than a power threshold; and/or at least a portion of the first uplink (e.g., a normal uplink) not being within a frequency/frequency range of the network slice (e.g., as shown in FIG. 20). A wireless device may not select the first uplink of the first cell, for example, based on a cell selection criterion being fulfilled/satisfied for the first cell. The wireless device may not select the first uplink of the first cell, for example, if the received power of the first cell is equal to or greater than the power threshold and at least a partial frequency band of the first uplink of the first cell does/may not the network slice. The at least a portion of the first uplink (e.g., a normal uplink) may comprise at least one of: any frequency portion of the first uplink; or all frequency portion of the first uplink (e.g., as shown in examples of cell1, cell2, and/or cell 4 in FIG. 18).

A SIB (e.g., the one or more SIBs, SIB1, etc.) may comprise a carrier frequency range of at least one of: a first cell; a downlink of the first cell; a first uplink of the first cell; a second uplink of the second cell; and/or the like. The one or more SIBs (e.g., the SIB and/or the SIB1) may indicate frequency ranges of the first uplink and/or the second uplink of the first cell. The wireless device may receive the one or more SIBs. The wireless device may determine, based on the frequency ranges indicated in the one or more SIB s, whether the first uplink of the first cell supports the network slice and/or whether to select/use the first uplink of first cell for a random access. The wireless device may determine, based on the frequency ranges indicated in the one or more SIBs, that the first uplink (e.g., a portion or all of frequency band of the first uplink) of the first cell does not support the network slice and/or the wireless device may determine to not select/use the first uplink of first cell for a random access procedure via the first cell. The wireless device may determine, based on the frequency ranges indicated in the one or more SIBs, that a second uplink (e.g., a portion or all of frequency band of the second uplink) of the first cell supports the network slice and/or the wireless device may determine to select/use the second uplink of first cell for a random access procedure via the first cell.

One or more SIBs (e.g., the SIB and/or the SIB1) may indicate the at least one first network slice that the first uplink of the first cell supports and/or the at least one second network slice that the second uplink supports. A wireless device may receive the one or more SIBs. The wireless device may determine whether the at least one first network slice comprises the network slice and/or whether the at least one second network slice comprises the network slice. The wireless device may determine whether to select/use the first uplink of the first cell, for example, based on the at least one first network slice of the first uplink and/or based on the at least one second network slice of the second uplink. The wireless device may determine to not select/use the first uplink of the first cell, for example, based on the at least one first network slice of the first uplink not comprising the network slice and/or the received power of the first cell being is greater than or equal to the power threshold. The wireless device may determine to select/use the second uplink of the first cell, for example, based on the at least one second network slice of the second uplink comprising the network slice and/or the received power of the first cell being greater than or equal to the power threshold.

A wireless device may send a random access preamble via a second uplink of a cell for a random access to the cell, for example, if a received power of the first cell is greater than or equal to a power threshold. The wireless device may perform, via the second uplink and/or the first cell, the random access procedure comprising sending a random access preamble via the second uplink of the first cell. The wireless device may send (e.g., transmit) and/or receive transport blocks (e.g., packets) associated with the network slice via the second uplink based on the random access procedure (e.g., during or after a random access procedure).

A wireless device may select (or may not select) a cell and/or an uplink of the cell based on one or more network slices for the wireless device to use (e.g., that may be required for wireless communications by the wireless device). The wireless device may determine, to communicate packets associated with a network slice. The network slice may be restricted to one or more frequencies (and/or frequency range(s)). The wireless device may receive a system information block of a first cell. The system information block may comprise a power threshold (e.g., power value, RSRP threshold, RSRQ threshold, etc.) for selection between a first uplink uplink (e.g., an NUL) and a second uplink (e.g., an SUL). The wireless device may perform a random access procedure via a second cell based on at least one of: a received power of the first cell being equal to or less than the power threshold; and/or at least a portion of the second uplink of the first cell not being within the frequency range.

Figure 22:
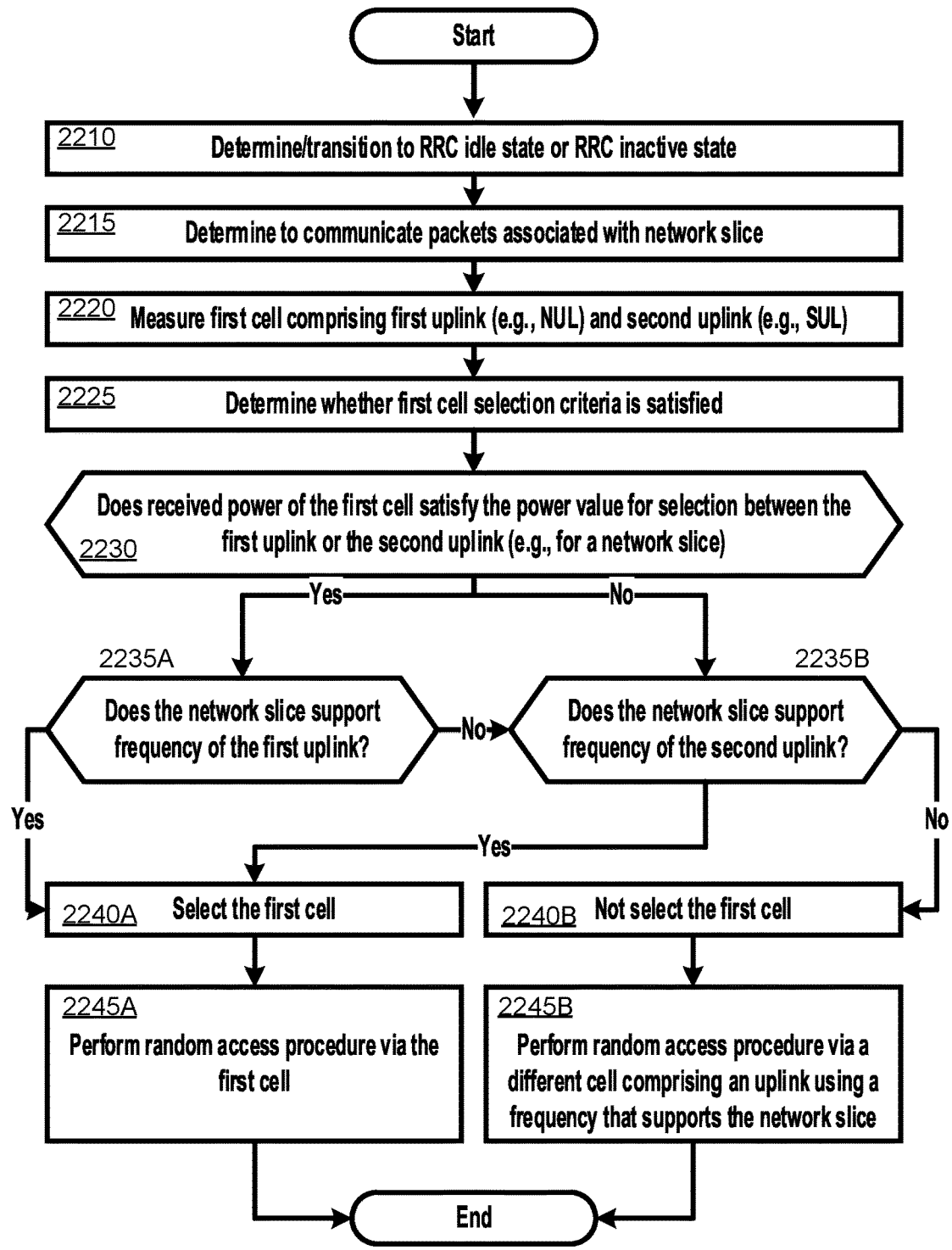
FIG. 22 shows an example method for cell selection.

FIG. 22 shows an example method for cell selection. At step 2210, a wireless device may determine a state and/or determine to transition to a state. The wireless device may enter the state (e.g., RRC idle state or RRC inactive state). At step 2215, the wireless device may determine whether to communicate packets associated with a network slice. For example, the wireless device may determine to communicate information for a service that may require use of a network slice (e.g., for eMBB, URLLC, and/or any type of communication service). At step 2220, the wireless device may measure a first cell which comprises a first uplink (e.g. NUL) and at least a second uplink (e.g., SUL). The measurements may comprise, for example, measuring signal levels (e.g., reference signal levels) from a serving cell and/or neighboring cell(s) and/or reporting such measurements to a base station serving the wireless device. At step 2225, the wireless device may determine whether first cell selection criteria has been satisfied. The first cell selection criteria may comprise, for example, one or more of: whether there is no other higher priory cell/carrier/frequency; whether the first cell does not belong to a restricted area (e.g., cell black list, tracking area black list, frequency black list, etc.); whether the first cell belongs to allowed PLMN(s); and/or whether the wireless device has a permission to access the first cell (e.g., if the first cell is a CSG and/or a CAG, the wireless device needs a permission to access, etc.). A step 2230, the wireless device may determine whether a received power of the first cell satisfies (e.g., is equal to or is greater than) the power value for selection between the first uplink or the second uplink. If the wireless device determines (e.g., "Yes" path) that the received power of the first cell satisfies (e.g., is equal to or greater than) the power value for selection of the first uplink or the second uplink, then the wireless device may proceed to step 2235A. If the wireless device determines (e.g., "No" path) that the received power of the first cell does not satisfy (e.g., is less than) the power value for selection of the first uplink or the second uplink, the wireless device proceed to step 2235B.

At step 2235A, the wireless device may determine whether the network slice supports the frequency of the first uplink. If the wireless determines that the network slice does not support the frequency of the first uplink, the wireless device may proceed to step 2235B. If the wireless device determines that the received power of the first cell does not satisfy (e.g., is less than) the power value of the first uplink or the second uplink, the wireless device may proceed to step 2235B. At step 2235B the wireless device may determine whether the network slice supports the frequency of the second uplink. If the wireless device determines (e.g., "Yes" path) that the network slice supports the frequency of the first uplink, or that the network slice supports the frequency of the second uplink, then at step 2240A, the wireless device may select the first cell. At step 2240B, if the wireless determines (e.g., "No" path) that the network slice does not support the frequency of the second uplink, the wireless device may not select the first cell. At step 2245A, the wireless device may perform a random access procedure via the first cell (e.g., after selecting the first cell). At step 2245B, the wireless device may perform a random access procedure via a different cell that may comprise an uplink using a frequency that supports the network slice. For example, step 2245B may comprise returning to one or more of steps 2210, 2215, 2225, and/or 2235B to determine a cell for selection that comprises an uplink using a frequency that supports the network slice. Any of the steps of FIG. 22 may be repeated, performed in any other order, and/or performed for any quantity of cells, communication links (e.g., uplink(s), downlink(s), uplink(s)/downlink(s), NUL(s), SUL(s), etc.), network slices, frequencies, and/or frequency ranges.

A base station may receive/send communications from/to the wireless device associated with any of the steps of FIG. 22. For example, a base station may receive communications from the wireless device reporting a selection (e.g., selection history and/or prior decisions made by the wireless device). The wireless device may provide an indication to the base station that the wireless device either selected, or did not select, one or more cells, for example, based on one or more of: a received power/quality, a power threshold relationship, a network condition, throughput, quality of service conditions, and or the like.

Performing a random access procedure via at least a second cell may be based on a cell selection criterion being fulfilled/satisfied for the first cell. The cell selection criterion may be based on at least the received power of the first cell. Performing a random access procedure via the second cell may be based on a cell selection criterion being fulfilled/satisfied for the second cell. A wireless device may not select the first cell, to use (e.g., camp on), based on: the received power of the first cell being equal to or less than the power threshold; and/or at least a portion of a link (e.g., an SUL) not being within a frequency range. The wireless device not selecting the first cell may be based on a cell selection criterion being fulfilled/satisfied for the first cell. The wireless device may deprioritize the first cell, to use (e.g., camp on). Deprioritizing the first cell may be based on: the received power of the first cell being equal to or less than the power threshold; and/or at least a portion of the link (e.g., SUL) not being within the frequency range. The deprioritizing may comprise applying a negative weight value for selecting the first cell.

A portion of a link (e.g., an NUL, an SUL, etc.) may comprise at least one of: any frequency portion of the link; or all frequency portions of the link. The received power of the first cell being equal to or less than the power threshold may indicate selection of the link (e.g., SUL) for uplink transmissions via the first cell. The network slice may support a frequency of a second cell. At least a portion of the second cell may be within the frequency range. The wireless device may send (e.g., transmit) transport blocks associated with the network slice via the second cell. The wireless device may receive, from a base station (e.g., a core network node, a network, etc.), parameters indicating the frequency range for the network slice. The wireless device may be in an RRC idle state or in an RRC inactive state.

Determining to communicate the packets associated with the network slice may comprise at least one of: determining to start a service associated with the network slice; receiving, by a lower layer of a wireless device from a higher layer of the wireless device, an indication of initiation of a service/session associated with the network slice; receiving, by the wireless device, a paging message (e.g., indicating at least one of: the network slice; the frequency range; a list of carrier/cell associated with the frequency range and/or the network slice; and/or the like); and/or the like. The wireless device may use (e.g., camp on) the first cell for wireless communications. The wireless device may determine to perform a cell reselection based on: determining to communicate the packets associated with the network slice; the received power of the first cell being equal to or less than the power threshold; at least a portion of a link (e.g., an SUL) not being within the frequency range; and/or the like. Performing the random access procedure via the second cell may be based on the cell reselection.

A system information block may comprise a carrier frequency range of at least one of: the first cell; a downlink of the first cell; the normal uplink of the first cell; the supplementary uplink of the second cell; and/or the like. A wireless device may receive a system information block of a first cell. The system information block may comprise a power threshold for selection between a normal uplink and a supplementary uplink. The wireless device may perform a random access procedure via a second cell based on: a received power of the first cell satisfying (e.g., being equal to or less than) the power threshold; and/or at least a portion of the supplementary uplink not being within a frequency range to which a network slice may be restricted.

A wireless device may receive a system information block of a cell. The system information block may comprise a power threshold for selection between a first uplink (e.g. normal uplink, uplink, etc.) and at least a second uplink (e.g., supplementary uplink). The wireless device may be configured to select the first uplink if a received power of the cell satisfied (e.g., is equal to or greater than) the power threshold. The wireless device may determine to communicate packets associated with a network slice. The wireless device may select a second uplink when a received power of the cell satisfies (e.g., is equal to or greater than) the power value, based on the network slice not supporting a frequency of the first uplink. The wireless device may send a random access preamble via the second uplink of the cell.

A wireless device may ignore a power threshold if selecting a second uplink, for example, based on a network slice not supporting a frequency of a first uplink. The wireless device may perform, via the cell, a random access procedure comprising sending a random access preamble via the second uplink of the cell. The wireless device may send (e.g., transmit) transport blocks associated with the network slice via the second uplink based on the random access procedure (e.g., during the random access procedure and/or after a successful random access procedure). The first uplink may be a normal uplink (or any other type of communication link). The second uplink may be a supplementary uplink (or any other type of communication link). Selecting the second uplink may be based on the second uplink supporting the network slice.

A wireless device may receive, from a base station, parameters indicating a frequency range for a network slice. At least a portion of a second uplink may be within the frequency range to which the network slice may be restricted. At least a portion of the first uplink may not be within a frequency range for the network slice. The wireless device may select the second uplink, for example, based on at least a portion of the second uplink being within the frequency range and/or at least a portion of the first uplink not being within the frequency range. The wireless device may be in an RRC idle state or in an RRC inactive state.

Figure 23:
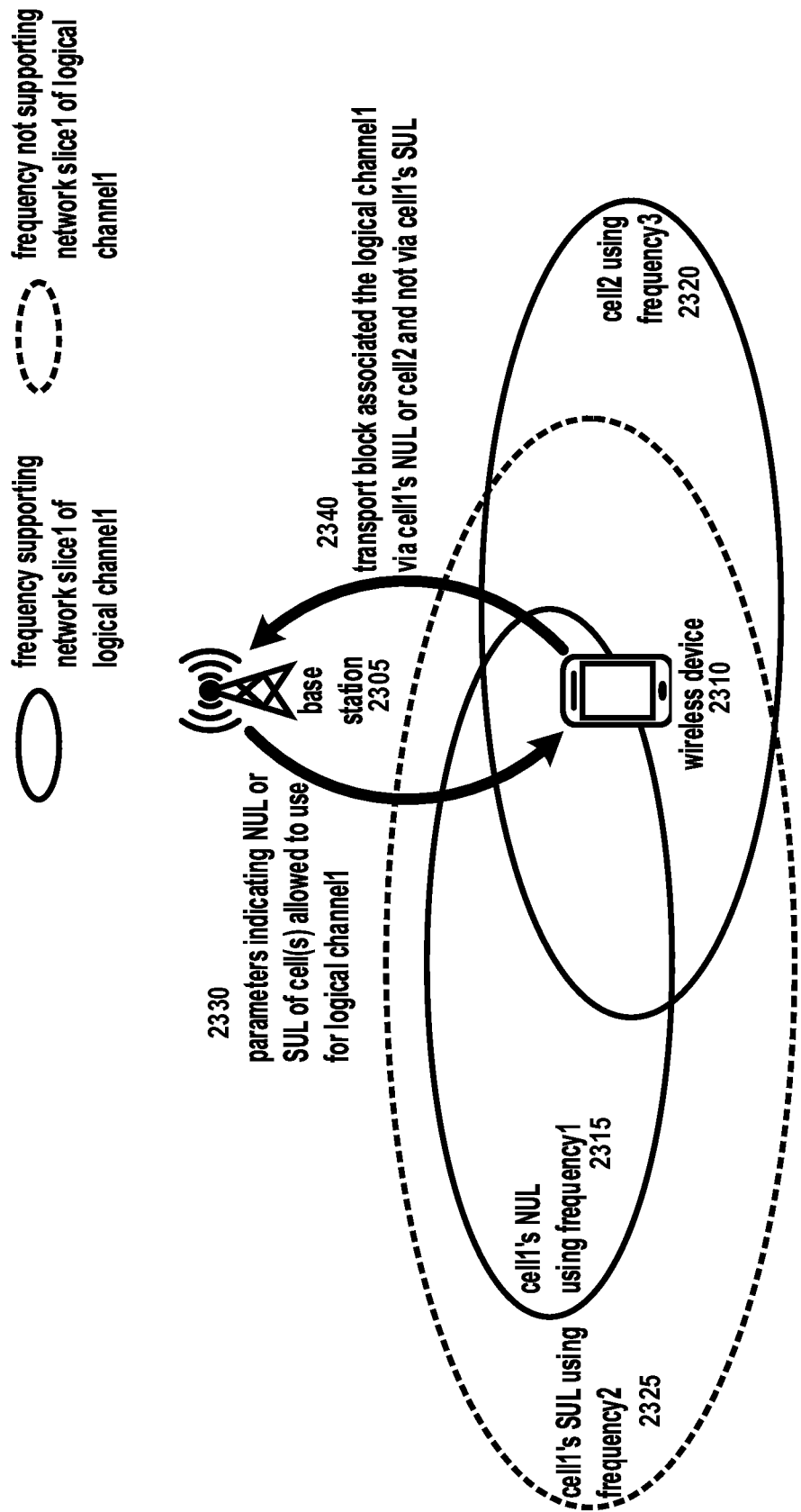
FIG. 23 shows an example of cell selection for a wireless device.

FIG. 23 shows an example of cell selection for a wireless device. A wireless device 2310 may be in an RRC connected state. The wireless device 2310 may have an RRC connection with a base station 2305. The RRC connection may be via one or more cells (e.g., cell1 and/or cell2). The one or more cells (and/or a frequency band of the one or more cells) may support one or more network slices and/or may not support at least some network slices. One or more uplinks (e.g., NUL, SUL, any other uplink(s)) of the one or more cells (e.g., and/or a frequency band of the one or more uplinks of the one or more cells) may support one or more network slices and/or may not support at least some network slices. One or more uplinks of the one or more cells may support one or more frequencies. The one or more frequencies may support one or more network slices of one or more logical channels. The wireless device 2310 may located within one or more coverage areas/regions, such as three regions shown as 2315, 2320, and/or 2325. A first area/region (e.g., 2315) may provide coverage for a first cell's first uplink (e.g., cell1's NUL using frequency1). A second area/region (e.g., 2320) may provide coverage for a second cell's uplink (e.g., cell2 using frequency3). A third area/region (e.g., 2325) may provide coverage (e.g., an extended coverage) for the first cell's second uplink (e.g., cell1's SUL using frequency2). The third area/region (e.g., 2325) may not support a network slice of a logical channel (e.g., network slice1 of logical channel 1) (shown in a dotted line). The first area/region (e.g., 2315) and/or at least a second region/area (e.g., 2320) may support a frequency (and/or frequencies) that may support one or more network slices (e.g., network slice1) of one or more logical channels (e.g., logical channel1). At least a third region (e.g., 2325) may not support at least one network slice (e.g., network slice1) of a logical channel (e.g., logical channel1). The base station 2305 may send (e.g. transmit) (e.g., at step 2330), to the wireless device 2310, one or more parameters indicating one or more uplinks (e.g., NUL(s) and/or SUL(s)) of one or more cells that may be configured to use one or more logical channels (e.g., logical channel1). The one or more parameters may comprise a power threshold. The wireless device 2310 may use resources that the base station 2330 may assign, for example, regardless of a power threshold. Additionally or alternatively, the wireless device 2310 may select an SUL or an NUL (e.g., and/or corresponding resources), based on a power threshold (e.g., if the wireless device 2310 is in RRC idle state or RRC inactive state). For example, the wireless device 2310 may determine a received power from the base station 2330. The wireless device 2310 may perform one or more procedures to determine whether the received power satisfies the power threshold (e.g., such as described with respect to step 2035 of FIG. 20). The wireless device 2310 may send (e.g., transmit) (e.g., at step 2340), to the base station 2305, one or more transport blocks (e.g., packets) associated with a logical channel (e.g., logical channel1) via any uplink using a frequency supporting the network slice of the logical channel (e.g., cell1's NUL using frequency or cell2 using frequency3). The wireless device may not send the one or more transport blocks associated with the logical channel via any uplink using a frequency that does not support the network slice of the logical channel (e.g., cell1's SUL). The wireless device 2310 may have multiple communication links available for the network slice. The base station 2305 may provide a list of cells, links (e.g., NUL(s), SUL(s), and/or any other links), and/or network slices for a particular frequency/frequencies (and/or frequency range(s)) for one or more logical channels that the wireless device 2310 may access. Any quantity of cells may be provided. Each cell, of one or more cells, may comprise any quantity of coverage areas/regions. Each coverage area/region may be associated with one or more links (e.g., uplink(s), downlink(s), uplink(s)/downlink(s)). Any link of the one or more links may comprise any type of link (e.g., an NUL, an SUL, and/or any other uplink, downlink, and/or uplink/downlink).

One or more uplink configurations may be used for one or more logical channels associated with one or more network slices. A wireless device may receive at least one RRC message (e.g., the parameters indicating NUL or SUL of cell(s) allowed to use for logical channel1) comprising: first configuration parameters indicating a cell (e.g., cell1) comprising a first uplink (e.g., normal uplink) and a second uplink (e.g., supplementary uplink); and/or second configuration parameters of a logical channel (e.g., logical channel1). The logical channel may be for a network slice. The second configuration parameters may indicate whether the logical channel is mapped to the first uplink of the cell and/or whether the logical channel is mapped to the second uplink of the cell. The wireless device may receive an uplink grant indicating a radio resource of the first uplink. The wireless device may send (e.g., transmit) at least one transport block of the logical channel via the radio resource, based on the second configuration parameter indicating that the logical channel is mapped to the first uplink (e.g., the logical channel is allowed to use the first uplink).

The wireless device may receive at least one RRC message (e.g., the parameters indicating NUL or SUL of cell(s) allowed to use for logical channel1) comprising: first configuration parameters indicating the cell comprising the first uplink (e.g., normal uplink) and the second uplink (e.g., supplementary uplink); and/or second configuration parameters of a logical channel (e.g., logical channel1). The at least one RRC message may comprise at least one of: an RRC reconfiguration message, an RRC establishment message, an RRC reestablishment message, an RRC resume message, a handover command message, and/or the like. The wireless device may be in an RRC connected state. The receiving the at least one RRC message may be based on the wireless device being in the RRC connected state.

The first configuration parameters (e.g., CellGroupConfig, ServingCellConfigCommon, ServingCellConfig, ServCellIndex, UplinkConfig, etc.) may comprise configuration parameters of the first uplink and/or the second uplink of the first cell. The first configuration parameters may comprise configuration parameters of a second cell and/or one or more uplink of the second cell. The configuration parameters of the first uplink and/or the second uplink of the first cell, the first cell, and/or the second uplink may comprise at least one of: a cell index, an uplink index, bandwidth part configuration parameters, frequency information, bandwidth information, PUCCH/PUSCH configuration parameters, power configuration parameters, and/or the like.

The second configuration parameters (e.g., LogicalChannelConfig, allowedServingCells, allowedUplinks, etc.) may indicate whether the logical channel (e.g., and/or logical channel group comprising the logical channel) is mapped to (e.g., allowed to use) the first uplink of the cell and/or whether the logical channel (e.g., and/or logical channel group comprising the logical channel) is mapped to (e.g., allowed to use) the second uplink of the cell. The second configuration parameters may comprise at least one of: a bucket size duration, a configured grant allowed indication, logical channel priority information, scheduling request identifier, SDAP/PDCP/RLC/MAC configuration parameters of the logical channel (e.g., the logical channel group, radio bearer, one or more QoS flows, PDU session, etc.), and/or the like. The second configuration parameters may indicate that the logical channel is for the network slice. The second configuration parameters may indicate that the logical channel is for a radio bearer of one or more QoS flows. The second configuration parameters may indicate that the one or more QoS flows are mapped to a PDU session for the network slice.

The second configuration parameters (e.g., LogicalChannelConfig) may indicate whether the logical channel is mapped to a third uplink of the cell (e.g., allowedServingCells, allowedUplinks, etc.). The second configuration parameters may indicate at least one of: whether the logical channel is mapped to (e.g., allowed to use) a first bandwidth part of the cell; whether the logical channel is mapped to (e.g., allowed to use) a second bandwidth part of the cell; and/or the like. The second configuration parameters may indicate at least one of: whether the logical channel is mapped to (e.g., allowed to use) a first beam (e.g., SSB, CSI-RS beam, etc.) of the cell; whether the logical channel is mapped to (e.g., allowed to use) a second beam (e.g., SSB, CSI-RS beam, etc.) of the cell; and/or the like.

A wireless device may send, to a base station, at least one RRC response message indicating completion of configuration based on the at least one RRC message. The at least one RRC response message may comprise at least one of an RRC reconfiguration complete message, an RRC establishment complete message, an RRC reestablishment complete message, an RRC resume complete message, and/or the like.

A wireless device may receive an uplink grant indicating a radio resource of the first uplink of the cell. The wireless device may send (e.g., transmit) a transport block of the logical channel via the radio resource, based on the second configuration parameters indicating that the logical channel is mapped to the first uplink (e.g., the logical channel is allowed to use the first uplink).

A wireless device may receive a second uplink grant indicating a second radio resource of the second uplink of the cell. The wireless device may not send (e.g., transmit) a transport block of the logical channel via the second radio resource, based on the second configuration parameters indicating that the logical channel is not mapped to the second uplink (e.g., the logical channel is not allowed to use the second uplink). The wireless device may send (e.g., transmit) a transport block of the logical channel via the first bandwidth part and/or the first beam based on the second configuration parameters indicating that the logical channel is allowed to use the first bandwidth part and/or the first beam. The wireless device may not send (e.g., transmit) a transport block of the logical channel via the second bandwidth part and/or the second beam based on the second configuration parameters indicating that the logical channel is not allowed to use the second bandwidth part and/or the second beam. The uplink grant and/or the second uplink grant may comprise at least one of: a downlink control channel (DCI) indication (e.g., via PDCCH) indicating the radio resource and/or the second radio resource; an RRC parameter (e.g., via an RRC message) indicating semi-persistent-scheduling (SPS) resources and/or configured grant resources comprising the radio resource and/or the second radio resource; a MAC control element or a DCI indication activating the SPS resources and/or the configured grant resources; and/or the like. The second configuration parameters may indicate that the logical channel is allowed to use the SPS resources and/or the configured grant resources.

Figure 24:
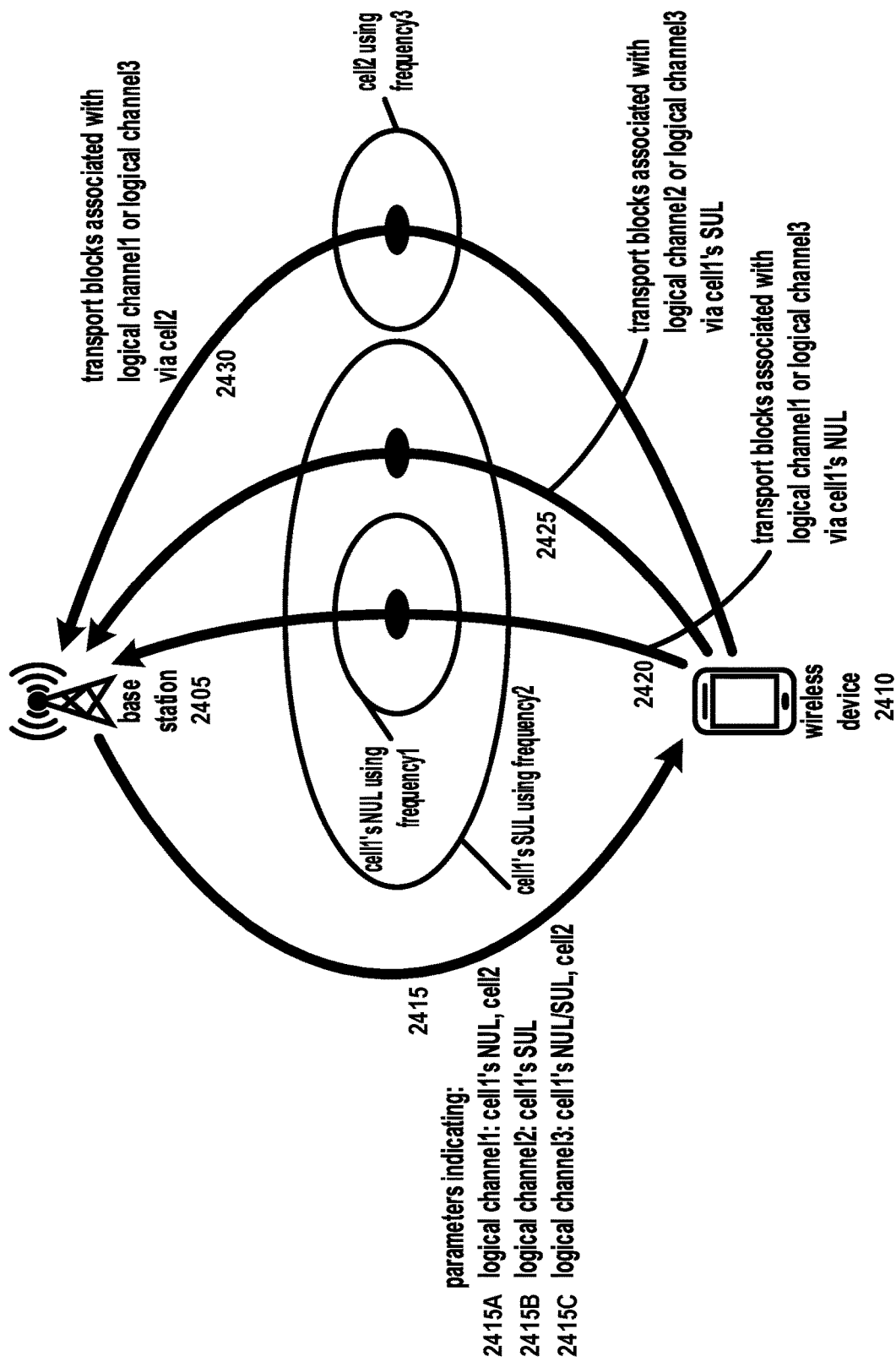
FIG. 24 shows an example of cell selection for a wireless device.

FIG. 24 shows an example of cell selection for a wireless device. A wireless device 2410 may determine whether to use an uplink configuration for a logical channel associated with a network slice. The wireless device 2410 may select which of several logical channels it may use as a communication link where such a determination may be based on at least one of: a network condition, a frequency, a network slice requirement, throughput, latency, quality of service, and/or the like. The base station 2405 may send, to the wireless device 2410, at least one message 2415 (e.g., RRC message). The at least one message may comprise a first parameter 2415A indicating that a first logical channel (e.g., logical channel1) is allowed to use a first uplink (e.g., normal uplink) of a first cell (e.g., cell1) and a second cell (e.g., cell2). The at least one RRC message may comprising a second parameter 2415B indicating that a second logical channel (e.g., logical channel2) is allowed to use a second uplink (e.g., supplementary uplink) of the first cell (e.g., cell1). The at least one RRC message may comprise a third parameter 2415C indicating that a third logical channel (e.g., logical channel3) is allowed to use the first uplink (e.g., normal uplink) of the first cell (e.g., cell1), the second uplink (e.g., supplementary uplink) of the first cell (e.g., cell1), and the second cell (e.g., cell2). The at least one message 2415 may comprise any quantity of parameters, one or more of which may indicate that quantity of logical channels that may be allowed to use for any quantity of communication links (e.g., uplinks, downlinks, uplink/downlink, etc.). The wireless device 2410 may receive an uplink grant indicating a radio resource. The wireless device may send (e.g., transmit) a transport block 2420 associated with the first logical channel and/or the third logical channel via the radio resource, for example, if the radio resource indicated by the uplink grant is associated with the first uplink 2415A (e.g., the normal uplink) of the first cell. The wireless device 2410 may send (e.g., transmit) a transport block 2425 associated with the second logical channel and/or the third logical channel via the radio resource, for example, if the radio resource indicated by the uplink grant is associated with the second uplink 2415B (e.g., the supplementary uplink) of the first cell. The wireless device may send (e.g., transmit) a transport block 2430 associated with the first logical channel and/or the third logical channel via the radio resource, for example, if the radio resource indicated by the uplink grant is associated with the second cell. The uplink grant may comprise at least one of: DCI (e.g., via PDCCH) indicating the radio resource; an RRC parameter indicating semi-persistent-scheduling (SPS) resources and/or configured grant resources comprising the radio resource; a MAC control element or DCI indication activating the SPS resources and/or the configured grant resources; and/or the like.

A wireless device may receive configuration parameters of a logical channel. The configuration parameters of the logical channel may indicate: whether the logical channel is mapped to a first uplink of a cell; whether the logical channel is mapped to a second uplink of the cell; and/or whether the logical channel is mapped to any other link of a cell. The wireless device may receive an uplink grant indicating a radio resource of the first uplink. The wireless device may send (e.g., transmit) at least one transport block of the logical channel via the radio resource, based on the second configuration parameter indicating that the logical channel is mapped to the first uplink. The configuration parameters may comprise one or more indication (e.g., explicit indications) of one or more cells and/or one or more uplinks of the one or more cells that may be mapped to the logical channel. The logical channel may be a logical channel group comprising one or more logical channels.

A wireless device may receive configuration parameters of a logical channel. The configuration parameters may indicate that the logical channel is mapped to one or more of a first uplink of a cell and a second uplink of the cell. The wireless device may receive an uplink grant indicating a radio resource of the first uplink. The wireless device may send (e.g., transmit) at least one transport block of the logical channel via the radio resource, based on the configuration parameter indicating that the logical channel is mapped to the first uplink.

A wireless device may receive at least one radio resource control message comprising configuration parameters of a logical channel. The configuration parameters may indicate at least one of a first uplink of a cell or a second uplink of the cell that is allowed to be used for (e.g., that may be mapped to) the logical channel. The wireless device may receive an uplink grant indicating a radio resource of the at least one of the first uplink or the second uplink. The wireless device may send (e.g., transmit) at least one transport block of the logical channel via the radio resource based on: the at least one radio resource control message; and/or the radio resource being of the at least one of the first uplink or the second uplink.

A base station may receive at least one message indicating: a network slice associated with a session of a wireless device; and a frequency range that is restricted to the network slice. The base station may send, to the wireless device and based on the at least one message, at least one radio resource control message. The radio resource control message may comprise: first configuration parameters indicating a cell comprising a first uplink and a second uplink; and/or second configuration parameters of a logical channel associated with the session. The second configuration parameters may indicate: whether the logical channel is mapped to the first uplink of the cell; and/or whether the logical channel is mapped to the second uplink of the cell. The base station may send, to the wireless device, an uplink grant indicating a radio resource of the first uplink. The base station may receive, from the wireless device, a transport block of the logical channel via the radio resource, based on the second configuration parameter indicating that the logical channel is mapped to the first uplink.

Figure 25:
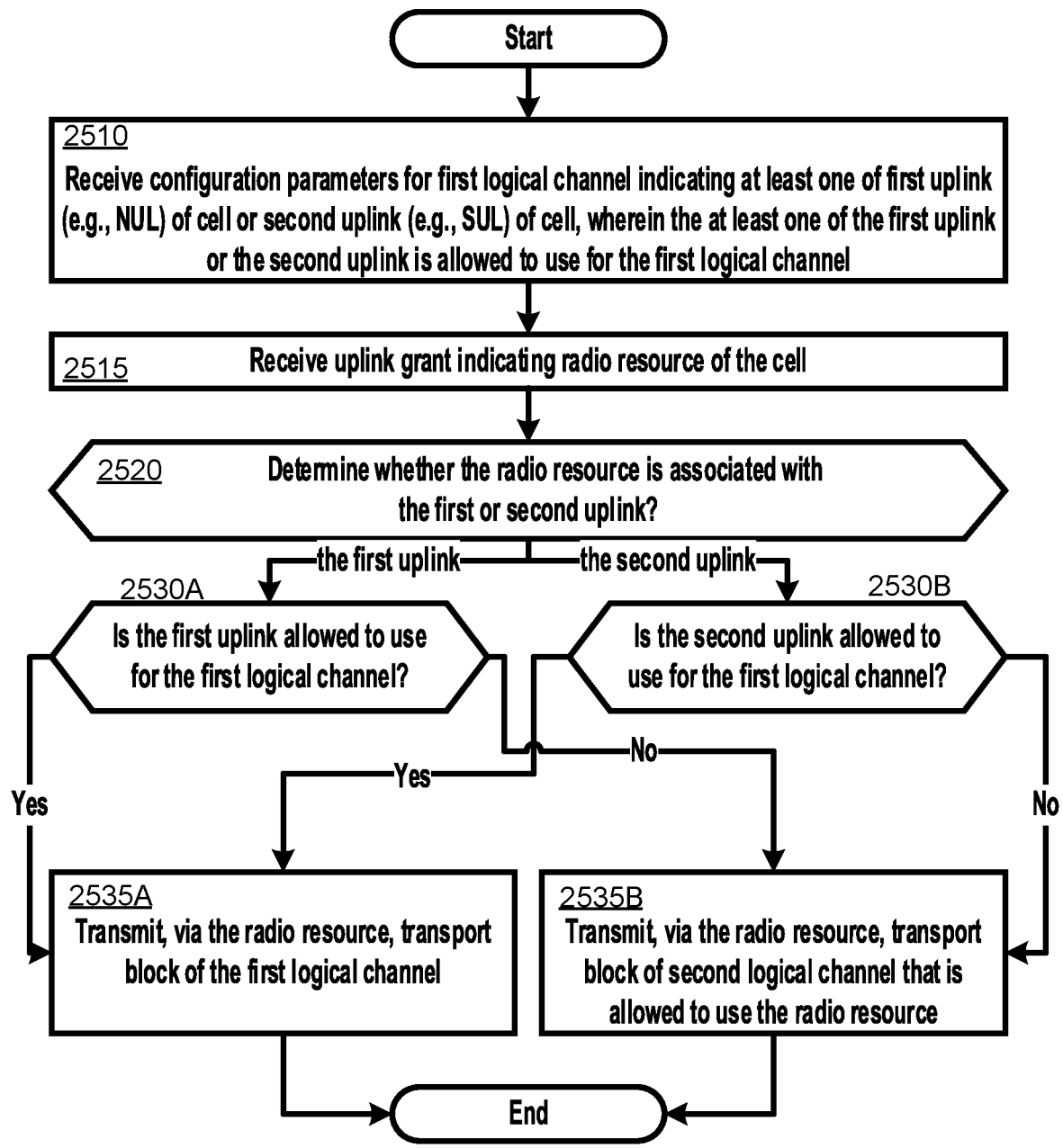
FIG. 25 shows an example method for cell selection.

FIG. 25 shows an example method for cell selection. The method may be performed by a wireless device and/or any other device (e.g., a base station). A wireless device may receive an uplink configuration for a logical channel associated with a network slice and sends (e.g., transmits) transport blocks based on the uplink configuration. At step 2510, the wireless device may receive configuration parameters for a first logical channel indicating at least one of: a first uplink (e.g., NUL), or a second uplink (e.g., SUL) of the cell, wherein the at least one of the first uplink or the second uplink is allowed to use the first logical channel. At step 2515, the wireless device may receive an uplink grant indicating radio resource of the cell. At step 2520, the wireless device may determine whether the radio resource is associated with the first uplink (e.g., NUL) and/or with the second uplink (e.g., SUL). If the wireless device determines that the radio resource is associated with the first uplink, the wireless device station may proceed to step 2530A. If the wireless device determines that the radio resource is not associated with the first uplink (and/or is associated with the second uplink), the wireless device may proceed to step 2530B. If the wireless device determines that the first uplink (e.g., NUL) is allowed to use the first logical channel, then the wireless device may proceed to step 2535A. At step 2535A, the wireless device may send (e.g., transmit), via the radio resource, the transport block(s) of the first logical channel. If the wireless device determine that either the first uplink (e.g., NUL) is not allowed to use the logical channel, or that the second uplink (e.g., SUL) is not allowed to use the logical channel, at step 2535B the wireless device may send (e.g., transmit), via the radio resource, the transport block(s) of a second logical channel that is allowed to use the radio resource. The wireless device, based on prior decision steps, may determine the second logical channel (e.g., a different channel) based on any of the prior decision steps or additional selection criteria. Any of steps 2520, 2530A/2530B, and/or 2535A/2535B may be repeated or duplicated, for example, for each of any quantity of communication links (e.g., uplink, downlink, uplink/downlink, etc.), any quantity of logical channels, and/or any quantity of radio resources.

A base station may send, to a wireless device, an uplink configuration for a logical channel associated with a network slice and receives transport blocks based on the uplink configuration. A wireless device may receive at least one RRC message comprising: first configuration parameters indicating a cell comprising a first uplink and a second uplink; and second configuration parameters of a logical channel. The second configuration parameters may indicate whether the logical channel is mapped to the first uplink of the cell and whether the logical channel is mapped to the second uplink of the cell. The wireless device may receive an uplink grant indicating a radio resource of the first uplink. The wireless device may send (e.g., transmit) at least one transport block of the logical channel via the radio resource, based on the second configuration parameter indicating that the logical channel is mapped to the first uplink (e.g., the logical channel is allowed to use the first uplink). The wireless device may receive a second uplink grant indicating a second radio resource of the second uplink. The wireless device may not send (e.g., transmit) at least one transport block of the logical channel via the second radio resource, based on the second configuration parameter indicating that the logical channel is not mapped to the second uplink (e.g., the logical channel is not allowed to use the second uplink).

The second configuration parameters may indicate whether the logical channel is mapped to a third uplink of the cell. The second configuration parameters may indicate at least one of: whether the logical channel is mapped to a first bandwidth part of the cell; whether the logical channel is mapped to a second bandwidth part of the cell; and/or the like. The second configuration parameters may indicate at least one of: whether the logical channel is mapped to a first beam of the cell; whether the logical channel is mapped to a second beam of the cell; and/or the like.

The wireless device may receive configuration parameters of a logical channel indicating: whether the logical channel is mapped to a first uplink of a cell; and whether the logical channel is mapped to a second uplink of the cell. The wireless device may receive an uplink grant indicating a radio resource of the first uplink. The wireless device may send (e.g., transmit) a transport block of the logical channel via the radio resource, based on the second configuration parameter indicating that the logical channel is mapped to the first uplink. The configuration parameters may comprise one or more explicit indications of one or more cells and/or one or more uplinks of the one or more cells that are mapped to the logical channel. The logical channel may be a logical channel group comprising one or more logical channels.

A wireless device may receive configuration parameters of a logical channel. The configuration parameters may indicate that the logical channel is mapped to one or more of a first uplink of a cell and a second uplink of the cell. The wireless device may receive an uplink grant indicating a radio resource of the first uplink. The wireless device may send (e.g., transmit) a transport block of the logical channel via the radio resource, based on the configuration parameter indicating that the logical channel is mapped to the first uplink.

A wireless device may receive at least one radio resource control message comprising configuration parameters of a logical channel. The configuration parameters may indicate at least one of a first uplink of a cell or a second uplink of the cell that is allowed to use for (be mapped to) the logical channel. The wireless device may receive an uplink grant indicating a radio resource of the at least one of the first uplink or the second uplink. The wireless device may send (e.g., transmit) a transport block of the logical channel via the radio resource based on: the at least one radio resource control message; and the radio resource being of the at least one of the first uplink or the second uplink.

Figure 26:
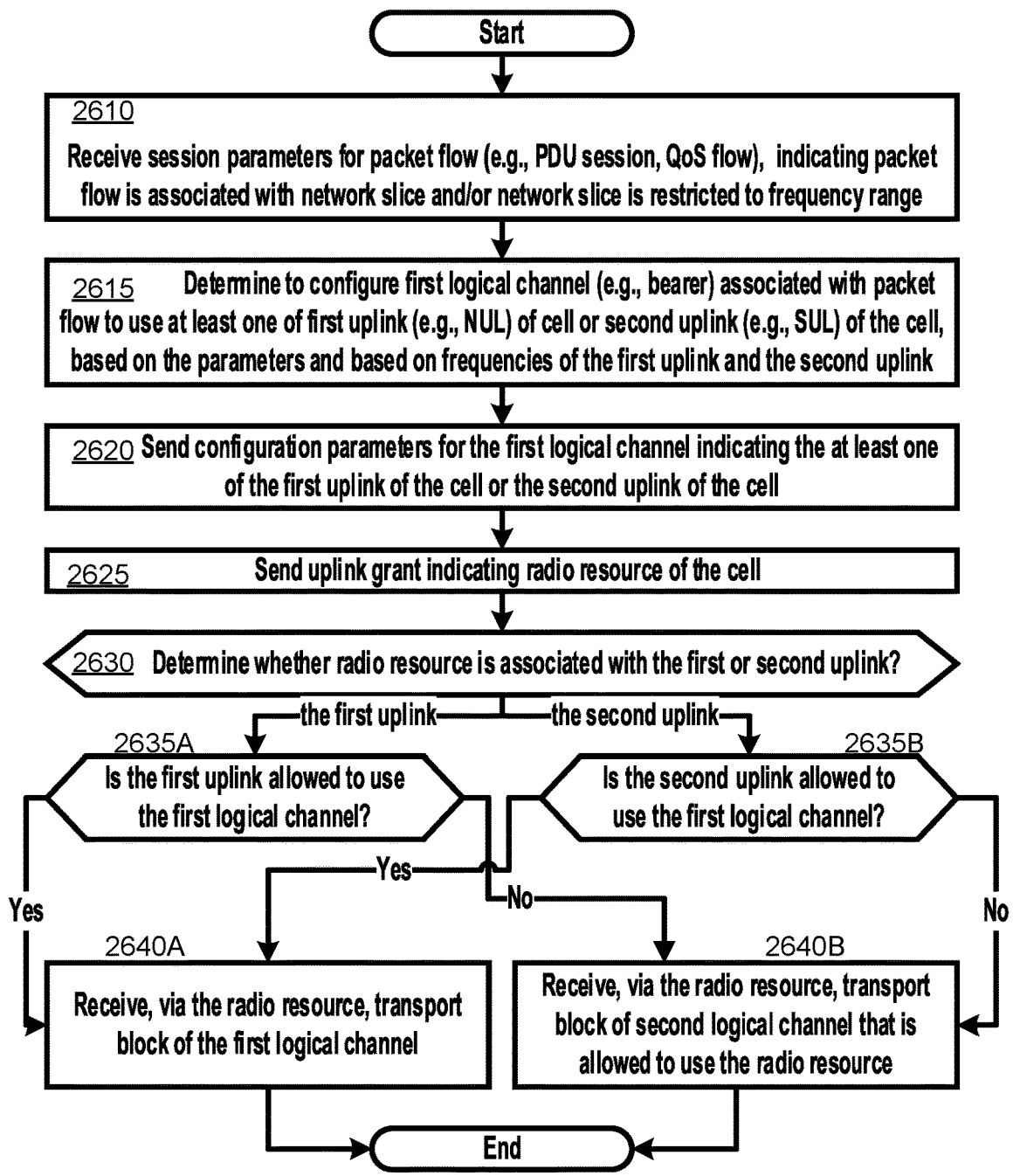
FIG. 26 shows an example method for cell selection.

FIG. 26 shows an example method for cell selection. The method may be performed by a base station and/or any other device (e.g., a base station). A base station may send, to a wireless device, an uplink configuration for a logical channel associated with a network slice and receives transport blocks based on the uplink configuration. At step 2610, a base station may receive session parameters for a packet flow (e.g., a PDU session, a QoS flow, etc.) of wireless device. The session parameters may indicate that the packet flow is associated with at least one network slice and/or that the at least one network slice is restricted to a particular frequency (and/or frequency range). At step 2615, the base station may determine whether to configure a first logical channel (e.g. a bearer) associated with the packet flow to use at least one of first uplink (e.g., NUL) of a cell, or a second uplink (e.g. SUL) of the cell, for example, based on the parameters and/or based on frequencies of the first uplink and the second uplink. At step 2620, the base station may send, to the wireless device, configuration parameters for the first logical channel indicating the at least one of: the first uplink of the cell, and/or the second uplink of the cell. At step 2625, the base station may send, to the wireless device, an uplink grant indicating radio resource of the cell. At step 2630, the base station may determine whether the radio resource is associated with the first uplink. If the base station determines that the radio resource is associated with the first uplink, the base station may proceed to step 2635A. If the base station determines that the radio resource is not associated with the first uplink (and/or is associated with the second uplink), the base station may proceed to step 2635B. At step 2635A, the base station may determine whether the first uplink may be allowed to use the first logical channel. At step 2635B, the base station may determine whether the second uplink may be allowed to use the first logical channel. If the base station determines that the first uplink (e.g., NUL) or the second uplink (e.g., SUL) may use the first logical channel, then the base station may proceed to step 2640A. At step 2640A, the base station may receive, via the radio resource, at least one transport block of the first logical channel. If the base station determines that neither the first uplink nor the second uplink may be allowed to use the first logical channel, then the base station may receive (e.g., at step 2640B), via the radio resource, at least one transport block of a second logical channel that is allowed to use the radio resource. Any of steps 2615, 2620, 2625, 2630, 2635A/2635B, and/or 2640A/2640B may be repeated or duplicated, for example, for each of any quantity of communication links (e.g., uplink, downlink, uplink/downlink, etc.), any quantity of logical channels, and/or any quantity of radio resources.

A base station may receive at least one message indicating: a network slice associated with a session of a wireless device; and/or a frequency (and/or a frequency range) to which the network slice may be restricted. The base station may send (e.g., transmit), to the wireless device and based on the at least one message, at least one radio resource control message comprising: first configuration parameters indicating a cell comprising a first uplink and a second uplink; and second configuration parameters of a logical channel associated with the session. The second configuration parameters may indicate: whether the logical channel is mapped to the first uplink of the cell; and/or whether the logical channel is mapped to the second uplink of the cell. The base station may send, to the wireless device, an uplink grant indicating a radio resource of the first uplink. The base station may receive, from the wireless device, a transport block of the logical channel via the radio resource, based on the second configuration parameter indicating that the logical channel is mapped to the first uplink.

A wireless device may perform a method comprising multiple operations. The wireless device may receive a power threshold for selection of a cell comprising a normal uplink and a supplementary uplink. The wireless device may receive the power threshold for selection of the cell for communications using a network slice. The wireless device may determine the cell for random access (e.g., a random access procedure). Determining the cell for the random access may be based on one or more of: a received power associated with the cell satisfying the power threshold; the normal uplink of the cell not operating within a frequency of the network slice. The wireless device may determine the cell for the random access based on the supplementary uplink of the cell operating within the frequency range of the network slice. The wireless device may perform a method that further comprises sending, via the supplementary uplink of the cell, at least one message associated with the random access (e.g., at least one message comprising a random access preamble). The wireless device may determine the cell for the random access by determining the cell from among a plurality of cells comprising a first cell and a second cell, wherein the second cell comprises the supplementary uplink, and wherein a received power associated with the first cell does not satisfy the power threshold. The wireless device may determine to communicate one or more packets associated with the network slice; and/or send, via the supplementary uplink of the cell, the one or more packets associated with the network slice: in a message comprising the random access preamble; or after receiving a random access response to the random access preamble. The wireless device may receive the power threshold based on a received power of the cell satisfying an initial power threshold, and/or wherein receiving the power threshold may further comprise receiving a system information block, of the cell, that comprises the power threshold. The received power satisfying the power threshold may comprise the received power being greater than or equal to the power threshold. The wireless device may deprioritize a second cell based on at least a portion of a supplementary uplink of the second cell not operating within the frequency range of the network slice. The wireless device may further receive at least one parameter indicating at least one of: the frequency range of the network slice; a frequency range of the normal uplink; or a frequency range of the supplementary uplink. The wireless device determining the cell for the random access may further comprise at least one of: determining to start a service associated with the network slice; receiving, by a lower layer of the wireless device from a higher layer of the wireless device, an indication to initiate a service associated with the network slice; or receiving a paging message indicating at least one of: the network slice; the frequency range of the network slice; or a listing of cells associated with the network slice or operating within the frequency range of the network slice. The wireless device may receive: a logical channel identifier of a logical channel associated with the network slice; and/or a parameter indicating that the logical channel is associated with the frequency range to which a network slice for the wireless device is restricted. Based on a received power associated with the second cell being less than the received power associated with the cell, the wireless device may deprioritize a second cell. The wireless device may further determine that the cell for the random access procedure may be based on the supplementary uplink of the cell supporting at least one of: a subcarrier spacing that supports the network slice; or a transmission time interval that supports the network slice. The wireless device may be in a radio resource control idle state or in a radio resource control inactive state when the wireless device receives the power threshold. A wireless device may comprise one or more processors; and memory storing instructions that, when executed by the one or more processors, cause the wireless device to perform the described method. A system may comprise a wireless device configured to perform the described method; and a base station configured to receive the at least one message (e.g., a random access preamble). A computer-readable medium may store instructions that, when executed, cause performance of the described method.

A wireless device may perform a method comprising multiple operations. The wireless device may receive a power threshold for selection of a cell comprising a normal uplink and a supplementary uplink. The wireless device may determine to use the cell for random access (e.g., a random access procedure). The wireless device determining the cell for random access may be based on one or more of: a received power associated with the cell satisfying the power threshold; at least one of the normal uplink of the cell, or the supplementary uplink of the cell operating within a frequency range of the network. The wireless device may send at least one message associated with the random access (e.g., at least one message comprising a random access preamble) via the supplementary uplink of the cell. The wireless device may determine to communicate one or more packets associated with the network slice; and/or send, via the supplementary uplink of the cell, the one or more packets associated with the network slice. The wireless device may send the one or more packets in a message comprising a random access preamble; or after receiving a random access response. The wireless device may deprioritize a second cell based on at least a portion of a supplementary uplink of the second cell not operating within the frequency range of the network slice. The wireless device may determine to start a service associated with the network slice. The wireless device may receive, by a lower layer of the wireless device from a higher layer of the wireless device, an indication to initiate a service associated with the network slice; and/or receiving a paging message. The paging message may indicate at least one of: the network slice; the frequency range of the network slice; or cells operating within the frequency range of the network slice. The wireless device may receive: a logical channel identifier of a logical channel associated with the network slice; and/or a parameter indicating that the logical channel is associated with the frequency range to which a network slice for the wireless device is restricted. A wireless device may comprise one or more processors; and memory storing instructions that, when executed by the one or more processors, cause the wireless device to perform the described method. A system may comprise a wireless device configured to perform the described method; and a base station configured to receive the at least one message (e.g., a random access preamble). A computer-readable medium may store instructions that, when executed, cause performance of the described method.

A wireless device may perform a method comprising multiple operations. The wireless device may receive a power threshold for cell selection. The wireless device may determine to use a cell, from among a plurality of cells (e.g., from at least a first cell and a second cell), for random access (e.g., a random access procedure). Determining the cell may be based on one or more of: a received power associated with the first cell not satisfying the power threshold; a received power associated with the second cell satisfying the power threshold; and at least one uplink of the second cell operating within a frequency range of the network slice. Further, the wireless device may send, via the second cell, a random access preamble. The wireless device may determine to communicate one or more packets associated with the network slice; and/or send, via the second cell, the one or more packets associated with the network slice. The wireless device may send the one or more packets in a message comprising a random access preamble; or after receiving a random access response. The received power associated with the cell may satisfy the power threshold if the received power is greater than or equal to the power threshold. The received power associated with the cell may not satisfy the power threshold if the received power is less than the power threshold. The wireless device may receive at least one parameter indicating at least one of: the frequency range of the network slice; or at least one uplink of the second cell operating within a frequency range to which a network slice for the wireless device is restricted. The wireless device may receive the power threshold which may be based on a received power of the cell satisfying an initial power threshold. The receiving the power threshold may comprise receiving a system information block, of the cell, comprising the power threshold. The wireless device may receive: a logical channel identifier of a logical channel associated with the network slice; and/or a parameter indicating that the logical channel is associated with the frequency range to which a network slice for the wireless device is restricted. A wireless device may comprise one or more processors; and memory storing instructions that, when executed by the one or more processors, cause the wireless device to perform the described method. A system may comprise a wireless device configured to perform the described method; and a base station configured to send the random access preamble. A computer-readable medium may store instructions that, when executed, cause performance of the described method.

A wireless device may perform a method comprising multiple operations. The wireless device may determine to communicate packets associated with a network slice, wherein the network slice is restricted to a frequency range. The wireless device may receive, based on a received power of a first cell being equal to or larger than a first power threshold, a system information block of the first cell. The system information block comprises a second power threshold for selection between a normal uplink and a supplementary uplink. The wireless device may perform a random access procedure via the first cell, wherein performing the random access procedure may be based on: the received power of the first cell being less than or equal to the second power threshold; and at least a portion of the supplementary uplink of the first cell being within the frequency range. The wireless device operations may further comprise selecting the first cell based on the received power of the first cell being greater than or equal to the first power threshold. The wireless device operations may further comprise not selecting a second cell, based on a second supplementary uplink of the second cell not supporting the network slice. The supplementary uplink of the first cell may support a first transmission time interval. The second supplementary uplink of the second cell does not support the first transmission time interval; and the first transmission time interval supports the network slice. The supplementary uplink of the first cell supports a first subcarrier spacing. The second supplementary uplink of the second cell does not support the first subcarrier spacing; and the first subcarrier spacing supports the network slice. The received power of the first cell may be less than a second received power of the second cell. The wireless device operations may further comprise deprioritizing the second cell, based on at least a portion of the second supplementary uplink not being within the frequency range. Deprioritizing the second cell may be based on the second received power being less than a third power threshold for selection between a second normal uplink of the second cell and the second supplementary uplink of the second cell. The at least a portion of the second supplementary uplink of the second cell may comprise at least one of: any frequency portion of the second supplementary uplink; or all frequency portion of the second supplementary uplink. The at least a portion of the supplementary uplink of the first cell may comprise at least one of: any portion of a frequency range for the second supplementary uplink; or all frequencies associated with the second supplementary uplink. Performing the random access procedure may comprise the wireless device: transmitting one or more preambles; and receiving one or more random access responses to the one or more preambles. The received power of the first cell being less than or equal to the second power threshold may indicate selection of the supplementary uplink for uplink transmissions via the first cell. The wireless device operations may further comprise transmitting, by the wireless device, transport blocks associated with the network slice via the first cell. The wireless device operations may further comprise receiving, from a base station, parameters indicating the frequency range for the network slice. The wireless device may be in a radio resource control (RRC) idle state or in an RRC inactive state. The wireless device may determine to communicate the packets associated with the network slice. The determining procedure for communicating the packets associated with the network slice may comprise at least one of: determining to start a service associated with the network slice; receiving, by a lower layer of the wireless device from a higher layer of the wireless device, an indication to initiate a service associated with the network slice; or receiving, by the wireless device, a paging message. The paging message may indicate at least one of: the network slice; the frequency range; or a list of cells associated with the frequency range or the network slice. The system information block may comprise a carrier frequency range of at least one of: the first cell; a downlink of the first cell; the normal uplink of the first cell; or the supplementary uplink of the second cell. The wireless device may receive the system information block based on cell selection criteria of the first cell being satisfied. The wireless device may further receive: a logical channel identifier of a logical channel associated with the network slice; and a parameter indicating that the logical channel is associated with the frequency range. The wireless device determining to communicate the packets may comprise receiving by a lower layer of the wireless device from a higher layer of the wireless device the packets associated with the logical channel. A wireless device may comprise one or more processors; and memory storing instructions that, when executed by the one or more processors, cause the wireless device to perform the described method. A system may comprise a wireless device configured to perform the described method; and a base station configured to send the system information block of the first cell. A computer-readable medium may store instructions that, when executed, cause performance of the described method.

A wireless device may perform a method comprising multiple operations. The wireless device receives a system information block of a cell. The system information block comprises a power threshold for selection between a first uplink and a second uplink, wherein the wireless device is configured to select the first uplink based on a received power of the cell being greater than or equal to the power threshold. The wireless device method of operation further comprises determining to communicate packets associated with a network slice; and sending, via the second uplink, a random access preamble. The wireless device sending the random access preamble may be based on: the received power of the cell being greater than or equal to the power threshold; and the network slice not supporting a frequency of the first uplink. The wireless device may ignore the power threshold when selecting the second uplink, based on the network slice not supporting the frequency of the first uplink. The wireless device method of operation may further comprise transmitting transport blocks associated with the network slice via the second uplink. The first uplink may be a normal uplink; and the second uplink may be a supplementary uplink. The wireless device may select the second uplink based on the second uplink supporting the network slice. The method of operation may further comprise the wireless device receiving, from a base station, parameters indicating a frequency range for the network slice. A portion of the frequency range for the second uplink may reside within the frequency range to which the network slice is restricted. A portion of the frequency range for the first uplink may not reside within the frequency range for the network slice. The wireless device may be in a radio resource control (RRC) idle state or in an RRC inactive state. A wireless device may comprise one or more processors; and memory storing instructions that, when executed by the one or more processors, cause the wireless device to perform the described method. A system may comprise a wireless device configured to perform the described method; and a base station configured to receive the random access preamble. A computer-readable medium storing instructions that, when executed, cause performance of the described method.

A wireless device may perform a method comprising multiple operation. The wireless device may receive at least one radio resource control message. The resource control message may comprise first configuration parameters indicating a cell comprising a first uplink and a second uplink; and second configuration parameters of a logical channel. The second configuration parameters may indicate whether the logical channel is allowed to use the first uplink of the cell; and whether the logical channel is allowed to use the second uplink of the cell. The method of operation for the wireless device may further comprise receiving an uplink grant indicating a radio resource of the first uplink; and transmitting, via the radio resource, a transport block of the logical channel, wherein the transmitting may be based on the second configuration parameter indicating that the logical channel is mapped to the first uplink. The method of operation for the wireless device may further comprise receiving a second uplink grant indicating a second radio resource of the second uplink; and determining not to transmit a transport block of the logical channel via the second radio resource. The wireless device may determine not to transmit the transport block based on the second configuration parameter indicating that the logical channel is not mapped to the second uplink. The second configuration parameters may indicate at least one of: whether the logical channel is mapped to a first bandwidth part of the cell; or whether the logical channel is mapped to a second bandwidth part of the cell. The second configuration parameters may further indicate at least one of: whether the logical channel is mapped to a first beam of the cell; or whether the logical channel is mapped to a second beam of the cell. The second configuration parameters may further indicate whether the logical channel is mapped to a third uplink of the cell. A wireless device may comprise one or more processors; and memory storing instructions that, when executed by the one or more processors, cause the wireless device to perform the described method. A system may comprise a wireless device configured to perform the described method; and a base station configured to receive the transport block of the logical channel. A computer-readable medium storing instructions that, when executed, cause performance of the described method.

A wireless device may perform a method comprising multiple operations. The wireless device may receive configuration parameters of a logical channel indicating: whether the logical channel is mapped to a first uplink of a cell; and whether the logical channel is mapped to a second uplink of the cell. The method of operation for the wireless device may further comprise receiving an uplink grant indicating a radio resource of the first uplink; and transmitting, via the radio resource, a transport block of the logical channel. The wireless device transmitting the transport block may be based on the second configuration parameter indicating that the logical channel is mapped to the first uplink. The configuration parameters may comprise one or more explicit indications of one or more cells and/or one or more uplinks of the one or more cells that are mapped to the logical channel. The logical channel may be a logical channel group that comprises one or more logical channels. A wireless device may comprise one or more processors; and memory storing instructions that, when executed by the one or more processors, cause the wireless device to perform the described method. A system may comprise a wireless device configured to perform the described method; and a base station configured to receive the transport block of the logical channel. A computer-readable medium storing instructions that, when executed, cause performance of the described method.

A wireless device may perform a method comprising multiple operations. The wireless device may receive configuration parameters of a logical channel indicating that the logical channel is allowed to use one or more of a first uplink of a cell and a second uplink of the cell. The method of operation for the wireless device may further comprise receiving an uplink grant indicating a radio resource of the first uplink; and transmitting a transport block of the logical channel, via the radio resource and based on the configuration parameter indicating that the logical channel is mapped to the first uplink. A wireless device may comprise one or more processors; and memory storing instructions that, when executed by the one or more processors, cause the wireless device to perform the described method. A system may comprise a wireless device configured to perform the described method; and a base station configured to receive the transport block of the logical channel. A computer-readable medium storing instructions that, when executed, cause performance of the described method.

A wireless device may perform a method comprising multiple operations. The wireless device may receive at least one radio resource control message comprising configuration parameters of a logical channel, wherein the configuration parameters indicates at least one of a first uplink of a cell or a second uplink of the cell that is allowed to use for the logical channel. The method of operation for the wireless device may further comprise receiving an uplink grant indicating a radio resource of the at least one of the first uplink or the second uplink; and transmitting, via the radio resource, a transport block of the logical channel. Transmitting the transport block of the logical channel may be based on: the at least one radio resource control message; and the radio resource being of the at least one of the first uplink or the second uplink. A wireless device may comprise one or more processors; and memory storing instructions that, when executed by the one or more processors, cause the wireless device to perform the described method. A system may comprise a wireless device configured to perform the described method; and a base station configured to receive the transport block of the logical channel. A computer-readable medium storing instructions that, when executed, cause performance of the described method.

A base station may perform a method comprising multiple operations. The base station may receive at least one message indicating: a network slice associated with a session of a wireless device; and a frequency range to which the network slice is restricted. The method of operation for the base station may further comprise sending, to the wireless device and based on the at least one message, at least one radio resource control message. The radio resource control message may comprise: first configuration parameters indicating a cell comprising a first uplink and a second uplink; and second configuration parameters of a logical channel associated with the session. The second configuration parameters may indicate: whether the logical channel is mapped to the first uplink of the cell; and whether the logical channel is mapped to the second uplink of the cell. The method of operation for the base station may further comprise sending, to the wireless device, an uplink grant indicating a radio resource of the first uplink; and receiving, from the wireless device and via the radio resource, a transport block of the logical channel. The base station receiving the transport block of the logical channel from the wireless device may be based on the second configuration parameter indicating that the logical channel is mapped to the first uplink. A base station may comprise one or more processors; and memory storing instructions that, when executed by the one or more processors, cause the base station to perform the described method. A system may comprise a base station configured to perform the described method; and a wireless device configured to receive the transport block of the logical channel. A computer-readable medium storing instructions that, when executed, cause performance of the described method.

A wireless device may receive at least one radio resource control message. The radio resource message may comprise a first configuration parameter(s) that indicate a cell comprising a first uplink and at least a second uplink. The radio resource message may comprise second configuration parameters of a logical channel. The second configuration parameters may indicate whether the logical channel is allowed to use the first uplink of the cell; and/or whether the logical channel is allowed to use the second uplink of the cell. The wireless device may receive an uplink grant that indicates a radio resource of the first uplink. The wireless device may send (e.g., transmit) at least one transport block of the logical channel via the radio resource, based on the second configuration parameter indicating that the logical channel is mapped to the first uplink.

The wireless device may receive a second uplink grant that indicates a second radio resource of the second uplink. The wireless device may determine to not send (e.g., transmit) at least one transport block of the logical channel via the second radio resource, based on the second configuration parameter indicating that the logical channel is not mapped to the second uplink. The second configuration parameters may indicate at least one of: whether the logical channel is mapped to a first bandwidth part of the cell; and/or whether the logical channel is mapped to a second bandwidth part of the cell. The second configuration parameters may indicate at least one of: whether the logical channel is mapped to a first beam of the cell; and/or whether the logical channel is mapped to a second beam of the cell. The second configuration parameters may indicate whether the logical channel is mapped to a third uplink of the cell, and/or whether the logical channel is mapped to any other quantity of links of the cell.

A wireless device may receive configuration parameters of a logical channel. The configuration parameters may indicate whether the logical channel is mapped to a first uplink of a cell; and/or whether the logical channel is mapped to a second uplink of the cell. The wireless device may receive an uplink grant that indicates a radio resource of the first uplink. The wireless device may send (e.g., transmit) a transport block of the logical channel via the radio resource based on the second configuration parameter may indicate that the logical channel is mapped to the first uplink. The configuration parameters may comprise one or more explicit indications of one or more cells and/or one or more uplinks of the one or more cells that are mapped to the logical channel. The logical channel is a logical channel group that may comprise one or more logical channels.

A wireless device may receive configuration parameters of a logical channel. The configuration parameters may indicate that the logical channel is allowed to use one or more of a first uplink of a cell and/or a second uplink of the cell. The wireless device may receive an uplink grant that indicates a radio resource of the first uplink. The wireless device may send (e.g., transmit) at least one transport block of the logical channel via the radio resource, based on the configuration parameter indicating that the logical channel is mapped to the first uplink.

A wireless device may receive at least one radio resource control message. The radio resource control message may comprise configuration parameters of a logical channel. The configuration parameters may indicate at least one of a first uplink of a cell or a second uplink of the cell that is allowed to use for (e.g., that may be mapped to) the logical channel. The wireless device may receive an uplink grant that indicates a radio resource of the at least one of the first uplink or the second uplink. The wireless device may send (e.g., transmit) at least one transport block of the logical channel via the radio resource, based on: the at least one radio resource control message; and/or the radio resource being of the at least one of the first uplink or the second uplink.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   selecting, by a wireless device camped on a first cell, a second cell, based on:
      the second cell satisfying a power threshold; and
      the second cell operating within a frequency range of a network slice; and
   transmitting, via the second cell, a message associated with random access.

2. The method of claim 1, further comprising:
   transmitting, via the second cell, one or more packets associated with the network slice, wherein the transmitting is:
      in the message associated with random access; or
      after receiving a random access response.

3. The method of claim 1, wherein satisfying the power threshold comprises being greater than or equal to the power threshold.

4. The method of claim 1, further comprising receiving at least one parameter indicating that the second cell operates within the frequency range of the network slice.

5. The method of claim 1, further comprising:
   receiving one or more system information blocks indicating one or more carrier frequency ranges; and
   determining, based on the one or more system information blocks, that the second cell operates within the frequency range of the network slice.

6. The method of claim 1, wherein the selecting is further based on a priority associated with the second cell.

7. The method of claim 1, wherein the selecting is further based on a priority associated with the second cell being higher than a priority associated with the first cell.

8. The method of claim 1, wherein the wireless device is in a camped normally state during a time that the wireless device is camped on the first cell.

9. The method of claim 1, wherein the first cell operates within a frequency range of the network slice while the wireless device is camped on the first cell.

10. A wireless device comprising:
    one or more processors; and
    memory storing instructions that, when executed by the one or more processors, cause the wireless device to:
       select, while the wireless device is camped on a first cell, a second cell, based on:
          the second cell satisfying a power threshold; and
          the second cell operating within a frequency range of a network slice; and
       transmit, via the second cell, a message associated with random access.

11. The wireless device of claim 10, wherein the instructions, when executed by the one or more processors, further cause the wireless device to:
    transmit, via the second cell, one or more packets that are associated with the network slice, wherein the one or more packets are transmitted:
       in the message associated with random access; or
       after receiving a random access response.

12. The wireless device of claim 10, wherein satisfying the power threshold comprises being greater than or equal to the power threshold.

13. The wireless device of claim 10, wherein the instructions, when executed by the one or more processors, further cause the wireless device to receive at least one parameter indicating that the second cell operates within the frequency range of the network slice.

14. The wireless device of claim 10, wherein the instructions, when executed by the one or more processors, further cause the wireless device to:
    receive one or more system information blocks indicating one or more carrier frequency ranges; and
    determine, based on the one or more system information blocks, that the second cell operates within the frequency range of the network slice.

15. The wireless device of claim 10, wherein the instructions, when executed by the one or more processors, further cause the wireless device to select the second cell further based on a priority associated with the second cell.

16. The wireless device of claim 10, wherein the instructions, when executed by the one or more processors, further cause the wireless device to select the second cell further based on a priority associated with the second cell being higher than a priority associated with the first cell.

17. The wireless device of claim 10, wherein the wireless device is in a camped normally state during a time that the wireless device is camped on the first cell.

18. The wireless device of claim 10, wherein the first cell operates within a frequency range of the network slice while the wireless device is camped on the first cell.

19. A non-transitory computer-readable medium storing instructions that, when executed by one or more processors, configure a wireless device to:
    select, while the wireless device is camped on a first cell, a second cell, based on:
       the second cell satisfying a power threshold; and
       the second cell operating within a frequency range of a network slice; and
    transmit, via the second cell, a message associated with random access.

20. The non-transitory computer-readable medium of claim 19, wherein the instructions, when executed by one or more processors, further configure the wireless device to:
    transmit, via the second cell, one or more packets that are associated with the network slice, wherein the one or more packets are transmitted:
       in the message associated with random access; or
       after receiving a random access response.

21. The non-transitory computer-readable medium of claim 19, wherein satisfying the power threshold comprises being greater than or equal to the power threshold.

22. The non-transitory computer-readable medium of claim 19, wherein the instructions, when executed by one or more processors, further configure the wireless device to receive at least one parameter indicating that the second cell operates within the frequency range of the network slice.

23. The non-transitory computer-readable medium of claim 19, wherein the instructions, when executed by one or more processors, further configure the wireless device to:
   receive one or more system information blocks indicating one or more carrier frequency ranges; and
   determine, based on the one or more system information blocks, that the second cell operates within the frequency range of the network slice.

24. The non-transitory computer-readable medium of claim 19, wherein the instructions, when executed by one or more processors, further configure the wireless device to select the second cell further based on a priority associated with the second cell.

25. The non-transitory computer-readable medium of claim 19, wherein the instructions, when executed by one or more processors, further configure the wireless device to select the second cell further based on a priority associated with the second cell being higher than a priority associated with the first cell.

26. The non-transitory computer-readable medium of claim 19, wherein the wireless device is in a camped normally state during a time that the wireless device is camped on the first cell.

27. The non-transitory computer-readable medium of claim 19, wherein the first cell operates within a frequency range of the network slice while the wireless device is camped on the first cell.

* * * * *